US010428190B2

(12) United States Patent
Flores et al.

(10) Patent No.: US 10,428,190 B2
(45) Date of Patent: Oct. 1, 2019

(54) PROCESSES FOR DESIGNING CROSS-LINKABLE POLYCARBONATES AND ARTICLES FORMED THEREFROM

(71) Applicant: SABIC GLOBAL TECHNOLOGIES B.V., Bergen op Zoom (NL)

(72) Inventors: Amanda Marie Flores, Mount Vernon, IN (US); James Franklin Hoover, Mount Vernon, IN (US); Peter Johnson, Mount Vernon, IN (US); Jean-Francois Morizur, Mount Vernon, IN (US); Thomas Evans, Mount Vernon, IN (US)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 349 days.

(21) Appl. No.: 15/320,133

(22) PCT Filed: Jun. 19, 2015

(86) PCT No.: PCT/IB2015/054649
§ 371 (c)(1),
(2) Date: Dec. 19, 2016

(87) PCT Pub. No.: WO2015/193865
PCT Pub. Date: Dec. 23, 2015

(65) Prior Publication Data
US 2017/0166708 A1    Jun. 15, 2017

Related U.S. Application Data

(60) Provisional application No. 62/015,250, filed on Jun. 20, 2014.

(51) Int. Cl.
| C08J 3/28 | (2006.01) |
| C08J 3/24 | (2006.01) |
| C08G 64/04 | (2006.01) |
| C08K 5/42 | (2006.01) |
| C08K 5/5435 | (2006.01) |
| C08L 69/00 | (2006.01) |
| C08G 64/06 | (2006.01) |
| C08K 5/549 | (2006.01) |

(52) U.S. Cl.
CPC .............. *C08J 3/24* (2013.01); *C08G 64/04* (2013.01); *C08G 64/06* (2013.01); *C08J 3/28* (2013.01); *C08K 5/42* (2013.01); *C08K 5/549* (2013.01); *C08K 5/5435* (2013.01); *C08L 69/00* (2013.01); *C08J 2369/00* (2013.01)

(58) Field of Classification Search
CPC ....................................................... C08J 3/24
See application file for complete search history.

(56) References Cited

U.S. PATENT DOCUMENTS

| 3,021,305 A | 2/1962 | Goldberg et al. |
| 3,215,667 A | 11/1965 | Caldwell et al. |
| 3,220,973 A | 11/1965 | Goldberg et al. |
| 3,261,808 A | 7/1966 | Schnell et al. |
| 3,285,875 A | 11/1966 | Bottenbruch et al. |
| 3,770,696 A | 11/1973 | Bostick et al. |
| 4,092,243 A | 5/1978 | Neuray et al. |
| 4,199,540 A | 4/1980 | Adelmann et al. |
| 4,221,645 A * | 9/1980 | Adelmann ........... C08G 64/045 522/163 |
| 4,230,548 A | 10/1980 | Adelmann et al. |
| 4,260,671 A | 4/1981 | Merrill |
| 4,333,809 A | 6/1982 | Schreckenberg et al. |
| 4,367,186 A | 1/1983 | Adelmann et al. |
| 4,391,955 A | 7/1983 | Hori et al. |
| 4,636,559 A | 1/1987 | Rosenquist et al. |
| 4,701,537 A | 10/1987 | Rosenquist |
| 4,746,725 A | 5/1988 | Evans et al. |
| 4,764,566 A | 8/1988 | Swedo |
| 4,767,840 A | 8/1988 | Shannon et al. |
| 4,778,874 A | 10/1988 | Rosenquist |
| 4,786,710 A | 11/1988 | Rosenquist et al. |
| 4,912,194 A | 3/1990 | Rosenquist |
| 4,916,189 A | 4/1990 | Fontana et al. |
| 4,927,914 A | 5/1990 | Rosenquist |
| 4,933,424 A | 6/1990 | Rosenquist |
| 4,960,839 A | 10/1990 | Rosenquist |

(Continued)

FOREIGN PATENT DOCUMENTS

| CA | 2057122 A1 | 6/1992 |
| CN | 1109072 A | 9/1995 |
| CN | 102311623 B | 9/2012 |
| DE | 1226788 B | 10/1966 |
| DE | 1233598 B | 2/1967 |
| DE | 1236197 B | 3/1967 |
| DE | 2746140 A1 | 4/1979 |
| DE | 19717371 A1 | 10/1998 |
| EP | 0001577 | 5/1979 |
| EP | 0273144 A2 | 9/1998 |
| EP | 2391666 A1 | 12/2011 |
| GB | 883619 | 12/1961 |
| GB | 885442 | 12/1961 |
| GB | 896266 | 5/1962 |
| GB | 903909 | 8/1962 |

(Continued)

OTHER PUBLICATIONS

Wright et al., "Gas sorption and transport in UV-irradiated polyarylate copolymers based on tetramethyl bisphenol-A and dihydroxybenzophenone", Journal of Membrane Science 124 (1997), p. 161-174 (Year: 1997).*

(Continued)

*Primary Examiner* — Galen H Hauth
(74) *Attorney, Agent, or Firm* — Cantor Colburn LLP

(57) ABSTRACT

Articles having improved flame retardance and chemical resistance properties can be made from blends containing a cross-linkable polycarbonate resin having repeating units derived from a dihydroxybenzophenone. Predictive equations can be used to relate properties of the blend and the polycarbonate resin to the final properties of the article, and permit design of articles with desired combinations of properties.

5 Claims, 11 Drawing Sheets

(56) References Cited

U.S. PATENT DOCUMENTS

| | | |
|---|---|---|
| 4,972,039 A | 11/1990 | Shannon et al. |
| 4,973,665 A | 11/1990 | Rosenquist |
| 4,999,408 A | 3/1991 | Rosenquist |
| 5,012,035 A | 4/1991 | Sartori et al. |
| 5,019,666 A | 5/1991 | Sartori et al. |
| 5,034,496 A | 6/1991 | Bales et al. |
| 5,081,205 A | 1/1992 | Rosenquist |
| 5,115,024 A | 5/1992 | Fontana et al. |
| 5,124,407 A | 6/1992 | Fontana et al. |
| 5,318,827 A | 6/1994 | Logan et al. |
| 5,516,877 A | 5/1996 | Bales et al. |
| 5,588,083 A | 12/1996 | Boonstra et al. |
| 5,688,896 A | 11/1997 | Boonstra et al. |
| 5,908,916 A | 6/1999 | Woudenberg et al. |
| 6,043,334 A | 3/2000 | Kanamaru et al. |
| 6,136,521 A | 10/2000 | Hikosaka et al. |
| 6,232,430 B1 | 5/2001 | Boonstra et al. |
| 6,625,379 B1 | 9/2003 | Azuma |
| 6,743,888 B1 | 6/2004 | Qi et al. |
| 6,818,366 B2 | 11/2004 | Qi et al. |
| 6,844,416 B2 | 1/2005 | Qi et al. |
| 6,864,026 B2 | 3/2005 | Qi et al. |
| 7,144,971 B2 | 12/2006 | Bender et al. |
| 7,229,732 B2 | 6/2007 | Hu et al. |
| 7,297,456 B2 | 11/2007 | Hu et al. |
| 7,390,857 B2 | 6/2008 | Cella et al. |
| 9,023,912 B2 | 5/2015 | Morizur et al. |
| 9,045,590 B2 | 6/2015 | Hoover et al. |
| 9,181,390 B2 | 11/2015 | Hoover et al. |
| 9,303,120 B2 | 4/2016 | Sybert et al. |
| 9,422,395 B2 | 8/2016 | Morizur et al. |
| 9,546,244 B2 | 1/2017 | Morizur et al. |
| 9,562,133 B2 | 2/2017 | Morizur et al. |
| 9,587,078 B2 | 3/2017 | Morizur et al. |
| 9,708,447 B2 | 7/2017 | Morizur et al. |
| 9,715,180 B2 | 7/2017 | Lalovic et al. |
| 2004/0030090 A1 | 2/2004 | Meyer et al. |
| 2007/0105994 A1 | 5/2007 | Li et al. |
| 2010/0075125 A1 | 3/2010 | Maas et al. |
| 2013/0081618 A1 | 4/2013 | Korneff et al. |
| 2014/0179844 A1 | 6/2014 | Morizur et al. |
| 2014/0219625 A1 | 8/2014 | Park et al. |
| 2014/0272347 A1 | 9/2014 | Hongladarom et al. |
| 2014/0272691 A1 | 9/2014 | Calveras et al. |
| 2014/0275314 A1 | 9/2014 | Morizur et al. |
| 2014/0275321 A1 | 9/2014 | Morizur et al. |
| 2014/0275322 A1 | 9/2014 | Morizur et al. |
| 2014/0275324 A1 | 9/2014 | Morizur et al. |
| 2014/0275449 A1 | 9/2014 | Hoover et al. |

FOREIGN PATENT DOCUMENTS

| | | |
|---|---|---|
| IT | 1177165 B | 8/1987 |
| JP | 55009697 A | 1/1980 |
| JP | 61130338 A | 6/1986 |
| JP | 63125523 A | 5/1988 |
| JP | 4003069 A | 1/1992 |
| JP | 4037587 A | 2/1992 |
| JP | 4151287 A | 5/1992 |
| JP | 4291348 A | 10/1992 |
| JP | 4319544 A | 11/1992 |
| JP | 8016138 B2 | 2/1996 |
| JP | 8062863 A | 3/1996 |
| JP | 11073075 A | 3/1999 |
| JP | 3955373 B2 | 6/1999 |
| JP | 4021542 B2 | 9/1999 |
| JP | 3901834 B2 | 10/1999 |
| JP | 4041591 B2 | 2/2000 |
| JP | 2002173529 A | 6/2001 |
| JP | 2002341573 A | 11/2002 |
| JP | 2002341574 A | 11/2002 |
| JP | 3938483 B2 | 6/2003 |
| JP | 2004287129 A | 10/2004 |
| JP | 3584128 B2 | 11/2004 |
| JP | 3584135 B2 | 11/2004 |
| JP | 2006078954 A | 3/2006 |
| JP | 4630243 B2 | 12/2006 |
| JP | 4885811 B2 | 12/2007 |
| JP | 2007314718 A | 12/2007 |
| JP | 2007314719 A | 12/2007 |
| JP | 2013227461 A | 11/2013 |
| KR | 20090016172 A | 2/2009 |
| KR | 20090016173 A | 2/2009 |
| KR | 20110023582 A | 3/2011 |
| KR | 1027811 B1 | 4/2011 |
| KR | 20110057844 A | 6/2011 |
| KR | 1072526 B1 | 10/2011 |
| WO | WO 2005037921 | 4/2005 |
| WO | 2013169938 A2 | 11/2013 |
| WO | 2014144438 A1 | 9/2014 |
| WO | WO 2014144304 | 9/2014 |

OTHER PUBLICATIONS

International Search Report for PCT/IB2015/054649 dated Oct. 6, 2015.

* cited by examiner

PROCESSES FOR DESIGNING CROSS-LINKABLE POLYCARBONATES AND ARTICLES FORMED THEREFROM

CROSS-REFERENCE TO RELATED APPLICATIONS

This application is a 371 of PCT Application Serial No. PCT/IB2015/054649, filed Jun. 19, 2015, which claims priority to U.S. Provisional Patent Application Ser. No. 62/015,250, filed on Jun. 20, 2014, the entirety of which is hereby fully incorporated by reference.

BACKGROUND

The present disclosure relates to processes for preparing cross-linkable polycarbonates and articles formed therefrom that have certain desired properties or combinations of properties.

Polycarbonates (PC) are thermoplastic resins with desirable properties such as high impact strength and toughness, transparency, and heat resistance. However, they also drip when exposed to a flame, and this behavior worsens as wall thickness decreases. This is undesirable for applications requiring V0 or 5VA performance. It would be desirable to be able to create polymeric compositions whose properties can be predicted, permitting the design of and balance between desired combinations of properties.

BRIEF DESCRIPTION

The present disclosure relates to processes for preparing articles having desired properties and combinations of properties. The articles are formed from a polymeric composition that includes a cross-linkable polycarbonate resin having a photoactive group derived from a dihydroxybenzophenone. Upon exposure to UV radiation, crosslinking occurs and a combination of properties is desirably obtained.

The articles are prepared from polymeric compositions that include cross-linkable polycarbonate resins containing a photoactive group derived from a dihydroxybenzophenone. Upon exposure to ultraviolet radiation, the cross-linkable polycarbonate resin will crosslink with itself and/or with other polymeric base resins, improving overall chemical resistance, flame retardance, and other characteristics of the articles. Based on certain formulations and equations disclosed herein, the polycarbonate resins and the polymeric compositions can be specifically created to achieve certain properties when exposed to a selected dosage of UV radiation.

Briefly, several predictive equations are identified herein for selecting and predicting a property of an article based on properties of the cross-linkable polycarbonate and the polymeric composition/blend used to make the article. Equation 1 predicts the average V0. Equation 2 predicts the percentage retention of tensile elongation after UV exposure. Equation 3 predicts the Delta YI after UV exposure. Equation 4 predicts the Delta % T after UV exposure. Equation 5 predicts the gel thickness after UV exposure.

Disclosed in various embodiments are processes for preparing an article that has a high probability of passing a UL94 V0 test, comprising: providing a polymeric composition to be exposed to a dosage (D) of UVA radiation, wherein the polymeric composition comprises: a cross-linkable polycarbonate resin including repeating units derived from a dihydroxybenzophenone; and optionally one or more polymeric base resins; wherein the cross-linkable polycarbonate resin contains a molar percentage of the dihydroxybenzophenone (MOL %); and wherein the polymeric composition has: a molecular weight increase of polymeric components therein after exposure to UV radiation ($MW\_I$), a melt flow rate (MF), and a weight percentage of the cross-linkable polycarbonate resin (WP); forming an article from the polymeric composition; and exposing the formed article to the dosage; wherein D, MOL %, $MW\_I$, MF, and WP are determined based on the flame performance Equation 1 described herein for obtaining $V0\_Avg$.

Disclosed in various embodiments are processes for preparing an article that has a high probability of passing a UL94 V0 test, comprising: designing a polymeric composition to be exposed to a selected dosage (D) of UVA radiation, wherein the polymeric composition comprises: a cross-linkable polycarbonate resin including repeating units derived from a dihydroxybenzophenone; and optionally one or more polymeric base resins; wherein the cross-linkable polycarbonate resin contains a selectable molar percentage of the dihydroxybenzophenone (MOL %), and the polymeric composition has a selectable molecular weight increase after exposure to UV radiation ($MW\_I$), a selectable melt flow rate (MF), and a selectable weight percentage of the cross-linkable polycarbonate resin (WP); preparing the cross-linkable polycarbonate resin; optionally blending the cross-linkable polycarbonate resin with the one or more polymeric base resins to form the polymeric composition; forming an article from the polymeric composition; and exposing the formed article to the selected dosage of UVA radiation; wherein D, MOL %, $MW\_I$, MF, and WP are determined based on the flame performance Equation 1 described herein for obtaining $V0\_Avg$. The article has an average V0 ($V0\_Avg$) that is the average of (i) the probability of a first time pass in a UL94 V0 test at a thickness of 1.2 millimeters (mm) after UV exposure and measured after 2 days of aging at room temperature, and (ii) the probability of a first time pass in a UL94 V0 test at a thickness of 1.2 mm after UV exposure and measured after 7 days of aging at 70° C. $V0\_Avg$ is at least 0.7.

In some embodiments, D, MOL %, $MW\_I$, WP, and MF can also be determined based on the percentage retention of tensile elongation Equation 2 described herein. The percentage retention of tensile elongation, % RE, should be at least 85%.

In addition, D, MOL %, and $MW\_I$ can also be determined based on the Delta YI Equation 3 described herein. The Delta YI should be at most 6.

In yet more variations, D, MOL %, $MW\_I$, and MF can also be determined based on the Delta % T equation described herein. The Delta % T is 3.5 or less.

Additionally, D, MOL %, $MW\_I$, MF, and WP may also be determined based on the gel thickness Equation 5 described herein. In embodiments, the gel thickness is at least 5 micrometers.

In particular embodiments, the polymeric composition comprises a polymeric base resin that is a bisphenol-A homopolycarbonate having a weight-average molecular weight of about 31,000, or is selected from the other polymeric base resins disclosed herein.

In some embodiments, MOL % is from 2.5 to 20. In other embodiments, $MW\_I$ is from about 600 to about 11,000. In still other embodiments, MF is from about 5 to about 20. In various embodiments, WP is from 50 to 100.

The cross-linkable polycarbonate resin can be a copolymer or a terpolymer. Also disclosed herein are the cross-linkable polycarbonate resins prepared using these processes; the polymeric compositions prepared in these processes; and articles formed by these processes. The articles can be, for example, a molded article, a film, a sheet, a layer of a multilayer film, or a layer of a multilayer sheet.

Additionally disclosed herein are processes for preparing an article that has a desired percentage retention of tensile elongation after exposure to acetone at a thickness of 3.2 mm, comprising: providing a polymeric composition to be exposed to a dosage (D) of UVA radiation, wherein the polymeric composition comprises: a cross-linkable polycarbonate resin including repeating units derived from a dihydroxybenzophenone; and optionally one or more polymeric base resins; wherein the cross-linkable polycarbonate resin contains a selectable molar percentage of the dihydroxybenzophenone (MOL %); and wherein the polymeric composition has: a molecular weight increase of polymeric components therein after exposure to UV radiation (MW_I), a melt flow rate (MF), and a weight percentage of the cross-linkable polycarbonate resin (WP); forming an article from the polymeric composition; and exposing the formed article to the dosage; wherein D, MOL %, MW_I, MF, and WP are determined based on the percentage retention of tensile elongation Equation 2 discussed herein.

Also disclosed in various embodiments herein are processes for preparing an article that has a desired percentage retention of tensile elongation after exposure to acetone at a thickness of 3.2 mm. The processes comprise: designing a polymeric composition to be exposed to a selected dosage (D) of UVA radiation, wherein the polymeric composition includes: a cross-linkable polycarbonate resin having repeating units derived from a dihydroxybenzophenone; and optionally one or more polymeric base resins; wherein the cross-linkable polycarbonate resin contains a selectable molar percentage of the dihydroxybenzophenone (MOL %), and the polymeric composition has a selectable molecular weight increase after exposure to UV radiation (MW_I), a selectable melt flow rate (MF), and a selectable weight percentage of the cross-linkable polycarbonate resin (WP); preparing the cross-linkable polycarbonate resin; optionally blending the cross-linkable polycarbonate resin with the one or more polymeric base resins to form the polymeric composition; forming an article from the polymeric composition; and exposing the formed article to the selected dosage; wherein D, MOL %, MW_I, MF, and WP are determined based on the percentage retention of tensile elongation Equation 2 discussed herein. The percentage retention of tensile elongation is measured after exposure to acetone at a thickness of 3.2 mm, and is at least 85.

In additional embodiments, D, MOL %, MW_I, WP, and MF can also be determined based on the flame performance Equation 1 discussed herein. Equation 1 provides an average V0 (V0_Avg), which is at least 0.7.

In addition, D, MOL %, and MW_I can also be determined based on the Delta YI Equation 3 described herein. The Delta YI should be at most 6.

In yet more variations, D, MOL %, MW_I, and MF can also be determined based on the Delta % T equation described herein. The Delta % T is 3.5 or less.

Moreover, D, MOL %, MW_I, MF, and WP may also be determined based on the gel thickness Equation 5 described herein. In embodiments, the gel thickness is at least 5 micrometers.

In particular embodiments, the polymeric composition comprises a polymeric base resin that is a bisphenol-A homopolycarbonate having a weight-average molecular weight of about 31,000, or is selected from the other polymeric base resins disclosed herein.

In some embodiments, MOL % is from 2.5 to 20. In other embodiments, MW_I is from about 600 to about 11,000. In still other embodiments, MF is from about 5 to about 20. In various embodiments, WP is from 50 to 100.

The cross-linkable polycarbonate resin can be a copolymer or a terpolymer. Also disclosed herein are the cross-linkable polycarbonate resins prepared using these processes; the polymeric compositions prepared in these processes; and articles formed by these processes. The articles can be, for example, a molded article, a film, a sheet, a layer of a multilayer film, or a layer of a multilayer sheet.

Additionally disclosed in different embodiments herein are processes for preparing an article that has a desired percentage retention of tensile elongation after exposure to acetone at a thickness of 3.2 mm, comprising: providing a polymeric composition to be exposed to a dosage (D) of UVA radiation, wherein the polymeric composition comprises: a cross-linkable polycarbonate resin including repeating units derived from a dihydroxybenzophenone; and optionally one or more polymeric base resins; wherein the cross-linkable polycarbonate resin contains a selectable molar percentage of the dihydroxybenzophenone (MOL %); and wherein the polymeric composition has: a molecular weight increase of polymeric components therein after exposure to UV radiation (MW_I), a melt flow rate (MF), and a weight percentage of the cross-linkable polycarbonate resin (WP); forming an article from the polymeric composition; and exposing the formed article to the dosage; wherein D, MOL %, and MW_I are determined based on the Delta YI Equation 3 discussed herein.

Various additional embodiments are also related to processes for preparing an article that has a low Delta YI after exposure to UVA radiation. The processes comprise: designing a polymeric composition to be exposed to a selected dosage (D) of UVA radiation, wherein the polymeric composition includes: a cross-linkable polycarbonate resin having repeating units derived from a dihydroxybenzophenone; and optionally one or more polymeric base resins; wherein the cross-linkable polycarbonate resin contains a selectable molar percentage of the dihydroxybenzophenone (MOL %), and the polymeric composition has a selectable molecular weight increase after exposure to UV radiation (MW_I), a selectable melt flow rate (MF), and a selectable weight percentage of the cross-linkable polycarbonate resin (WP); preparing the cross-linkable polycarbonate resin; optionally blending the cross-linkable polycarbonate resin with the one or more polymeric base resins to form the polymeric composition; forming an article from the polymeric composition; and exposing the formed article to the selected dosage; wherein D, MOL %, and MW_I are determined based on the Delta YI Equation 3 discussed herein. The Delta YI is at most 6.

In additional embodiments, D, MOL %, MW_I, WP, and MF can also be determined based on the flame performance Equation 1 discussed herein. Equation 1 provides an average V0 (V0_Avg), which is at least 0.7.

In some embodiments, D, MOL %, MW_I, WP, and MF can also be determined based on the percentage retention of tensile elongation Equation 2 described herein. The percentage retention of tensile elongation, % RE, should be at least 85%.

In yet more variations, D, MOL %, MW_I, and MF can also be determined based on the Delta % T equation described herein. The Delta % T is 3.5 or less.

Furthermore, D, MOL %, MW_I, MF, and WP may also be determined based on the gel thickness Equation 5 described herein. In embodiments, the gel thickness is at least 5 micrometers.

In more particular embodiments, the polymeric composition comprises a polymeric base resin that is a polycarbonate. In some specific embodiments, the polymeric base resin is a bisphenol-A homopolycarbonate having a weight-average molecular weight of about 31,000, or is selected from the other polymeric base resins disclosed herein.

In some embodiments, MOL % is from 2.5 to 20. In other embodiments, MW_I is from about 600 to about 11,000. In still other embodiments, MF is from about 5 to about 20. In various embodiments, WP is from 50 to 100.

The cross-linkable polycarbonate resin can be a copolymer or a terpolymer. Also disclosed herein are the cross-linkable polycarbonate resins prepared using these processes; the polymeric compositions prepared in these processes; and articles formed by these processes. The articles can be, for example, a molded article, a film, a sheet, a layer of a multilayer film, or a layer of a multilayer sheet.

Also disclosed in embodiments are articles formed from a polymeric composition that comprises a cross-linkable polycarbonate resin including repeating units derived from a dihydroxybenzophenone, wherein the article has at least two of the following three properties: (i) a pFTP(V0) of at least 0.9 at a thickness of 1.2 mm after UV exposure and measured after 2 days of aging at room temperature; (ii) a percentage retention of tensile elongation of at least 85% after exposure to acetone at a thickness of 3.2 mm; and (iii) a Delta YI of less than 10, measured before UVA exposure and at least 48 hours after UVA exposure. The article may have all three of these properties.

These and other non-limiting characteristics are more particularly described below.

BRIEF DESCRIPTION OF THE DRAWINGS

The following drawings are presented to illustrate the exemplary embodiments disclosed herein and not to limit them.

DETAILED DESCRIPTION

Figure 1:
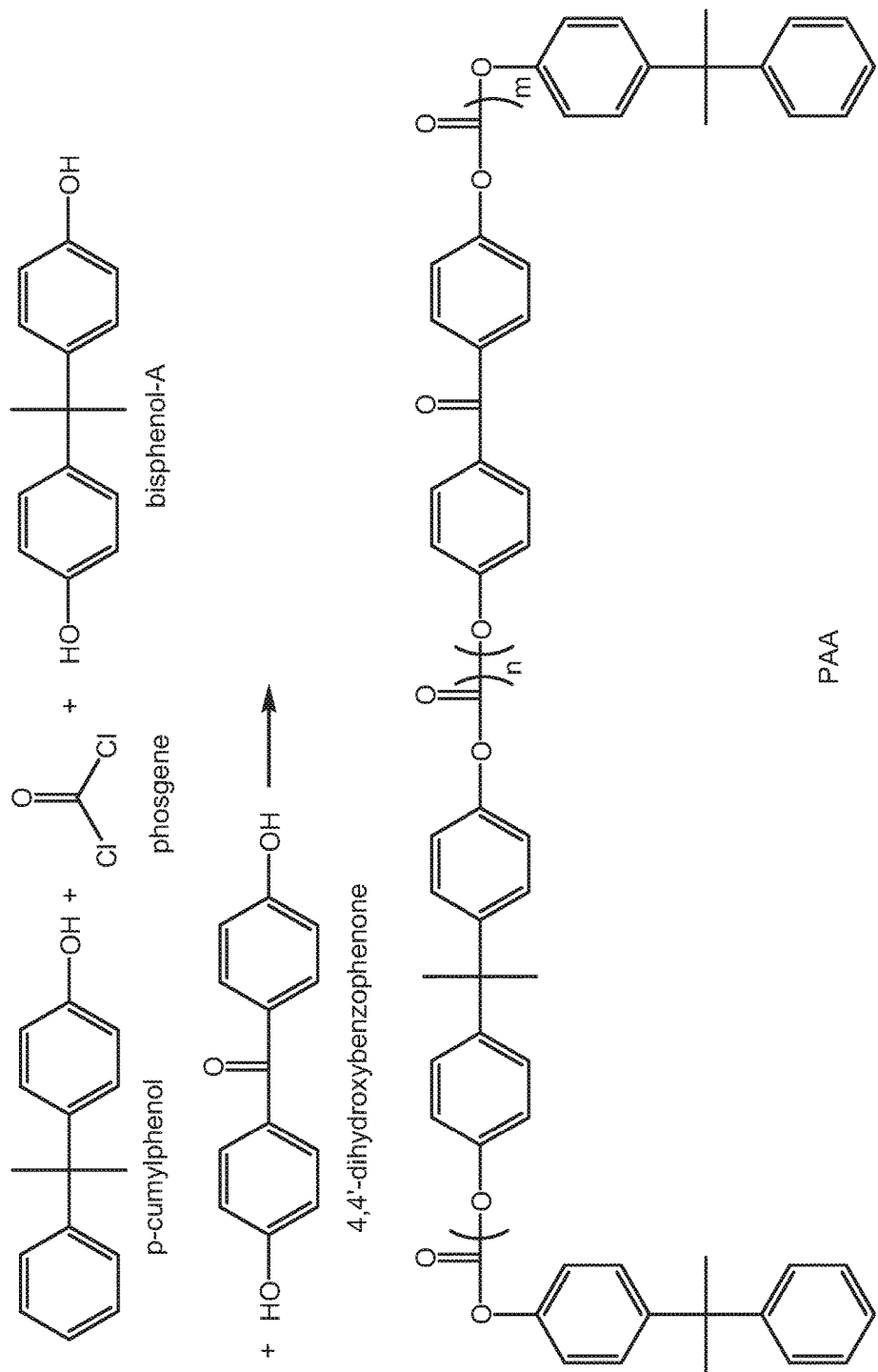
FIG. 1 illustrates the formation of a cross-linkable polycarbonate resin from a dihydroxybenzophenone (4,4'-dihydroxybenzophenone), a carbonate precursor (phosgene), a dihydroxy chain extender (bisphenol-A), and an end-capping agent (p-cumylphenol).

In the following specification, the examples, and the claims which follow, reference will be made to some terms which are defined as follows.

Definitions

Unless otherwise defined, all technical and scientific terms used herein have the same meaning as commonly understood by one of ordinary skill in the art. In case of conflict, the present document, including definitions, will control. Preferred methods and materials are described below, although methods and materials similar or equivalent to those described herein can be used in practice or testing of the present invention. All publications, patent applications, patents and other references mentioned herein are incorporated by reference in their entirety. The materials, methods, and examples disclosed herein are illustrative only and not intended to be limiting.

The singular forms "a," "an," and "the" include plural referents unless the context clearly dictates otherwise.

As used in the specification and in the claims, the open-ended transitional phrases "comprise(s)," "include(s)," "having," "contain(s)," and variants thereof require the presence of the named ingredients/steps and permit the presence of other ingredients/steps. These phrases should also be construed as disclosing the closed-ended phrases "consist of" or "consist essentially of" that permit only the named ingredients/steps and unavoidable impurities, and exclude other ingredients/steps.

Numerical values used herein should be understood to include numerical values which are the same when reduced to the same number of significant figures and numerical values which differ from the stated value by less than the experimental error of the measurement technique described for determining the value.

All ranges disclosed herein are inclusive of the recited endpoint and independently combinable (for example, the range of "from 2 grams to 10 grams" is inclusive of the endpoints, 2 grams and 10 grams, and all the intermediate values).

The term "about" can be used to include any numerical value that can carry without changing the basic function of that value. When used with a range, "about" also discloses the range defined by the absolute values of the two endpoints, e.g., "about 2 to about 4" also discloses the range "from 2 to 4." The term "about" may refer to plus or minus 10% of the indicated number.

Compounds are described using standard nomenclature. Any position not substituted by an indicated group is understood to have its valency filled by a bond or a hydrogen atom. A dash ("—") that is not between two letters indicates a point of attachment for a substituent, e.g. —CHO attaches through the carbon atom.

The term "aliphatic" refers to an array of atoms that is not aromatic. The backbone of an aliphatic group is composed exclusively of carbon. An aliphatic group is substituted or unsubstituted. Exemplary aliphatic groups are ethyl and isopropyl.

An "aromatic" radical has a ring system containing a delocalized conjugated pi system with a number of pi-electrons that obeys Hückel's Rule. The ring system may include heteroatoms (e.g. N, S, Se, Si, 0), or may be composed exclusively of carbon and hydrogen. Aromatic groups are not substituted. Exemplary aromatic groups include phenyl, thienyl, naphthyl, and biphenyl.

An "ester" radical has the formula —CO—O—, with the carbon atom and the oxygen atom both bonded to carbon atoms. A "carbonate" radical has the formula —O—CO—O—, with the oxygen atoms both bonded to carbon atoms. Note that a carbonate group is not an ester group, and an ester group is not a carbonate group.

A "hydroxyl" radical has the formula —OH, with the oxygen atom bonded to a carbon atom. A "carboxy" or "carboxyl" radical has the formula —COOH, with the carbon atom bonded to another carbon atom. A carboxyl group can be considered as having a hydroxyl group. However, please note that a carboxyl group participates in certain reactions differently from a hydroxyl group. An "anhydride" radical has the formula —CO—O—CO—, with the carbonyl carbon atoms bonded to other carbon atoms. This radical can be considered equivalent to two carboxyl groups. The term "acid halide" refers to a radical of the formula —CO—X, with the carbon atom bonded to another carbon atom.

The term "alkyl" refers to a radical composed entirely of carbon atoms and hydrogen atoms which is fully saturated. The alkyl radical may be linear, branched, or cyclic.

The term "alkyl" refers to a fully saturated radical composed entirely of carbon atoms and hydrogen atoms. The alkyl radical may be linear, branched, or cyclic. The term "aryl" refers to an aromatic radical composed exclusively of carbon and hydrogen. Exemplary aryl groups include phenyl, naphthyl, and biphenyl. The term "hydrocarbon" refers to a radical which is composed exclusively of carbon and hydrogen. Both alkyl and aryl groups are considered hydrocarbon groups. The term "heteroaryl" refers to an aromatic radical containing at least one heteroatom. Note that "heteroaryl" is a subset of aromatic, and is exclusive of "aryl".

The term "halogen" refers to fluorine, chlorine, bromine, and iodine. The term "halo" means that the substituent to which the prefix is attached is substituted with one or more independently selected halogen radicals.

The term "alkoxy" refers to an alkyl radical which is attached to an oxygen atom, i.e. —O—$C_nH_{2n+1}$. The term "aryloxy" refers to an aryl radical which is attached to an oxygen atom, e.g. —O—$C_6H_5$.

An "alkenyl" radical is composed entirely of carbon atoms and hydrogen atoms and contains a carbon-carbon double bond that is not part of an aromatic structure. An exemplary alkenyl radical is vinyl (—CH=$CH_2$).

The term "alkenyloxy" refers to an alkenyl radical which is attached to an oxygen atom, e.g. —O—CH=$CH_2$. The term "arylalkyl" refers to an aryl radical which is attached to an alkyl radical, e.g. benzyl (—$CH_2$—$C_6H_5$). The term "alkylaryl" refers to an alkyl radical which is attached to an aryl radical, e.g. tolyl (—$C_6H_4$—$CH_3$).

The term "substituted" refers to at least one hydrogen atom on the named radical being substituted with another functional group, such as halogen, —CN, or —$NO_2$. However, the functional group is not hydroxyl, carboxyl, ester, acid halide, or anhydride. Besides the aforementioned functional groups, an aryl group may also be substituted with alkyl or alkoxy. An exemplary substituted aryl group is methylphenyl.

The term "copolymer" refers to a molecule derived from two or more structural unit or monomeric species, as opposed to a homopolymer, which is a molecule derived from only one structural unit or monomer. The term "terpolymer" refers to a molecule derived specifically from only three different monomers.

The terms "Glass Transition Temperature" or "Tg" refer to the maximum temperature that a polycarbonate will retain at least one useful property such as impact resistance, stiffness, strength, or shape retention. The Tg can be determined by differential scanning calorimetry.

The term "haze" refers to the percentage of transmitted light, which in passing through a specimen deviates from the incident beam by forward scattering. Percent (%) haze may be measured according to ASTM D1003-13.

The term "Melt Volume Rate" (MVR) or "Melt Flow Rate (MFR)" refers to the flow rate of a polymer in a melt phase as determined using the method of ASTM D1238-13. MVR is expressed in cubic centimeter per 10 minutes, and MFR is expressed in grams per 10 minutes. The higher the MVR or MFR value of a polymer at a specific temperature, the greater the flow of that polymer at that specific temperature.

The term "percent light transmission" or "% T" refers to the ratio of transmitted light to incident light, and may be measured according to ASTM D1003-13.

"Polycarbonate" as used herein refers to an oligomer or a polymer comprising residues of one or more monomers, joined by carbonate linkages.

The terms "UVA", "UVB", "UVC", and "UVV" as used herein were defined by the wavelengths of light measured with the radiometer (EIT PowerPuck) used in these studies, as defined by the manufacturer (EIT Inc., Sterling, Va.). "UV" radiation refers to wavelengths of 200 nanometers (nm) to 450 nm. UVA refers to the range from 320-390 nm, UVB to the range from 280-320 nm, UVC to the range from 250-260 nm, and UVV to the range from 395-445 nm.

The term "crosslink" and its variants refer to the formation of a stable covalent bond between two polymers/oligomers. This term is intended to encompass the formation of covalent bonds that result in network formation, or the formation of covalent bonds that result in chain extension. The term "cross-linkable" refers to the ability of a polymer/oligomer to initiate the formation of such stable covalent bonds.

The present disclosure refers to "polymers," "oligomers", and "compounds". A polymer is a large molecule composed of multiple repeating units chained together. Different molecules of a polymer will have different lengths, and so a polymer has a molecular weight that is based on the average value of the molecules (e.g. weight average or number average molecular weight). An "oligomer" has only a few repeating units, while a "polymer" has many repeating units. In this disclosure, "oligomer" refers to molecules having a weight average molecular weight (Mw) of less than 15,000, and the term "polymer" refers to molecules having an Mw of 15,000 or more, as measured by GPC using polycarbonate molecular weight standards, measured prior to any UV exposure. In a compound, all molecules have the same molecular weight. Molecular weights are reported herein in Daltons or g/mol.

Introduction

The present disclosure relates to processes for preparing articles that have desired properties. The articles are prepared from polymeric compositions comprising a photoactive additive, and optionally one or more polymeric base resins. More particularly, the photoactive additive is a cross-linkable polycarbonate resin having a photoactive group derived from a dihydroxybenzophenone. When the composition is exposed to the appropriate wavelength(s) of light, cross-linking occurs, which improves chemical and flame retardant properties compared to the base resins alone or to the composition prior to the UV irradiation. Various parameters of the cross-linkable polycarbonate resin and the polymeric composition can be varied according to model equations to obtain articles having desired properties. The cross-linkable polycarbonate resins are first discussed, then blends, then articles, then model equations for designing the properties of the articles.

Cross-linkable Polycarbonate Resins

Generally, the photoactive additives (PAA) of the present disclosure are cross-linkable polycarbonate resins that include photoactive ketone groups that are covalently linked together through one or more dihydroxy chain extenders and a carbonate precursor. The term "photoactive" refers to a moiety that, when exposed to ultraviolet light of the appropriate wavelength, crosslinks with another molecule. For example, the bisphenol-A monomer in a bisphenol-A homopolycarbonate is not considered to be photoactive, even though photo-Fries rearrangement can occur, because the atoms do not crosslink, but merely rearrange in the polymer backbone. A "ketone group" is a carbonyl group (—CO—) that is bonded to two other carbon atoms (i.e. —R—CO—R'—). An ester group and a carboxylic acid group are not a ketone group because their carbonyl group is bonded to an oxygen atom.

The photoactive additive is formed from a reaction mixture including at least a dihydroxybenzophenone, a dihydroxy chain extender, and a carbonate precursor. The dihydroxybenzophenone provides a photoactive ketone group for crosslinking. The carbonate precursor forms carbonate linkages between the dihydroxy compounds. The reaction product of this mixture is the photoactive additive, which in particular embodiments is a cross-linkable polycarbonate resin. As desired, an end-capping agent and/or additional dihydroxy chain extenders can also be included. The additional end-capping agent and the dihydroxy chain extender(s) do not have photoactive properties.

In particular embodiments, the dihydroxybenzophenone has the structure of Formula (I):

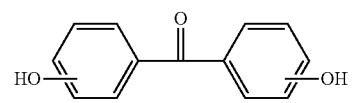

Formula (I)

The two hydroxyl groups can be located in any combination of locations, e.g. 4,4'-; 2,2'-; 2,4'-; etc. In more specific embodiments, the dihydroxybenzophenone is 4,4'-dihydroxybenzophenone (4,4'-DHBP).

The cross-linkable polycarbonate resins also include one or more dihydroxy chain extenders (depending on whether a homopolymer, copolymer or terpolymer is desired). The dihydroxy chain extender is a molecule that contains only two hydroxyl groups. It is contemplated that the dihydroxy chain extender can be a diol or a diacid. The dihydroxy chain extender is not photoactive when exposed to light. The chain extender can be used to provide a desired level of miscibility when the additive is mixed with other polymeric resins. The photoactive additive may comprise from about 75 mole % to about 99.5 mole %, or from 95 mole % to about 99 mole %, or from about 80 mole % to about 95 mole %, or from about 80 mole % to about 90 mole %, of the dihydroxy chain extender.

A first exemplary dihydroxy chain extender is a bisphenol of Formula (A):

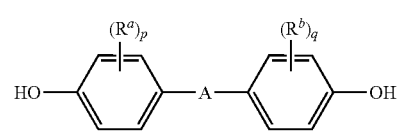

Formula (A)

wherein $R^a$ and $R^b$ each represent a halogen atom or a monovalent hydrocarbon group and may be the same or different; p and q are each independently integers of 0 to 4; and A represents one of the groups of Formula (A-1):

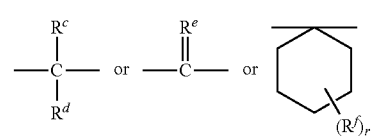

(A-1)

wherein $R^c$ and $R^d$ each independently represent a hydrogen atom or a monovalent linear or cyclic hydrocarbon group; $R^e$ is a divalent hydrocarbon group; $R^f$ is a monovalent linear hydrocarbon group; and r is an integer from 0 to 5. For example, A can be a substituted or unsubstituted $C_3$-$C_{18}$ cycloalkylidene.

Specific examples of the types of bisphenol compounds that may be represented by Formula (A) include 2,2-bis(4-hydroxyphenyl) propane ("bisphenol-A" or "BPA"), 4,4'-(1-phenylethane-1,1-diyl)diphenol or 1,1-bis(4-hydroxyphenyl)-1-phenylethane (bisphenol-AP); 1,1-bis(4-hydroxyphenyl)-3,3,5-trimethylcyclohexane) (bisphenol TMC); 1,1-bis(4-hydroxy-3-methylphenyl) cyclohexane (DMBPC); and 2,2-bis(3,5-dibromo-4-hydroxyphenyl) propane (tetrabromobisphenol-A or TBBPA).

A second exemplary dihydroxy chain extender is a bisphenol of Formula (B):

Formula (B)

wherein each $R^k$ is independently a $C_{1-10}$ hydrocarbon group, and n is 0 to 4. The halogen is usually bromine. Examples of compounds that may be represented by Formula (B) include resorcinol, 5-methyl resorcinol, 5-phenyl resorcinol, catechol; hydroquinone; and substituted hydroquinones such as 2-methyl hydroquinone.

A third exemplary dihydroxy chain extender is a bisphenolpolydiorganosiloxane of Formula (C-1) or (C-2):

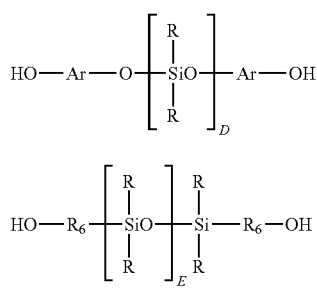

Formula (C-1)

Formula (C-2)

wherein each Ar is independently aryl; each R is independently alkyl, alkoxy, alkenyl, alkenyloxy, aryl, aryloxy, arylalkyl, or alkylaryl; each $R_6$ is independently a divalent $C_1$-$C_{30}$ organic group such as a $C_1$-$C_{30}$ alkyl, $C_1$-$C_{30}$ aryl, or $C_1$-$C_{30}$ alkylaryl; and D and E are an average value of 2 to about 1000, including from about 2 to about 500, or 10 to about 200, or more specifically about 10 to about 75.

Specific examples of Formulas (C-1) and (C-2) are illustrated below as Formulas (C-a) through (C-d):

where E is an average value from 10 to 200.

A fourth exemplary dihydroxy chain extender is an aliphatic diol of Formula (D):

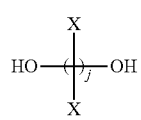

Formula (D)

wherein each X is independently hydrogen, halogen, or alkyl; and j is an integer from 1 to 20. Examples of an aliphatic diol include ethylene glycol, propanediol, 2,2-dimethyl-propanediol, 1,6-hexanediol, and 1,12-dodecanediol.

A fifth exemplary dihydroxy chain extender is a dihydroxy compound of Formula (E), which may be useful for high heat applications:

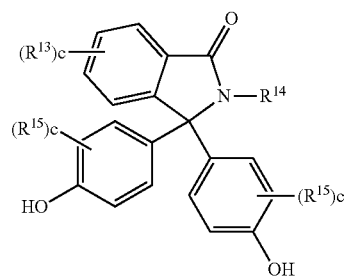

Formula (E)

wherein $R^{13}$ and $R^{15}$ are each independently halogen or $C_1$-$C_6$ alkyl, $R^{14}$ is $C_1$-$C_6$ alkyl, or phenyl substituted with up to five halogens or $C_1$-$C_6$ alkyl groups, and c is 0 to 4. In specific embodiments, $R^{14}$ is a $C_1$-$C_6$ alkyl or phenyl group; or each c is 0. Compounds of Formula (E) include 3,3-bis (4-hydroxyphenyl)-2-phenylisoindolin-1-one (PPPBP).

Another dihydroxy chain extender that might impart high Tgs to the polycarbonate has adamantane units. Such com- Formula (C-a)

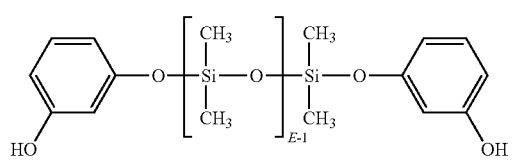

Formula (C-b)

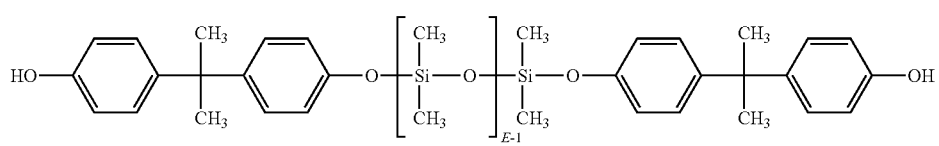

Formula (C-c)

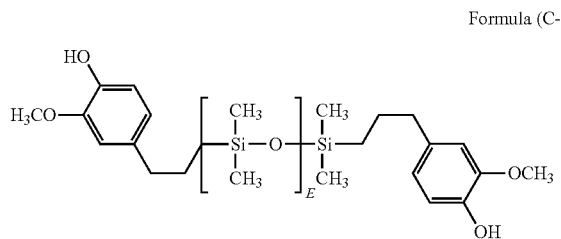

Formula (C-d)

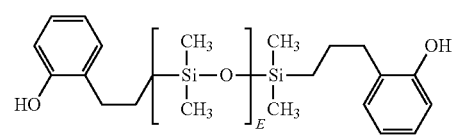

pounds may have repetitive units of the following formula (F) for high heat applications:

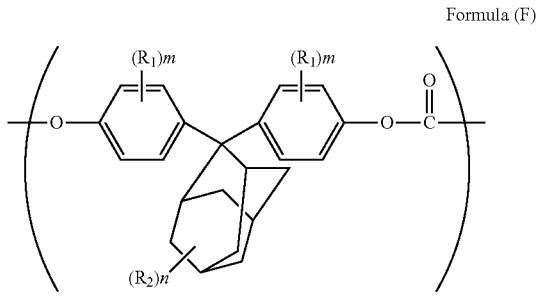

Formula (F)

wherein $R_1$ is halogen, $C_1$-$C_6$ alkyl, $C_1$-$C_6$ alkoxy, $C_6$-$C_{12}$ aryl, $C_7$-$C_{13}$ aryl-substituted alkenyl, or $C_1$-$C_6$ fluoroalkyl; $R_2$ is halogen, $C_1$-$C_{12}$ alkyl, $C_1$-$C_{12}$ alkoxy, $C_6$-$C_{12}$ aryl, $C_7$-$C_{13}$ aryl-substituted alkenyl, or $C_1$-$C_{12}$ fluoroalkyl; m is an integer of 0 to 4; and n is an integer of 0 to 14.

Another dihydroxy compound that might impart high Tgs to the polycarbonate is a fluorene-unit containing dihydroxy compound represented by the following Formula (G):

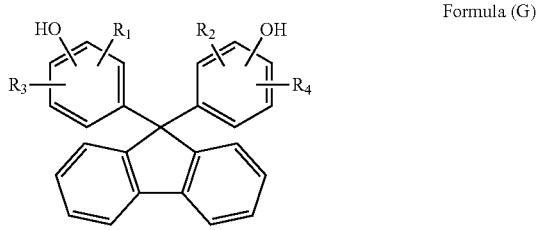

Formula (G)

wherein $R_1$ to $R_4$ are each independently hydrogen, $C_1$-$C_9$ hydrocarbon, or halogen.

Another dihydroxy chain extender that could be used is an isosorbide. A monomer unit derived from isosorbide may be an isorbide-bisphenol unit of Formula (H):

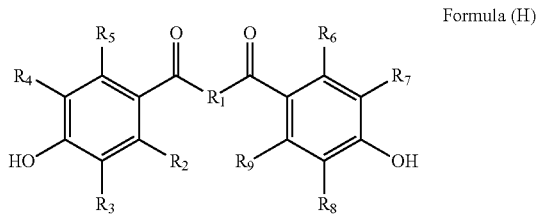

Formula (H)

wherein $R_1$ is an isosorbide unit and $R_2$-$R_9$ are each independently a hydrogen, a halogen, a $C_1$-$C_6$ alkyl, a methoxy, an ethoxy, or an alkyl ester.

The $R_1$ isosorbide unit may be represented by Formula (H-a):

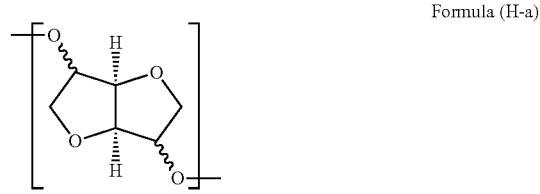

Formula (H-a)

The isosorbide unit may be derived from one isosorbide, or be a mixture of isomers of isosorbide. The stereochemistry of Formula (I) is not particularly limited. These diols may be prepared by the dehydration of the corresponding hexitols. The isosorbide-bisphenol may have a pKa of between 8 and 11.

While the compounds of Formulas (A)-(H) are diols, diacids may also be used as the dihydroxy chain extender. Some exemplary diacids include those having the structures of one of Formulas (1)-(2):

Formula (1)

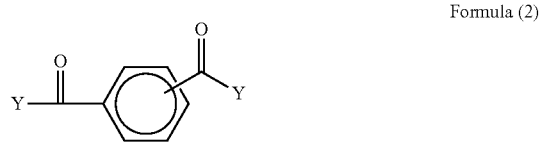

Formula (2)

where Y is hydroxyl, halogen, alkoxy, or aryloxy; and where n is 1 to 20. It should be noted that Formula (1) encompasses adipic acid (n=4), sebacic acid (n=8), and dodecanedioic acid (n=10). Similarly, Formula (2) encompasses isophthalic acid and terephthalic acid. When diacids are used, the crosslinkable polycarbonate of the present disclosure may be a polyester-polycarbonate. The molar ratio of ester units to carbonate units in the polyester-polycarbonate may be 1:99 to 99:1, specifically 10:90 to 90:10, more specifically 25:75 to 75:25.

The reaction mixture used to form the cross-linkable polycarbonate resins of the present disclosure also includes a carbonate precursor. The carbonate precursor serves as a carbonyl source. In particular, the carbonate precursor may be phosgene, or may be a diaryl carbonate. Exemplary diaryl carbonates include for example diphenyl carbonate (DPC), ditolyl carbonate, bis(chlorophenyl) carbonate, m-cresyl carbonate, and dinaphthyl carbonate, and are used in melt polymerization processes. In interfacial polymerization processes, phosgene and carbonyl halides are usually selected as the carbonate precursor.

Particularly contemplated for use in the processes of the present disclosure are phosgene and diphenyl carbonate (DPC), which are illustrated below as Formulas (3) and (4), respectively:

Formula (3)

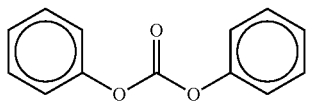

Formula (4)

The molar ratio of the benzophenone to the dihydroxy chain extender(s) can be from 1:1 to 1:200 prior to UV exposure, including from 1:2 to 1:200, or from about 1:99 to about 3:97, or from about 1:99 to about 6:94, or from about 10:90 to about 25:75 or from about 1:3 to about 1:200.

If desired, the reaction mixture can include branching agents that contain three, four, or even more functional groups. The functional groups can be, for example, hydroxyl groups or carboxylic acid groups. Generally speaking, these react in the same way as the dihydroxy chain extender. Branching agents with three hydroxyl groups include 1,1,1-trimethoxyethane; 1,1,1-trimethoxymethane; 1,1,1-tris(hydroxyphenyl) ethane (TH PE), and 1,3,5-tris[2-(4-hydroxyphenyl)-propan-2-yl]benzene. Branching agents with four hydroxyl groups include pentaerythritol and 4-[2,6,6-tris(4-hydroxyphenyl)heptan-2-yl]phenol. In other embodiments, the branching agent can be an oligomer, made from epoxidized novolac monomer, that permits the desired number of functional groups to be provided.

Branching agents having three carboxylic acid groups include benzenetricarboxylic acid, citric acid, and cyanuric chloride. Branching agents having four carboxylic acid groups include benzenetetracarboxylic acid, biphenyl tetracarboxylic acid, and benzophenone tetracarboxylic dianhydride. The corresponding acyl halides and esters of such acids are also contemplated. Oligomers containing glycidyl methacrylate monomers with styrene or methacrylate monomers are also contemplated.

An end-capping agent is generally used to terminate any polymer chains of the photoactive additive. The end-capping agent (i.e. chain stopper) can be a monohydroxy compound, a mono-acid compound, or a mono-ester compound. Exemplary endcapping agents include phenol, p-cumylphenol (PCP), resorcinol monobenzoate, p-tert-butylphenol, octylphenol, p-cyanophenol, and p-methoxyphenol. Unless modified with other adjectives, the term "end-capping agent" is used herein to denote a compound that is not photoactive when exposed to light. For example, the end-capping agent does not contain a ketone group. The photoactive additive may comprise about 0.5 mole % to about 5.0 mole % endcap groups derived from each end-capping agent, including about 1 mole % to about 3 mole %, or from about 1.7 mole % to about 2.5 mole %, or from about 2 mole % to about 2.5 mole %, or from about 2.5 mole % to about 3.0 mole % endcap groups derived from each end-capping agent.

The cross-linkable polycarbonate resins of the present disclosure can be an oligomer or a polymer. The oligomer has a weight average molecular weight (Mw) of less than 15,000, including 10,000 or less. The polymeric polycarbonates of the present disclosure have a Mw of 15,000 or higher. In particular embodiments, the Mw is between 17,000 and 80,000 Daltons, or between 17,000 and 35,000 Daltons. These molecular weights are measured prior to any UV exposure. The Mw may be varied as desired. In some particular embodiments, the Mw of the photoactive additives is about 5,000 or less.

One example of a photoactive additive is a cross-linkable polycarbonate resin shown in FIG. 1. Here, 4,4'-dihydroxybenzophenone is reacted with phosgene (carbonate precursor), bisphenol-A (dihydroxy chain extender), and p-cumylphenol (end-capping agent) to obtain the cross-linkable polycarbonate resin. A copolymer is thus formed with a weight average molecular weight and a polydispersity index, and containing carbonate linkages.

Figure 2:
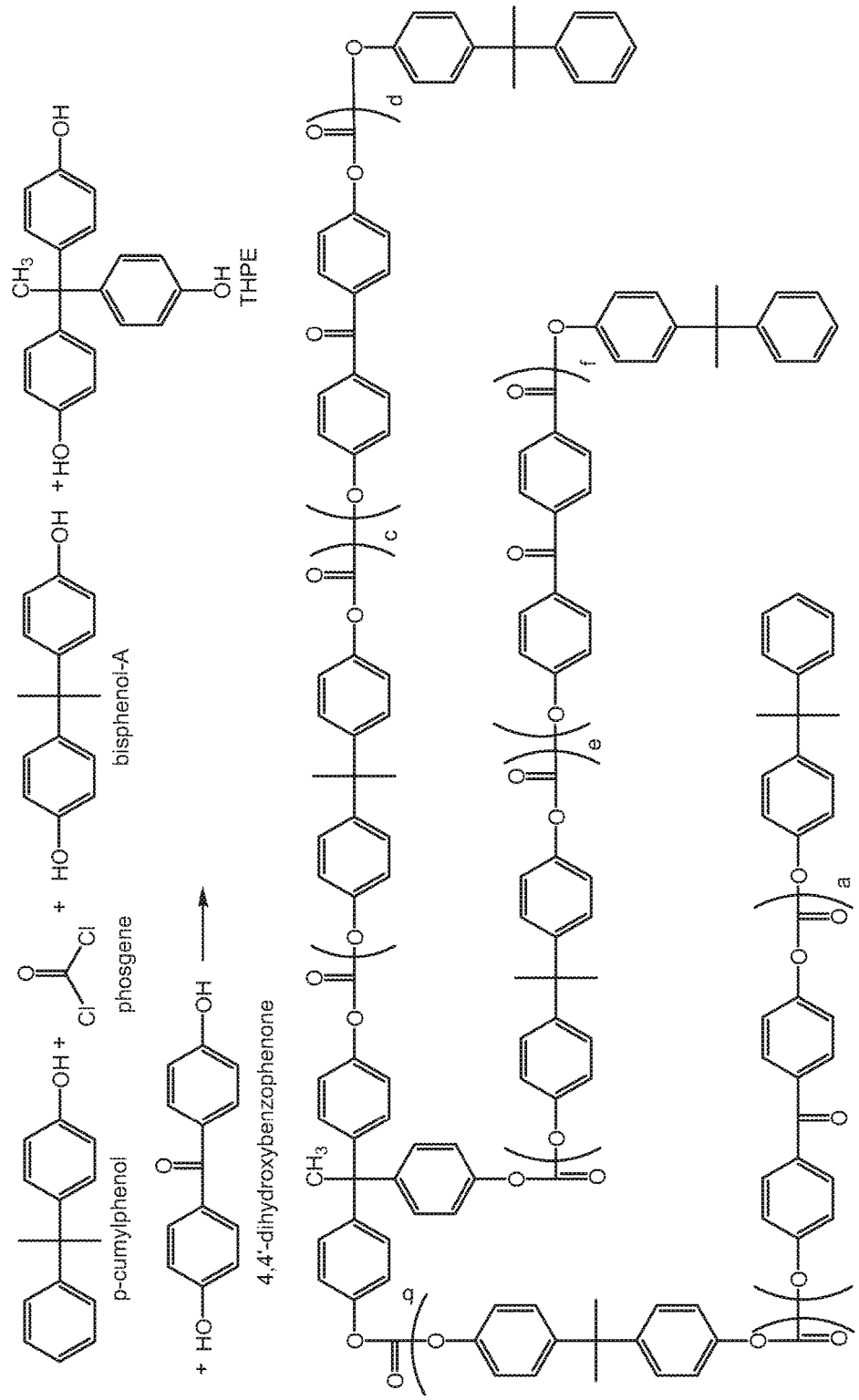
FIG. 2 illustrates the formation of a branched cross-linkable polycarbonate resin from a dihydroxybenzophenone (4,4'-dihydroxybenzophenone), a carbonate precursor (phosgene), a dihydroxy chain extender (bisphenol-A), an end-capping agent (p-cumylphenol), and a branching agent (1,1,1-tris-hydroxyphenylethane (THPE)).

FIG. 2 illustrates the formation of a branched cross-linkable polycarbonate. As illustrated here, 4,4'-dihydroxybenzophenone is reacted with phosgene (carbonate precursor), bisphenol-A (dihydroxy chain extender), p-cumylphenol (end-capping agent), and a branching agent (1,1,1-tris-hydroxyphenylethane (THPE)). A copolymer is thus formed.

Figure 3:
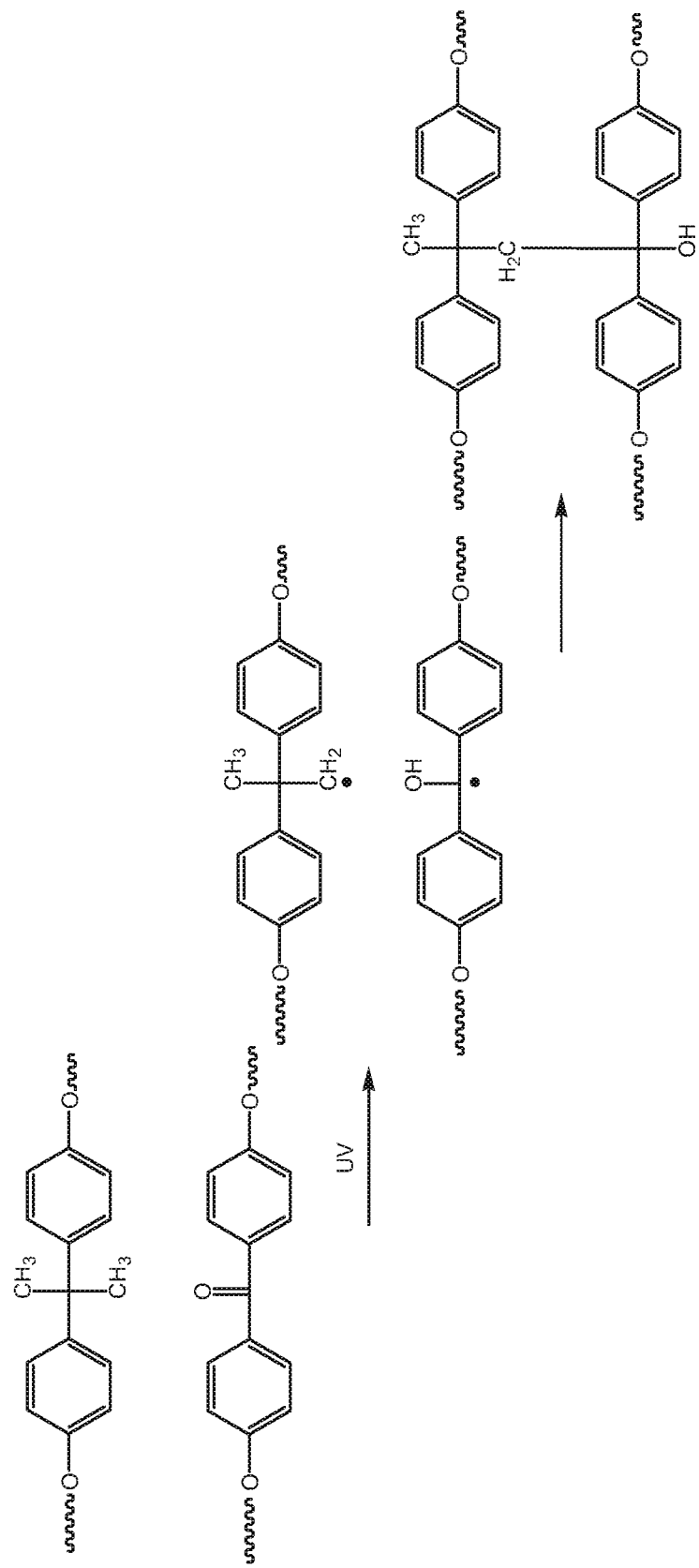
FIG. 3 illustrates the crosslinking mechanism of the cross-linkable polycarbonate.

One crosslinking mechanism of the photoactive additives is believed to be due to hydrogen abstraction by the ketone group from an alkyl group that acts as a hydrogen donor and subsequent coupling of the resulting radicals. This mechanism is illustrated in FIG. 3 with reference to a benzophenone (the photoactive moiety) and a bisphenol-A (BPA) monomer. Upon exposure to UV, the oxygen atom of the benzophenone abstracts a hydrogen atom from a methyl group on the BPA monomer and becomes a hydroxyl group. The methylene group then forms a covalent bond with the carbon of the ketone group. Put another way, the ketone group of the benzophenone could be considered to be a photoactive group. It should be noted that the presence of hydrogen is critical for this reaction to occur. Other mechanisms may occur after the initial abstraction event with base resins containing unsaturated bonds or reactive side groups.

The cross-linkable polycarbonate resin contains repeating units derived from a dihydroxybenzophenone monomer (i.e. of Formula (I)). The cross-linkable polycarbonate resin may comprise from about 0.5 mole % to about 50 mole % of repeating units derived from the dihydroxybenzophenone. In more particular embodiments, the cross-linkable polycarbonate resin comprises from about 1 mole % to about 3 mole %, or from about 1 mole % to about 5 mole %, or from about 1 mole % to about 6 mole %, or from about 5 mole % to about 20 mole %, or from about 10 mole % to about 20 mole %, or from about 0.5 mole % to about 25 mole % of repeating units derived from the dihydroxybenzophenone.

In more specific embodiments, the photoactive cross-linkable polycarbonate resin is a terpolymer formed from the reaction of a dihydroxybenzophenone, a first dihydroxy chain extender, a second dihydroxy chain extender, a carbonate precursor, and optionally one or more end-capping agents. The terpolymer contains from about 0.5 mole % to 50 mole % of repeating units derived from the dihydroxybenzophenone, from about 50 mole % to 99.5 mole % of repeating units derived from the first dihydroxy chain extender, and from about 50 mole % to 99.5 mole % of repeating units derived from the second dihydroxy chain extender. Most desirably, the dihydroxybenzophenone is 4,4'-dihydroxybenzophenone (4,4'-DHBP). Usually, the first dihydroxy chain extender is bisphenol-A. In particular embodiments, the cross-linkable polycarbonate terpolymer does not have photoactive endcaps.

Specific examples of contemplated terpolymers include those including as monomers (i) DHBP; (ii) bisphenol-A; and (iii) a third monomer selected from the group consisting of sebacic acid, a polysiloxane monomer, DMBPC, or tetrabromobisphenol-A.

In other specific embodiments, the photoactive cross-linkable polycarbonate resin is a copolymer formed from the reaction of a dihydroxybenzophenone, a first dihydroxy chain extender, a carbonate precursor, and optionally one or more end-capping agents. The copolymer contains from about 0.5 mole % to 50 mole % of repeating units derived from the dihydroxybenzophenone, and from about 50 mole % to 99.5 mole % of repeating units derived from the first dihydroxy chain extender. Most desirably, the dihydroxybenzophenone is 4,4'-dihydroxybenzophenone. In particular embodiments, the cross-linkable polycarbonate copolymer does not have photoactive endcaps. Specific examples of contemplated copolymers include a copolymer having as monomers (i) 4,4'-DHBP and (ii) bisphenol-A.

These polycarbonates, prior to cross-linking, can be provided as thermally stable high melt-flow polymers, and can thus be used to fabricate a variety of thin-walled articles (e.g., 3 mm or less). These articles are subsequently exposed to ultraviolet radiation to affect cross-linking. The cross-linked materials, in addition to flame resistance and chemical resistance, may retain or exhibit superior mechanical properties (e.g., impact resistance, ductility) as compared to the polycarbonate resin prior to cross-linking.

The cross-linkable polycarbonates of the present disclosure may have a glass transition temperature (Tg) of greater than 120° C., 125° C., 130° C., 135° C., 140° C., 145° C., 150° C., 155° C., 160° C., 165° C., 170° C., 175° C., 180° C., 185° C., 190° C., 200° C., 210° C., 220° C., 230° C., 240° C., 250° C., 260° C., 270° C., 280° C., 290° C., or 300° C., as measured using a differential scanning calorimetry method. In certain embodiments, the polycarbonates have glass transition temperatures ranging from about 120° C. to about 230° C., about 140° C. to about 160° C., about 145° C. to about 155° C., about 148° C. to about 152° C., or about 149° C. to about 151° C.

The cross-linkable polycarbonates of the present disclosure may have a weight average molecular weight (Mw) of 15,000 to about 80,000 Daltons [±1,000 Daltons], or of 15,000 to about 35,000 Daltons [±1,000 Daltons], or of about 20,000 to about 30,000 Daltons [±1,000 Daltons], or of 17,000 to about 80,000 Daltons. Molecular weight determinations may be performed using gel permeation chromatography (GPC), using a cross-linked styrene-divinylbenzene column and calibrated to polycarbonate references using a UV-VIS detector set at 264 nm. Samples may be prepared at a concentration of about 1 milligram per milliliter (mg/ml), and eluted at a flow rate of about 1.0 milliliter per minute (ml/min).

The cross-linkable polycarbonates of the present disclosure may have a polydispersity index (PDI) of about 2.0 to about 5.0, about 2.0 to about 3.0, or about 2.0 to about 2.5. The PDI is measured prior to any UV exposure.

The cross-linkable polycarbonates of the present disclosure may have a melt flow rate (MFR) of 1 to 45 grams/10 min, 6 to 15 grams/10 min, 6 to 8 grams/10 min, 6 to 12 grams/10 min, 2 to 30 grams/10 min, 5 to 30 grams/10 min, 8 to 12 grams/10 min, 8 to 10 grams/10 min, or 20 to 30 grams/10 min, using the ASTM D1238-13 method, 1.2 kg load, 300° C. temperature, 360 second dwell.

The cross-linkable polycarbonates of the present disclosure may have a biocontent of 2 wt % to 90 wt %; 5 wt % to 25 wt %; 10 wt % to 30 wt %; 15 wt % to 35 wt %; 20 wt % to 40 wt %; 25 wt % to 45 wt %; 30 wt % to 50 wt %; 35 wt % to 55 wt %; 40 wt % to 60 wt %; 45 wt % to 65 wt %; 55 wt % to 70% wt %; 60 wt % to 75 wt %; 50 wt % to 80 wt %; or 50 wt % to 90 wt %. The biocontent may be measured according to ASTM D6866-10.

The cross-linkable polycarbonates of the present disclosure may have a modulus of elasticity of greater than or equal to (≥) 2200 megapascals (MPa), ≥2310 MPa, ≥2320 MPa, ≥2330 MPa, ≥2340 MPa, ≥2350 MPa, ≥2360 MPa, ≥2370 MPa, ≥2380 MPa, ≥2390 MPa, ≥2400 MPa, ≥2420 MPa, ≥2440 MPa, ≥2460 MPa, ≥2480 MPa, ≥2500 MPa, or ≥2520 MPa as measured by ASTM D790-10 at 1.3 mm/min, 50 mm span.

In embodiments, the cross-linkable polycarbonates of the present disclosure may have a flexural modulus of 2,200 to 2,500, preferably 2,250 to 2,450, more preferably 2,300 to 2,400 MPa. In other embodiments, the cross-linkable polycarbonates of the present disclosure may have a flexural modulus of 2,300 to 2,600, preferably 2,400 to 2,600, more preferably 2,450 to 2,550 MPa. The flexural modulus is also measured by ASTM D790-10.

The cross-linkable polycarbonates of the present disclosure may have a tensile strength at break of greater than or equal to (≥) 60 megapascals (MPa), ≥61 MPa, ≥62 MPa, ≥63 MPa, ≥64 MPa, ≥65 MPa, ≥66 MPa, ≥67 MPa, ≥68 MPa, ≥69 MPa, ≥70 MPa, ≥71 MPa, ≥72 MPa, ≥73 MPa, ≥74 MPa, ≥75 MPa as measured by ASTM D638-10 Type I at 50 mm/min.

The cross-linkable polycarbonates of the present disclosure may possess a ductility of greater than or equal to (≥) 60%, ≥65%, ≥70%, ≥75%, ≥80%, ≥85%, ≥90%, ≥95%, or 100% in a notched izod test at −20° C., −15° C., −10° C., 0° C., 5° C., 10° C., 15° C., 20° C., 23° C., 25° C., 30° C., or 35° C. at a thickness of 3.2 mm according to ASTM D256-10.

The cross-linkable polycarbonates of the present disclosure may have a notched Izod impact strength (NII) of ≥500 Joules per meter (J/m), ≥550 J/m, ≥600 J/m, ≥650 J/m, ≥700 J/m, ≥750 J/m, ≥800 J/m, ≥850 J/m, ≥900 J/m, ≥950 J/m, or ≥1000 J/m, measured at 23° C. according to ASTM D256-10.

The cross-linkable polycarbonates of the present disclosure may have a heat distortion temperature of greater than or equal to 110° C., 111° C., 112° C., 113° C., 114° C., 115° C., 116° C., 117° C., 118° C., 119° C., 120° C., 121° C., 122° C., 123° C., 124° C., 125° C., 126° C., 127° C., 128° C., 129° C., 130° C., 131° C., 132° C., 133° C., 134° C., 135° C., 136° C., 137° C., 138° C., 139° C., 140° C., 141° C., 142° C., 143° C., 144° C., 145° C., 146° C., 147° C., 148° C., 149° C., 150° C., 151° C., 152° C., 153° C., 154° C., 155° C., 156° C., 157° C., 158° C., 159° C., 160, 161° C., 162° C., 163° C., 164° C., 165° C., 166° C., 167° C., 168° C., 169° C., or 170° C., as measured according to ASTM D648-07 at 1.82 MPa, with 3.2 mm thick unannealed mm bar.

The cross-linkable polycarbonates of the present disclosure may have a percent haze value of less than or equal to (≤) 10.0%, ≤8.0%, ≤6.0%, ≤5.0%, ≤4.0%, ≤3.0%, ≤2.0%, ≤1.5%, ≤1.0%, or ≤0.5% as measured at a certain thickness according to ASTM D1003-13. The polycarbonate haze may be measured at a 2.0, 2.2, 2.4, 2.54, 2.6, 2.8, 3.0, 3.2, 3.4, 3.6, 3.8, or a 4.0 millimeter thickness. The polycarbonate may be measured at a 0.125 inch thickness.

The polycarbonate may have a light transmittance greater than or equal to (≥) 50%, ≥60%, ≥65%, ≥70%, ≥75%, ≥80%, ≥85%, ≥90%, ≥95%, ≥96%, ≥97%, ≥98%, ≥99%, ≥99.1%, ≥99.2%, ≥99.3%, ≥99.4%, ≥99.5%, ≥99.6%, ≥99.7%, ≥99.8%, or ≥99.9%, as measured at certain thicknesses according to ASTM D1003-13. The polycarbonate transparency may be measured at a 2.0, 2.2, 2.4, 2.6, 2.8, 3.0, 3.2, 3.4, 3.6, 3.8, or a 4.0 millimeter thickness.

In certain embodiments, the cross-linkable polycarbonates of the present disclosure do not include soft block or soft aliphatic segments in the polycarbonate chain. For example, the following aliphatic soft segments that may be excluded from the cross-linkable polycarbonates of the present disclosure include aliphatic polyesters, aliphatic polyethers, aliphatic polythioeithers, aliphatic polyacetals, aliphatic polycarbonates, C—C linked polymers and polysiloxanes. The soft segments of aliphatic polyesters, aliphatic polyethers, aliphatic polythioeithers, aliphatic polyacetals, aliphatic polycarbonates may be characterized as having number average molecular weight (Mns) of greater than 600 Daltons.

Processes

An interfacial polycondensation polymerization process for bisphenol-A (BPA) based polycarbonates can be used to prepare the cross-linkable polycarbonates of the present disclosure. Although the reaction conditions for interfacial polymerization can vary, an exemplary process generally involves dissolving or dispersing one or more dihydric phenol reactants (e.g. bisphenol-A) in water, adding the resulting mixture to a water-immiscible solvent medium, and contacting the reactants with a carbonate precursor (e.g. phosgene) in the presence of a catalyst (e.g. triethylamine, TEA) and an acid acceptor such as an alkali metal hydroxide.

Four different processes are disclosed herein for producing some embodiments of the photoactive additive which contain carbonate linkages. Each process includes the following ingredients: one or more dihydroxy chain extenders, an end-capping agent, a carbonate precursor, a base, a tertiary amine catalyst, water, and a water-immiscible organic solvent. It should be noted that more than one of each ingredient can be used to produce the crosslinkable polycarbonates. Some information on each ingredient is first provided below.

A hydroxybenzophenone is present as the photoactive moiety, and can be present either as the end-capping agent (i.e. monohydroxybenzophenone) or as a diol (i.e. dihydroxybenzophenone). In the process descriptions below, reference will be made to dihydroxy compounds, which should be construed as including the dihydroxy chain extender and a dihydroxybenzophenone monomer. Reference will also be made to the end-capping agent, which should be construed as including a monohydroxybenzophenone.

The dihydroxy chain extender may have the structure of any one of Formulas (A)-(H) or (1)-(2), and include monomers such as bisphenol-A.

Examples of end-capping agents (other than the monohydroxybenzophenone) include phenol, p-cumylphenol (PCP), p-tert-butylphenol, octylphenol, and p-cyanophenol.

The carbonate precursor may be, for example, a carbonyl halide such as carbonyl dibromide or carbonyl dichloride (also known as phosgene), or a haloformate such as a bishaloformate of a dihydric phenol (e.g., the bischloroformate of bisphenol-A, hydroquinone, or the like) or a glycol (e.g., the bishaloformate of ethylene glycol, neopentyl glycol, polyethylene glycol, or the like). Combinations comprising at least one of the foregoing types of carbonate precursors can also be used. In certain embodiments, the carbonate precursor is phosgene, a triphosgene, diacyl halide, dihaloformate, dicyanate, diester, diepoxy, diarylcarbonate, dianhydride, diacid chloride, or any combination thereof. An interfacial polymerization reaction to form carbonate linkages may use phosgene as a carbonate precursor, and is referred to as a phosgenation reaction. The compounds of Formulas (3) or (4) are carbonate precursors.

The base is used for the regulation of the pH of the reaction mixture. In particular embodiments, the base is an alkali metal hydroxide, such as sodium hydroxide (NaOH) or potassium hydroxide (KOH).

A tertiary amine catalyst is used for polymerization. Exemplary tertiary amine catalysts that can be used are aliphatic tertiary amines such as triethylamine (TEA)), N-ethylpiperidine, 1,4-diazabicyclo[2.2.2]octane (DABCO), tributylamine, cycloaliphatic amines such as N,N-diethyl-cyclohexylamine and aromatic tertiary amines such as N,N-dimethylaniline.

Sometimes, a phase transfer catalyst is also used. Among the phase transfer catalysts that can be used are catalysts of the formula $(R^{30})_4Q^+X$, wherein each $R^{30}$ is the same or different, and is a $C_1$-$C_{10}$ alkyl group; Q is a nitrogen or phosphorus atom; and X is a halogen atom, $C_1$-$C_8$ alkoxy group, or $C_6$-$C_{18}$ aryloxy group. Exemplary phase transfer catalysts include, for example, $[CH_3(CH_2)_3]_4NX$, $[CH_3(CH_2)_3]_4PX$, $[CH_3(CH_2)_5]_4NX$, $[CH_3(CH_2)_6]_4NX$, $[CH_3(CH_2)_4]_4NX$, $CH_3[CH_3(CH_2)_3]_3NX$, and $CH_3[CH_3(CH_2)_2]_3NX$, wherein X is Cl⁻, Br⁻, a $C_1$-$C_8$ alkoxy group or a $C_6$-$C_{18}$ aryloxy group, such as methyltributylammonium chloride.

The most commonly used water-immiscible solvents include methylene chloride, 1,2-dichloroethane, chlorobenzene, toluene, and the like.

In the first process, sometimes referred to as the "upfront" process, the diol(s), end-capping agent, catalyst, water, and water-immiscible solvent are combined upfront in a vessel to form a reaction mixture. The reaction mixture is then exposed to the carbonate precursor, for example by phosgenation, while the base is co-added to regulate the pH, to obtain the photoactive additive.

The pH of the reaction mixture is usually from about 8.5 to about 10, and can be maintained by using a basic solution (e.g. aqueous NaOH). The reaction mixture is then charged with the carbonate precursor, which is usually phosgene. The carbonate precursor is added to the reaction mixture over a period of about 15 minutes to about 45 minutes. While the carbonate precursor is being added, the pH is also maintained in the range of about 8.5 to about 10, again by addition of a basic solution as needed. The cross-linkable polycarbonate is thus obtained, and is then isolated from the reaction mixture.

In the second process, also known as the "solution addition" process, the diol(s), tertiary amine catalyst, water, and water-immiscible solvent are combined in a vessel to form a reaction mixture. The total charge of the carbonate precursor is then added to this reaction mixture in the vessel over a total time period, while the base is co-added to regulate the pH. The carbonate precursor is first added to the reaction mixture along with the base to regulate the pH for a first time period. After the first time period ends, the end-capping agent is added in a controlled manner to the reaction mixture, also referred to as programmed addition. The addition of the end-capping agent occurs for a second time period after the first time period, rather than as a bolus at the beginning of the reaction (as in the upfront process). The carbonate precursor and the base are also added concurrently with the end-capping agent during the second time period. After the second time period ends, the remainder of the carbonate precursor continues uninterrupted for a third time period until the total charge is reached. The base is also co-added during the third time period to regulate the reaction pH. The pH of the reaction mixture is usually from about 8.5 to about 10, and can be maintained by using a basic solution (e.g. aqueous NaOH, made from the base). The end-capping agent is not added during either the first time period or the third time period. The photoactive additive is thus obtained. The main difference between the first and second processes is in the addition of the end-capping agent over time.

In the second process, the carbonate precursor is added to the reaction mixture over a total time period, which may be for example from about 15 minutes to about 45 minutes. The total time period is the duration needed to add the total charge of the carbonate precursor (measured either by weight or by moles) to the reaction mixture. It is contemplated that the carbonate precursor is added at a constant rate over the total time period. The carbonate precursor is first added to the reaction mixture along with the base to regulate the pH for a first time period, ranging from about 2 minutes to about 20 minutes. Then, during a second time period, the end-capping agent is added to the reaction mixture concurrently with the carbonate precursor and the base. It is contemplated that the end-capping agent is added at a constant rate during this second time period, which can range from about 1 minute to about 5 minutes. After the second time period ends, the remaining carbonate precursor is charged to the reaction mixture for a third time period, along with the base to regulate the reaction pH. The cross-linkable polycarbonate is thus obtained, and is then isolated from the reaction mixture.

The total time period for the reaction is the sum of the first time period, the second time period, and the third time period. In particular embodiments, the second time period in which the solution containing the end-capping agent is added to the reaction mixture begins at a point between 10% to about 40% of the total time period. Put another way, the first time period is 10% of the total time period.

For example, if 2400 grams of phosgene were to be added to a reaction mixture at a rate of 80 g/min, and 500 ml of a PCP solution were to be added to the reaction mixture at a rate of 500 ml/min after an initial charge of 240 grams of phosgene, then the total time period would be 30 minutes, the first time period would be three minutes, the second time period would be one minute, and the third period would be 26 minutes.

The third process is also referred to as a bis-chloroformate or chlorofomate (BCF) process. Chloroformate oligomers are prepared by reacting a carbonate precursor, specifically phosgene, with the diol(s) in the absence of the tertiary amine catalyst, while the base is co-added to regulate the pH. The chloroformate oligomers can contain a mixture of monochloroformates, bischloroformates, and bisphenol terminated oligomers. After the chloroformate oligomers are generated, the phosgene can optionally be allowed to substantially condense or hydrolyze, then the end-capping agent is added to the chloroformate mixture. The reaction is allowed to proceed, and the tertiary amine catalyst is added to complete the reaction. The pH of the reaction mixture is usually from about 8.5 to about 10 prior to the addition of the phosgene. During the addition of the phosgene, the pH is maintained between about 6 and about 8, by using a basic solution (e.g. aqueous NaOH).

The fourth process uses a tubular reactor. In the tubular reactor, the end-capping agent is pre-reacted with a carbonate precursor (specifically phosgene) to form chloroformates. The water-immiscible solvent is used as a solvent in the tubular reactor. In a separate reactor, the diol(s), tertiary amine catalyst, water, and water-immiscible solvent are combined to form a reaction mixture. The chloroformates in the tubular reactor are then fed into the reactor over a first time period along with additional carbonate precursor to complete the reaction while the base is co-added to regulate the pH. During the addition of the chloroformates, the pH is maintained between about 8.5 and about 10, by using a basic solution (e.g. aqueous NaOH).

The resulting cross-linkable polycarbonate formed by any of these processes contains only a small amount of low-molecular-weight components. This can be measured in two different ways: the level of diarylcarbonates (DAC) and the lows percentage can be measured. Diarylcarbonates are formed by the reaction of two end-capping agents with phosgene, creating a small molecule. In embodiments, the resulting photoactive additive contains less than 1000 ppm of diarylcarbonates. The lows percentage is the percentage by weight of oligomeric chains having a molecular weight of less than 1000. In embodiments, the lows percentage is 2.0 wt % or less, including from about 1.0 wt % to 2.0 wt %. The DAC level and the lows percentage can be measured by high performance liquid chromatography (HPLC) or gel permeation chromatography (GPC). Also of note is that the resulting photoactive additive does not contain any residual pyridine, because pyridine is not used in the manufacture of the photoactive additive.

Blends with Second Polymer Resin

The photoactive additive can be blended with a polymeric base resin that is different from the photoactive additive, i.e. a second polymer resin, to form the polymeric compositions/blends of the present disclosure. More specifically, the second polymer resin does not contain photoactive groups. In embodiments, the weight ratio of the cross-linkable polycarbonate resin to the polymeric base resin is from 1:99 to 99:1. The weight ratio of the cross-linkable polycarbonate resin to the polymeric base resin may be from about 50:50 to about 95:5, or from about 10:90 to about 85:15, or from about 25:75 to about 50:50. The polymeric base resin has, in specific embodiments, a weight-average molecular weight of about 21,000 or greater, including from about 21,000 to about 40,000.

The cross-linkable polycarbonate resins are suitable for blending with polycarbonate homopolymers, polycarbonate copolymers, and polycarbonate blends. They are also suitable for blending with polyesters, polyarylates, polyestercarbonates, and polyetherimides.

The blends may comprise one or more distinct cross-linkable polycarbonates, as described herein, and/or one or more cross-linked polycarbonate(s). The blends also comprise one or more additional polymers. The blends may comprise additional components, such as one or more additives. In certain embodiments, a blend comprises a cross-linkable and/or cross-linked polycarbonate (Polymer A) and a second polymer (Polymer B), and optionally one or more additives. In another embodiment, a blend comprises a combination of a cross-linkable and/or cross-linked polycarbonate (Polymer A); and a second polycarbonate (Polymer B), wherein the second polycarbonate is different from the first polycarbonate.

The second polymer (Polymer B) may be any polymer different from the first polymer that is suitable for use in a blend composition. In certain embodiments, the second polymer may be a polyester, a polyestercarbonate, a bisphenol-A homopolycarbonate, a polycarbonate copolymer, a tetrabromobisphenol-A polycarbonate copolymer, a polysiloxane-co-bisphenol-A polycarbonate, a polyesteramide, a polyimide, a polyetherimide, a polyamideimide, a polyether, a polyethersulfone, a polyepoxide, a polylactide, a polylactic acid (PLA), or any combination thereof.

In certain embodiments, the polymeric base resin may be a vinyl polymer, a rubber-modified graft copolymer, an acrylic polymer, polyacrylonitrile, a polystyrene, a polyolefin, a polyester, a polyesteramide, a polysiloxane, a polyurethane, a polyamide, a polyamideimide, a polysulfone, a polyepoxide, a polyether, a polyimide, a polyetherimide, a polyphenylene ether, a polyphenylene sulfide, a polyether ketone, a polyether ether ketone, an acrylonitrile-butadiene-styrene (ABS) resin, an acrylic-styrene-acrylonitrile (ASA) resin, a polyethersulfone, a polyphenylsulfone, a poly(alkenylaromatic) polymer, a polybutadiene, a polyacetal, a polycarbonate, a polyphenylene ether, an ethylene-vinyl acetate copolymer, a polyvinyl acetate, a liquid crystal polymer, an ethylene-tetrafluoroethylene copolymer, an aromatic polyester, a polyvinyl fluoride, a polyvinylidene fluoride, a polyvinylidene chloride, tetrafluoroethylene, a polylactide, a polylactic acid (PLA), a polycarbonate-polyorganosiloxane block copolymer, or a copolymer comprising: (i) an aromatic ester, (ii) an estercarbonate, and (iii) carbonate repeat units. The blend composition may comprise additional polymers (e.g. a third, fourth, fifth, sixth, etc., polymer).

In certain embodiments, the polymeric base resin may be a homopolycarbonate, a copolycarbonate, a polycarbonate-polysiloxane copolymer, a polyester-polycarbonate, or any combination thereof. In certain embodiments, the polymeric base resin is a p-cumyl phenol capped poly(isophthalate-terephthalate-resorcinol ester)-co-(bisphenol-A carbonate) copolymer. In certain embodiments, the polymeric base resin is a polycarbonate-polysiloxane copolymer.

The p-cumyl phenol capped poly(isophthalate-terephthalate-resorcinol ester)-co-(bisphenol-A carbonate) polymer or a polycarbonate-polysiloxane copolymer may have a polysiloxane content from 0.4 wt % to 25 wt %. In one preferred embodiment, the polymeric base resin is a p-cumylphenol capped poly(19 mole % isophthalate-terephthalate-resorcinol ester)-co-(75 mole % bisphenol-A carbonate)-co-(6 mole % resorcinol carbonate) copolymer (Mw=29,000 Daltons). In another preferred embodiment, the polymeric base resin is a p-cumylphenol capped poly(10 wt % isophthalate-terephthalate-resorcinol ester)-co-(87 wt % bisphenol-A carbonate)-co-(3 mole % resorcinol carbonate) copolymer (Mw=29,000 Daltons).

In another preferred embodiment, the polymeric base resin is a polycarbonate polysiloxane copolymer. The polycarbonate-polysiloxane copolymer may be a siloxane block co-polycarbonate comprising from about 4 wt % siloxane (±10%) to about 25 wt % siloxane (±10%) and having a siloxane chain length of 10 to 200. In another preferred embodiment, the polymeric base resin is a PC-siloxane copolymer with 20% siloxane segments by weight.

In another preferred embodiment, the polymeric base resin is a p-cumylphenol capped poly(65 mole % BPA carbonate)-co-(35 mole % 3,3-bis(4-hydroxyphenyl)-2-phenylisoindolin-1-one (PPPBP) carbonate) copolymer (Mw=25,000 Daltons).

In another preferred embodiment, the polymeric base resin is a polyphosphonate polymer, a polyphosphonate copolymer, or a poly(polyphosphonate)-co-(BPA carbonate) copolymer.

In yet other embodiments, the polymer resin in the blend is selected from the group consisting of a polycarbonate-polysiloxane copolymer; a polycarbonate resin having an aliphatic chain containing at least two carbon atoms as a repeating unit in the polymer backbone; a copolyester polymer; a bisphenol-A homopolycarbonate; a polystyrene polymer; a poly(methyl methacrylate) polymer; a thermoplastic polyester; a polybutylene terephthalate polymer; a methyl methacrylate-butadiene-styrene copolymer; an acrylonitrile-butadiene-styrene copolymer; a dimethyl bisphenol cyclohexane-co-bisphenol-A copolymer; a polyetherimide; a polyethersulfone; and a copolycarbonate of bisphenol-A and 1,1-bis(4-hydroxyphenyl)-3,3,5-trimethylcyclohexane) (BPTMC).

In particular embodiments, the polymer resin in the blend is a polycarbonate-polysiloxane (PC—Si) copolymer. The polycarbonate units of the copolymer are derived from dihydroxy compounds having the structures of any of the formulas described above, but particularly those of the chain extenders of Formulas (A) and (B). Some illustrative examples of suitable dihydroxy compounds include the following: 1,1-bis(4-hydroxyphenyl) methane, 1,1-bis(4-hydroxyphenyl) ethane, 2,2-bis(4-hydroxyphenyl) propane (hereinafter "bisphenol-A" or "BPA"), 2,2-bis(4-hydroxyphenyl) butane, 2,2-bis(4-hydroxyphenyl) octane, 1,1-bis(4-hydroxyphenyl) propane, 1,1-bis(4-hydroxyphenyl) n-butane, 2,2-bis(4-hydroxy-1-methylphenyl) propane, and 1,1-bis(4-hydroxy-t-butylphenyl) propane; resorcinol, substituted resorcinol compounds such as 5-methyl resorcinol, 5-phenyl resorcinol, or 5-cumyl resorcinol; catechol; hydroquinone; and substituted hydroquinones such as 2-methyl hydroquinone, 2-t-butyl hydroquinone, 2-phenyl hydroquinone, 2-cumyl hydroquinone, or 2,3,5,6-tetramethyl hydroquinone. Bisphenol-A is often part of the PC—Si copolymer.

The polymer resin (polymer B) in the blend can be a polycarbonate resin having an aliphatic chain containing at least two carbon atoms as a repeating unit in the polymer backbone. This resin can also be considered a "soft segment polycarbonate" (SSP) resin. Generally speaking, the SSP resin is a copolymer of an aromatic difunctional compound and an aliphatic difunctional compound. The aromatic difunctional compound may have the structure of, for example, any of Formulas (A)-(H), previously described as chain extenders above. In specific embodiments, the aromatic difunctional compound is a bisphenol of Formula (A). The aliphatic difunctional compound provides a long aliphatic chain in the backbone and may have the structure of Formula (D). Exemplary aliphatic diols that are useful in SSP resins include adipic acid (n=4), sebacic acid (n=8), and dodecanedioic acid (n=10). The SSP resin can be formed, for example by the phosgenation of bisphenol-A, sebacic acid, and p-cumyl phenol. The SSP resin contains carbonate linkages and ester linkages.

In this regard, it is believed that the cross-linking reaction rate of the cross-linkable polycarbonate resin and its yield are directly related to the hydrogen-to-ketone ratio of the polymeric blend. Thus, the higher the hydrogen-to-ketone ratio of the blend, the higher the rate of chain-extension reaction/crosslinking should be. Due to the presence of the hydrogen-rich SSP resin with its aliphatic blocks, the hydrogen-to-ketone ratio is relatively high. As a result, the cross-linking density and the resulting flame retardance and chemical resistance should be very good for this blend. In addition, the SSP resin has very good flow properties. It is believed that the blend should also have good flow, and should also retain its ductile properties even after crosslinking.

The polymer resin (polymer B) in the blend can be a bisphenol-A homopolycarbonate. Such resins are available, for example as LEXAN™ from SABIC Innovative Plastics.

The polymer resin (polymer B) in the blend can be a polystyrene polymer. Such polymers contain only polystyrene monomers. Thus, for example ABS and MBS should not be considered polystyrene polymers.

The polymer resin (polymer B) in the blend can be a thermoplastic polyester. An exemplary polyester is PCTG, which is a copolymer derived from the reaction of terephthalic acid, ethylene glycol, and cyclohexanedimethanol (CHDM). The PCTG copolymer can contain 40-90 mole % CHDM, with the terephthalic acid and the ethylene glycol making up the remaining 10-60 mole %.

The polymer resin (polymer B) in the blend can be a dimethyl bisphenol cyclohexane-co-bisphenol-A copolymer, i.e. a DMBPC-BPA copolymer. The DMBPC is usually from 20 mole % to 90 mole % of the copolymer, including 25 mole % to 60 mole %. The BPA is usually from 10 mole % to 80 mole % of the copolymer, including 40 mole % to 75 mole %. These resins have high scratch resistance.

Other Additives

Other conventional additives can also be added to the polymeric composition (e.g. an impact modifier, UV stabilizer, colorant, flame retardant, heat stabilizer, plasticizer, lubricant, mold release agent, filler, reinforcing agent, antioxidant agent, antistatic agent, blowing agent, or radiation stabilizer).

In preferred embodiments, the blend compositions disclosed herein comprise a flame-retardant, a flame retardant additive, and/or an impact modifier. The flame-retardant may be potassium perfluorobutane sulfonate (Rimar salt), potassium diphenyl sulfone-3-sulfonate (KSS), or a combination thereof.

Various types of flame retardants can be utilized as additives. This includes flame retardant salts such as alkali metal salts of perfluorinated $C_1$-$C_{16}$ alkyl sulfonates such as potassium perfluorobutane sulfonate (Rimar salt), potassium perfluoroctane sulfonate, tetraethylammonium perfluorohexane sulfonate, potassium diphenylsulfone sulfonate (KSS), and the like, sodium benzene sulfonate, sodium toluene sulfonate (NATS) and the like. Rimar salt and KSS and NATS, alone or in combination with other flame retardants, are particularly useful in the compositions disclosed herein. In certain embodiments, the flame retardant does not contain bromine or chlorine, i.e. is non-halogenated. Another useful class of flame retardant is the class of cyclic siloxanes having the general formula $[(R)_2SiO]_y$, wherein R is a monovalent hydrocarbon or fluorinated hydrocarbon having from 1 to 18 carbon atoms and y is a number from 3 to 12. A particularly useful cyclic siloxane is octaphenylcyclotetrasiloxane.

Exemplary heat stabilizer additives include, for example, organophosphites such as triphenyl phosphite, tris-(2,6-dimethylphenyl)phosphite, tris-(mixed mono- and di-nonylphenyl)phosphite or the like; phosphonates such as dimethylbenzene phosphonate or the like; phosphates such as trimethyl phosphate, or the like; or combinations comprising at least one of the foregoing heat stabilizers. Heat stabilizers are generally used in amounts of 0.0001 to 1 part by weight, based on 100 parts by weight of the polymer component of the polymeric blend/composition.

Mold release agent (MRA) will allow the material to be removed quickly and effectively. Mold releases can reduce cycle times, defects, and browning of finished product. Exemplary MRAs include phthalic acid esters; di- or polyfunctional aromatic phosphates such as resorcinol tetraphenyl diphosphate (RDP), the bis(diphenyl) phosphate of hydroquinone and the bis(diphenyl) phosphate of bisphenol-A; pentaerythritol tetrastearate (PETS), and the like. Such materials are generally used in amounts of 0.001 to 1 part by weight, specifically 0.01 to 0.75 part by weight, more specifically 0.1 to 0.5 part by weight, based on 100 parts by weight of the polymer component of the polymeric blend/composition.

In particular embodiments, the polymeric blend/composition includes the cross-linkable polycarbonate resin, an optional polymeric base resin, and a flame retardant which is Rimar salt and which is present in an amount of about 0.05 wt % to about 0.085 wt %, based on the total weight of the composition; and a plaque comprising the polymeric composition has a transparency of 70 to 90% at a thickness of 3.2 mm, measured according to ASTM D1003-13.

In other particular embodiments, the polymeric blend/composition includes the cross-linkable polycarbonate resin, an optional polymeric base resin, a flame retardant; a heat stabilizer, and a mold release agent.

The additives, when used, can improve various properties of the final article. Increased chemical resistance may be found against 409 Glass and Surface Cleaner; Alcohol Prep Pad; CaviCide liquid/CaviWipes; CaviWipes; Cidex Plus liquid; Clorox Bleach; Clorox Wipes; Envirocide liquid; ForPro liquid; Gentle dish soap and water; Hydrogen Peroxide Cleaner Disinfectant Wipes; Isopropyl Alcohol wipes; MadaCide-1 liquid; Mar-V-Cide liquid to dilute; Sani-Cloth Bleach Wipes; Sani-Cloth HB Wipes; Sani-Cloth Plus Wipes; Sodium Hypochlorite liquid; Super Sani-Cloth Wipes; Viraguard liquid and Wipes; Virex 256; Windex Blue; Fuel C; Toluene; Heptane; Ethanol; Isopropanol; Windex; Engine oil; WD40; Transmission fluid; Break fluid; Glass wash; Diesel; Gasoline; Banana Boat Sunscreen (SPF 30); Sebum; Ivory Dish Soap; SC Johnson Fantastik Cleaner; French's Yellow Mustard; Coca-Cola; 70% Isopropyl Alcohol; Extra Virgin Olive Oil; Vaseline Intensive Care Hand Lotion; Heinz Ketchup; Kraft Mayonnaise; Chlorox Formula 409 Cleaner; SC Johnson Windex Cleaner with Ammonia; Acetone; Artificial Sweat; Fruits & Passion Cucina Coriander & Olive Hand Cream; Loreal Studioline Megagel Hair Gel; Maybelline Lip Polish; Maybelline Expert Wear Blush—Beach Plum Rouge; Purell Hand Sanitizer; Hot coffee, black; iKlear; Chlorox Wipes; Squalene; Palmitic Acid; Oleic Acid; Palmitoleic Acid; Stearic Acid; and Olive Oil.

Articles

The compositions/blends can be molded into useful shaped articles by a variety of means such as injection molding, overmolding, co-injection molding, extrusion, multilayer extrusion, rotational molding, blow molding and thermoforming to form articles. This includes thin-walled articles, including highly transparent thin-walled articles. The formed articles may be subsequently subjected to cross-linking conditions (e.g., UV-radiation) to affect cross-linking of the polycarbonates. Exemplary articles include a film, a sheet, a layer of a multilayer film, or a layer of a multilayer sheet.

Articles that may be formed from the compositions/blends include various components for cell phones and cell phone covers, components for computer housings (e.g. mouse covers), fibers, computer housings and business machine housings and parts such as housings and parts for monitors, computer routers, copiers, desk top printers, large office/industrial printers handheld electronic device housings such as computer or business machine housings, housings for hand-held devices, components for light fixtures or home or office appliances, humidifier housings, thermostat control housings air conditioner drain pans, outdoor cabinets, telecom enclosures and infrastructure, Simple Network Intrusion Detection System (SNIDS) devices, network interface devices, smoke detectors, components and devices in plenum spaces, components for medical applications or devices such as medical scanners, X-ray equipment, and ultrasound devices, components for interior or exterior components of an automobile, lenses (auto and non-auto) such as components for film applications, greenhouse components, sun room components, fire helmets, safety shields, safety goggles, glasses with impact resistance, fendors, gas pumps, films for televisions, such as ecofriendly films having no halogen content, solar application materials, glass lamination materials, fibers for glass-filled systems, hand held electronic device enclosures or parts (e.g. walkie-talkie, scanner, media/MP3/MP4 player, radio, GPS system, ebook, tablet), wearable electronic devices (e.g. smart watch, training/tracking device, activity/sleep monitoring system, wristband, or glasses), hand held tool enclosures or parts, smart phone enclosures or parts, turbine blades (e.g., wind turbines), and the like.

In certain embodiments, articles that may comprise the composition/blend include automotive bumpers, other automotive, construction and agricultural equipment exterior components, automobile mirror housings, an automobile grille, an automobile pillar, automobile wheel covers, automobile, construction and agricultural equipment instrument panels and trim, construction and agricultural grilles, automobile glove boxes, automobile door hardware and other interior trim, automobile construction and agricultural equipment exterior lights, automobile parts within the engine compartment, plumbing equipment, valves and pumps, air conditioning heating and cooling parts, furnace and heat pump parts, computer parts, electronics parts, projector parts, electronic display parts, copier parts, scanner parts, electronic printer toner cartridges, hair driers, irons, coffee makers, toasters, washing machines, microwaves, ovens, power tools, electric components, lighting parts, dental instruments and equipment, medical instruments, cookware, medical instrument trays, animal cages, fibers, laser welded medical devices, hand held electronic device enclosures or parts (e.g. walkie-talkie, scanner, media/MP3/MP4 player, radio, GPS system, ebook, tablet), wearable electronic devices (e.g. smart watch, training/tracking device, activity/sleep monitoring system, wristband, or glasses), hand held tool enclosures or parts, smart phone enclosures or parts, and fiber optics.

In certain embodiments, articles that may comprise the composition/blend include automotive bumpers, other automotive exterior components, automobile mirror housings, an automobile grille, an automobile pillar, automobile wheel covers, automobile instrument panels and trim, automobile glove boxes, automobile door hardware and other interior trim, external automobile trim parts, such as pillars, automobile exterior lights, automobile parts within the engine compartment, an agricultural tractor or device part, a construction equipment vehicle or device part, a construction or agricultural equipment grille, a marine or personal water craft part, an all-terrain vehicle or all-terrain vehicle part, plumbing equipment, valves and pumps, air conditioning heating and cooling parts, furnace and heat pump parts, computer parts, electronics parts, projector parts, electronic display parts, copier parts, scanner parts, electronic printer toner cartridges, hair driers, irons, coffee makers, toasters, washing machines, microwaves, ovens, power tools, electric components, electric enclosures, lighting parts, dental instruments, medical instruments, medical or dental lighting parts, an aircraft part, a train or rail part, a seating component, sidewalls, ceiling parts, cookware, medical instrument trays, animal cages, fibers, laser welded medical devices, fiber optics, lenses (auto and non-auto), cell phone parts, greenhouse components, sun room components, fire helmets, safety shields, safety glasses, gas pump parts, hand held electronic device enclosures or parts (e.g. walkie-talkie, scanner, media/MP3/MP4 player, radio, GPS system, ebook, tablet), wearable electronic devices (e.g. smart watch, training/tracking device, activity/sleep monitoring system, wristband, or glasses), hand held tool enclosures or parts, smart phone enclosures or parts, and turbine blades.

In certain embodiments, the article is one that requires or must include a material having a UL94 5VA rating performance. Articles that require a UL94 5VA rating include, but are not limited to, computer housings, computer housings and business machine housings and parts such as housings and parts for monitors, computer routers, copiers, desk top printers, large office/industrial printers, handheld electronic device housings such as computer or business machine housings, housings for hand-held devices, components for light fixtures including LED fixtures or home or office appliances, humidifier housings, thermostat control housings, air conditioner drain pans, outdoor cabinets, telecom enclosures and infrastructure, Simple Network Intrusion Detection System (SNIDS) devices, network interface devices, smoke detectors, components and devices in plenum spaces, components for medical applications or devices such as medical scanners, X-ray equipment, and ultrasound devices, electrical boxes and enclosures, and electrical connectors.

In certain embodiments, the article is one that requires hydrothermal stability, such as a wind turbine blade, a steam sterilizable medical device, a food service tray, utensils and equipment.

In certain embodiments, the article is one that requires a combination of transparency, flame resistance, and/or impact resistance. For example, in certain embodiments the article may be a safety shield, safety goggles, a gas/fuel pump housing, a display window or part, or the like.

Ultraviolet Irradiation

After forming the article, the article can then be exposed to ultraviolet (UV) light at an appropriate wavelength and dosage to bring about the desired amount of crosslinking for the given application. The UV exposure can be performed on one or more surfaces of the article.

The article should be exposed with a substantially uniform dose of UV light. The exposure can be accomplished using standard methods. The UV light can come from any source of UV light such as mercury vapor, High-Intensity Discharge (HID), or various UV lamps. The exposure time can range from a few minutes to several days. Examples of UV-emitting light bulbs include mercury bulbs (H bulbs), or metal halide doped mercury bulbs (D bulbs, H+ bulbs, and V bulbs). Other combinations of metal halides to create a UV light source are also contemplated. A mercury arc lamp is not used for irradiation. An H bulb has strong output in the range of 200 nm to 320 nm. The D bulb has strong output in the 320 nm to 400 nm range. The V bulb has strong output in the 400 nm to 420 nm range. It may also be advantageous to use a UV light source where the harmful wavelengths are removed or not present, using filters.

It may also be advantageous to use a UV light source where the harmful wavelengths (those that cause polymer degradation or excessive yellowing) are removed or not present. Equipment suppliers such as Heraeus Noblelight and Fusion UV provide lamps with various spectral distributions. The light can also be filtered to remove harmful or unwanted wavelengths of light. This can be done with optical filters that are used to selectively transmit or reject a wavelength or range of wavelengths. These filters are commercially available from a variety of companies such as Edmund Optics or Praezisions Glas & Optik GmbH. Bandpass filters are designed to transmit a portion of the spectrum, while rejecting all other wavelengths. Longpass edge filters are designed to transmit wavelengths greater than the cut-on wavelength of the filter. Shortpass edge filters are used to transmit wavelengths shorter than the cut-off wavelength of the filter. Various types of materials, such as borosilicate glass, can be used as a long pass filter. Schott and/or Praezisions Glas & Optik GmbH for example have the following long pass filters: WG225, WG280, WG295, WG305, WG320 which have cut-on wavelengths of ~225, 280, 295, 305, and 320 nm, respectively. These filters can be used to screen out the harmful short wavelengths while transmitting the appropriate wavelengths for the crosslinking reaction.

In particular embodiments, the polycarbonates are exposed to a selected UV light range having wavelengths from about 280 nanometers (nm) to about 380 nm, or from about 330 nm to about 380 nm, or from about 280 nm to about 360 nm, or from about 330 nm to about 360 nm. The wavelengths in a "selected" light range have an internal transmittance of greater than 50%, with wavelengths outside of the range having an internal transmittance of less than 50%. The change in transmittance may occur over a range of 20 nm. Reference to a selected light range should not be construed as saying that all wavelengths within the range transmit at 100%, or that all wavelengths outside the range transmit at 0%.

In some embodiments, the UV radiation is filtered to provide exposure to UVA radiation with no detectable UVC radiation, as measured using an EIT PowerPuck. The effective dosage can range from at least 2 Joules per square centimeter ($J/cm^2$) of UVA radiation up to about 60 $J/cm^2$ of UVA radiation. In more specific embodiments, the UV radiation is filtered to provide an effective dosage of at least 3 $J/cm^2$, or at least 12 $J/cm^2$, or at least 21 $J/cm^2$, or at least 36 $J/cm^2$ of UVA radiation, with no detectable UVC radiation, as measured using an EIT PowerPuck. In particular embodiments, the polycarbonates are exposed to a dosage of about 21 $J/cm^2$ to about 60 $J/cm^2$ of UVA radiation, or in more particular embodiments a dosage of about 21 $J/cm^2$ to about 36 $J/cm^2$ of UVA radiation.

The exposed article will have a cross-linked outer surface and an inner surface that is either lightly cross-linked or not cross-linked. The outer surface can be cross-linked to such a degree that the outer surface is substantially insoluble in the common solvents for the starting resins. The percentage of the insolubles (insoluble component) will be dependent on the part geometry and surface-to-volume ratio.

Predictive Equations

The photoactive additives of the present disclosure are intended to be used to improve the properties of articles in which they are incorporated. Those properties include (1) the ability of the article to pass the UL94 V0 flame retardance test; (2) maintain a high percent retention of tensile elongation; (3) have a low delta YI; (4) have a low delta % T; and (5) have a high gel thickness. These properties can be affected by the makeup of the cross-linkable polycarbonate resin, the amount of the cross-linkable polycarbonate resin used to form the article, and the dosage of UV radiation needed to induce crosslinking.

Relevant properties of the polycarbonate resin can include the content of the dihydroxybenzophenone, expressed in molar percentage; and the melt flow rate of the polycarbonate resin, which is inversely proportional to the molecular weight of the resin, expressed in g/10 min. Relevant properties of the blend can include the weight percentage of the cross-linkable polycarbonate resin.

Five polynomial equations have been determined that provide a model fit for each desired property of the article. The parameters in the equations include (1) the UV dosage, D, in $J/cm^2$ for UVA radiation; (2) the dihydroxybenzophenone level in the crosslinkable polycarbonate, in mole %, MOL %; (3) the molecular weight increase in the polymeric composition after exposure to the UV radiation, MW_I, in Daltons; (4) the melt flow rate of the polycarbonate blend, MF, in g/10 min; and (5) the weight percentage of the cross-linkable polycarbonate resin in the blend, WP. The five model equations are shown below. In these equations, "Ln" refers to the natural log (base e), and "sqrt" indicates the square root.

$$\mathrm{Sqrt(V0\_Avg)} = -0.62315 + (9.21942 \times 10^{-3} \times WP) + (0.041498 \times D) + (4.34876 \times 10^{-5} \times MW\_I) + (6.55546 \times 10^{-3} \times MOL\,\%) + (0.089017 \times MF) + (9.87122 \times 10^{-4} \times WP \times D) - (4.36994 \times 10^{-6} \times WP \times MW\_I) - (2.43440 \times 10^{-3} \times WP \times MOL\,\%) + (2.08870 \times 10^{-3} \times WP \times MF) - (4.40362 \times 10^{-6} \times D \times MW\_I) - (2.32567 \times 10^{-3} \times D \times MOL\,\%) - (3.75290 \times 10^{-3} \times D \times MF) + (2.05611 \times 10^{-5} \times MW\_I \times MF) + (5.61409 \times 10^{-3} \times MOL\,\% \times MF) + (2.98567 \times 10^{-9} \times (MW\_I)^2) + (6.17229 \times 10^{-3} \times (MOL\,\%)^2) - (0.017115 \times (MF)^2)$$  Eqn 1:

$$\mathrm{Sqrt(\%\,RE)} = +1.37235 + (0.077638 \times WP) + (0.67685 \times D) - (2.39234 \times 10^{-3} \times MW\_I) - (0.23516 \times MOL\,\%) - (0.57165 \times MF) - (9.18615 \times 10^{-3} \times WP \times MF) - (6.66016 \times 10^{-5} \times D \times MW\_I) - (0.019526 \times D \times MOL\,\%) + (2.07809 \times 10^{-4} \times MW\_I \times MOL\,\%) + (2.79873 \times 10^{-7} \times (MW\_I)^2) + (0.056758 \times (MF)^2)$$  Eqn 2:

$$\mathrm{Ln(D\_YI)} = -0.047177 + (0.062393 \times D) + 1.81716 \times 10^{-4} \times MW\_I) + (0.017370 \times MOL\,\%) - (5.48288 \times 10^{-6} \times D \times MW\_I)$$  Eqn 3:

$$(D\_\%\,T + 8.90)^{2.65} = +343.92310 - (6.75832 \times D) - (0.022788 \times MW\_I) + (0.43933 \times MOL\,\%) - (3.84042 \times MF) + (5.56692 \times 10^{-4} \times D \times MW\_I) - (8.77565 \times 10^{-4} \times MW\_I \times MOL\,\%) + (8.94844 \times 10^{-4} \times MW\_I \times MF)$$  Eqn 4:

$$\mathrm{Sqrt(GEL)} = +2.69872 - (0.093035 \times WP) + (0.31583 \times D) - (5.37830 \times 10^{-4} \times MW\_I) + (0.28207 \times MOL\,\%) - (0.092447 \times MF) - (2.29409 \times 10^{-3} \times WP \times D) + (2.03257 \times 10^{-5} \times WP \times MW\_I) + (0.010073 \times WP \times MOL\,\%) - (1.01623 \times 10^{-7} \times (MW\_I)^2) - (0.043959 \times (MOL\,\%)^2)$$  Eqn 5:

Equation 1 predicts the flame performance of the article. In this regard, flammability testing can be conducted using the standard Underwriters Laboratory UL 94 test method (2 day or 7 day conditioning) described in the Underwriter's Laboratory Bulletin 94 entitled "Tests for Flammability of Plastic Materials, UL94". In this test method, specimens are preconditioned in two ways: (a) either at room temperature for 48 hours or (b) in an air-circulating oven for 168 hours at 70±1° C. and then cooled in a desiccator for at least 4 hours at room temperature, prior to testing. Once removed from the desiccator, specimens are tested within 30 minutes.

Several ratings can be applied based on the rate of burning, time to extinguish, ability to resist dripping, and whether or not drips are burning. According to UL94, materials may be classified as HB, V0, V1, V2, 5V, 5VA and/or 5VB on the basis of the test results obtained for five samples. The criteria for the flammability classifications or "flame retardance" are described below.

V0: A specimen is supported in a vertical position and a flame is applied to the bottom of the specimen. The flame is applied for ten seconds and then removed until flaming stops at which time the flame is reapplied for another ten seconds and then removed. Two sets of five specimens are tested. The two sets are conditioned under different conditions.

To achieve a V0 rating, specimens must not burn with flaming combustion for more than 10 seconds after either test flame application. Total flaming combustion time must not exceed 50 seconds for each set of 5 specimens. Specimens must not burn with flaming or glowing combustion up to the specimen holding clamp. Specimens must not drip flaming particles that ignite the cotton. No specimen can have glowing combustion remain for longer than 30 seconds after removal of the test flame 5VA: Testing is done on both bar and plaque specimens. Procedure for Bars: A bar specimen is supported in a vertical position and a flame is applied to one of the lower corners of the specimen at a 20° angle. The flame is applied for 5 seconds and is removed for 5 seconds. The flame application and removal is repeated five times. Procedure for Plaques: The procedure for plaques is the same as for bars except that the plaque specimen is mounted horizontally and a flame is applied to the center of the lower surface of the plaque.

To achieve a 5VA rating, specimens must not have any flaming or glowing combustion for more than 60 seconds after the five flame applications. Specimens must not drip flaming particles that ignite the cotton. Plaque specimens must not exhibit burnthrough (a hole). It is noted that in the Examples and Tables below, the rows that state whether 5VA was "Pass" or "Fail" for a given thickness refer only to whether the plaque test was passed, and should not be interpreted as stating that no combustion occurred for more than 60 seconds and that there were no drips. Results for both 2-day and 7-day conditioning are reported.

The data can be analyzed by calculation of the average flame out time, standard deviation of the flame out time and the total number of drips. Statistical methods can then be used to convert the data to a probability that a specific formulation will achieve a first time V0 pass or "p(FTP)" in the standard UL 94 testing of 5 bars. The probability of a first time pass on a first submission (pFTP) may be determined according to the formula:

$$\text{pFTP} = (P_{t1>mbt,\ n=0} \times P_{t2>mbt,\ n=0} \times P_{total<=mbt} \times P_{drip,\ n=0})$$

where $P_{t1>mbt,\ n=0}$ is the probability that no first burn time exceeds a maximum burn time value, $P_{t2>mbt,\ n=0}$ is the probability that no second burn time exceeds a maximum burn time value, $P_{total<=mbt}$ is the probability that the sum of the burn times is less than or equal to a maximum total burn time value, and $P_{drip,\ n=0}$ is the probability that no specimen exhibits dripping during the flame test. First and second burn time refer to burn times after a first and second application of the flame, respectively.

The probability that no first burn time exceeds a maximum burn time value, $P_{t1>mbt,\ n=0}$, may be determined from the formula: $P_{t1>mbt,\ n=0} = (1-P_{t1>mbt})^5$ where $P_{t1>mbt}$ is the area under the log normal distribution curve for t1>mbt, and where the exponent "5" relates to the number of bars tested. The probability that no second burn time exceeds a maximum burn time value may be determined from the formula: $P_{t2>mbt,\ n=0} = (1-P_{t2>mbt})^5$ where $P_{t2>mbt}$ is the area under the normal distribution curve for t2>mbt. As above, the mean and standard deviation of the burn time data set are used to calculate the normal distribution curve. For the UL-94 V-0 rating, the maximum burn time is 10 seconds. For a V-1 or V-2 rating the maximum burn time is 30 seconds. The probability $P_{drip,\ n=0}$ that no specimen exhibits dripping during the flame test is an attribute function, estimated by: $(1-P_{drip})^5$ where $P_{drip}$ =(the number of bars that drip/the number of bars tested).

The probability $P_{total<=mbt}$ that the sum of the burn times is less than or equal to a maximum total burn time value may be determined from a normal distribution curve of simulated 5-bar total burn times. The distribution may be generated from a Monte Carlo simulation of 1000 sets of five bars using the distribution for the burn time data determined above. Techniques for Monte Carlo simulation are well known in the art. A normal distribution curve for 5-bar total burn times may be generated using the mean and standard deviation of the simulated 1000 sets. Therefore, $P_{total<=mbt}$ may be determined from the area under a log normal distribution curve of a set of 1000 Monte Carlo simulated 5-bar total burn time for total<=maximum total burn time. For the UL94 V0 rating, the maximum total burn time is 50 seconds.

pFTP values range from zero (i.e. absolute probability of failing the UL94 test) to 1.0 (i.e. absolute probability of passing the UL94 test). Preferably, pFTP values will be 1 or very close to 1 for high confidence that a sample formulation will achieve a V0 rating in UL 94 testing.

A pFTP value can be obtained for flammability tests conducted after 2 days conditioning and after 7 days conditioning. In Equation 1, the value of V0_Avg is the average of the pFTP values for the two-day test and the seven-day test. V0_Avg will have a value between 0.0 and 1.0.

In Equation 2, % RE is the percentage retention of tensile elongation after exposure to acetone at a thickness of 3.2 mm. % RE is expressed in percentages. For example, if the percentage retention is 105%, % RE will be 105, not 1.05.

In Equation 3, D_YI is the change in Yellowness Index, measured before UVA exposure and at least 48 hours after the UVA exposure. D_YI is expressed in dimensionless YI units.

In Equation 4, D_% T is the change in light transmission, measured before UVA exposure and at least 48 hours after UVA exposure. D_% T is expressed in percentages. For example, if the change is 3%, D_% T will be 3, not 0.03.

In Equation 5, GEL is the gel thickness on a surface of the article, measured in micrometers.

The dihydroxybenzophenone level in the crosslinkable polycarbonate, MOL %, is expressed in percentages. For example, if the polycarbonate contains 3 mole %, then MOL % will be 3, not 0.03.

Similarly, the weight percentage of the cross-linkable polycarbonate resin in the blend, WP, is also measured in percentages. For example, if the blend contains 20 wt % of polycarbonate resin, then WP will be 20, not 0.20.

These equations can be used alone or combined to design articles having desired combinations of properties and to predict the resulting properties of the article depending on the makeup of the cross-linkable polycarbonate resin and the polycarbonate blend. Typically, a high V0_Avg, a high % RE, a low D_YI, a low D_% T, and a high GEL are desired. Desirably, V0_Avg is at least 0.7; % RE is at least 85; and/or D_YI is less than 6.

The characteristics for model Equations 1-3 are shown below:

|  | Average V0 p(FTP) | Elongation Retention | Delta YI |
|---|---|---|---|
| Adjusted R-Squared | 0.8657 | 0.9060 | 0.9138 |
| Predicted R-Squared | 0.7377 | 0.8529 | 0.8983 |
| Adequate Precision | 13.805 | 16.503 | 25.256 |

The predicted R-Squareds all show reasonable agreement with the Adjusted R-Sqared values. Adequate Precision measures the signal to noise ratio. A ratio greater than 4 is generally desirable. Here, the ratios range from 13.8 to 25.3, which indicates an adequate signal and thus these models can be used to navigate the design space.

The following examples are provided to illustrate the polymeric compositions/blends, articles, processes, and properties of the present disclosure. The examples are merely illustrative and are not intended to limit the disclosure to the materials, conditions, or process parameters set forth therein.

EXAMPLES

A large scale study was performed using 16 different batches. The batches were made using the ingredients listed in Table A. The cross-linkable resins were copolymers made from 4,4'-dihydroxybenzophenone (DHBP) and bisphenol-A (BPA).

TABLE A

| Component | Description | Mw Daltons |
|---|---|---|
| XPC-A | Copolymer with 2.5 mole % DHBP, remainder BPA | ~23,000 |
| XPC-B | Copolymer with 2.5 mole % DHBP, remainder BPA | ~27,500 |
| XPC-C | Copolymer with 2.5 mole % DHBP, remainder BPA | ~32,000 |
| XPC-D | Copolymer with 11 mole % DHBP, remainder BPA | ~23,000 |
| XPC-E | Copolymer with 11 mole % DHBP, remainder BPA | ~27,500 |
| XPC-F | Copolymer with 11 mole % DHBP, remainder BPA | ~32,000 |
| XPC-G | Copolymer with 20 mole % DHBP, remainder BPA | ~23,000 |
| XPC-H | Copolymer with 20 mole % DHBP, remainder BPA | ~27,500 |
| XPC-J | Copolymer with 20 mole % DHBP, remainder BPA | ~32,000 |
| LF-PC | Low-flow bisphenol-A homopolymer | ~31,000 |
| Rimar Salt | Potassium perfluorobutanesulfonate | |
| Cyclic siloxane | Octaphenylcyclotetrasiloxane | |
| Phosphite Stabilizer | Tris (2,4-di-tert-butylphenyl) phosphite | |

The formulation of the 16 different batches is shown in Table 1A and Table 1B. The units are phr.

TABLE 1A

| Ingredient | B-1 | B-2 | B-3 | B-4 | B-5 | B-6 | B-7 | B-8 | B-9 |
|---|---|---|---|---|---|---|---|---|---|
| XPC-A | 100 | 50 | | | | | | | |
| XPC-B | | | 75 | 50 | | | | | |
| XPC-C | | | | | 100 | 50 | | | |
| XPC-D | | | | | | | 100 | 50 | |
| XPC-E | | | | | | | | | 75 |
| LF-PC | | 50 | 25 | 50 | | 50 | | 50 | 25 |
| Rimar Salt | 0.080 | 0.080 | 0.080 | 0.080 | 0.080 | 0.080 | 0.080 | 0.080 | 0.080 |
| Cyclic Siloxane | 0.100 | 0.100 | 0.100 | 0.100 | 0.100 | 0.100 | 0.100 | 0.100 | 0.100 |
| Phosphite stabilizer | 0.060 | 0.060 | 0.060 | 0.060 | 0.060 | 0.060 | 0.060 | 0.060 | 0.060 |

TABLE 1B

| Ingredient | B-10 | B-11 | B-12 | B-13 | B-14 | B-15 | B-16 |
|---|---|---|---|---|---|---|---|
| XPC-F | 50 | | | | | | |
| XPC-G | | 100 | 75 | 50 | | | |
| XPC-H | | | | | 50 | | |
| XPC-J | | | | | | 100 | 50 |
| LF-PC | 50 | | 25 | 50 | 50 | | 50 |
| Rimar Salt | 0.080 | 0.080 | 0.080 | 0.080 | 0.080 | 0.080 | 0.080 |
| Cyclic Siloxane | 0.100 | 0.100 | 0.100 | 0.100 | 0.100 | 0.100 | 0.100 |
| Phosphite stabilizer | 0.060 | 0.060 | 0.060 | 0.060 | 0.060 | 0.060 | 0.060 |

Various properties of the 16 batches were measured.

The MFR was calculated using the ASTM D1238-13 method, 1.2 kg load, 300° C. temperature, 360 second or 1080 second dwell.

Molecular weight determinations were performed using gel permeation chromatography (GPC), using a cross-linked styrene-divinylbenzene column and calibrated to polycarbonate references using a UV-VIS detector set at 264 nm. Samples were prepared at a concentration of about 1 mg/ml, and eluted at a flow rate of about 1.0 ml/min.

The molar percentage of DHBP was measured by liquid chromatography.

The Yellowness Index was measured before and/or after UV exposure using an X-Rite Color i7 benchtop spectrophotometer in the transmission mode using CIELAB color equation, an observer angle of 2 degrees, and illuminant C as the light source. YI was measured following ASTM E313-73 (D1925). The light transmission (% T) was measured concurrently with the YI on the same bar.

The properties are listed in Table 2.

TABLE 2

|  | MFR (360 sec) | MFR (1080 sec) | Mw | PDI | DHBP (%) | % T | YI |
|---|---|---|---|---|---|---|---|
| B-1 | 19.8 | 20.3 | 22069 | 2.3 | 2.63 | 88.34 | 3.32 |
| B-2 | 11.3 | 11.3 | 25607 | 2.6 | 1.3 | 89.04 | 2.06 |
| B-3 | 9.12 | 9.5 | 27093 | 2.6 | 1.96 | 88.30 | 2.93 |
| B-4 | 8.52 | 8.71 | 27548 | 2.4 | 1.32 | 88.88 | 2.33 |
| B-5 | 5.55 | 5.81 | 30697 | 2.5 | 2.65 | 88.06 | 3.69 |
| B-6 | 6.07 | 6.71 | 29832 | 2.4 | 1.33 | 88.95 | 2.28 |
| B-7 | 16.2 | 17 | 24997 | 2.6 | 10.83 | 87.62 | 4.77 |
| B-8 | 10.8 | 11.4 | 26213 | 2.2 | 5.32 | 88.41 | 3.07 |
| B-9 | 9.23 | 9.62 | 25393 | 2.3 | 8.68 | 87.83 | 4.71 |
| B-10 | 6.63 | 6.96 | 30130 | 2.4 | 5.84 | 87.57 | 5.20 |
| B-11 | 17.6 | 18.6 | 23456 | 2.3 | 20.25 | 87.17 | 6.52 |
| B-12 | 13.6 | 14.9 | 24993 | 2.3 | 15.18 | 87.86 | 5.11 |
| B-13 | 11.3 | 12.7 | 26343 | 2.2 | 10.22 | 88.34 | 4.25 |
| B-14 | 8.65 | 9.49 | 28204 | 2.3 | 10.84 | 87.78 | 5.36 |
| B-15 | 6.04 | 5.97 | 31062 | 2.2 | 21.39 | 86.32 | 8.48 |
| B-16 | 6.38 | 6.93 | 30574 | 2.4 | 10.87 | 87.97 | 5.24 |

The 16 batches were used to make 40 samples which were exposed to UV light. Samples were exposed to filtered UV light provided by a Loctite Zeta 7411-S system, which used a 400 W metal halide arc lamp and behaved like a D-bulb electrodeless bulb in spectral output with a 280-nm cut-on wavelength filter. This was done because in prior experiments, filtered light showed a lower change in YI for equivalent doses of UVA compared to unfiltered UV light. The samples were exposed on both sides beneath the UV lights for the equivalent UVA dosage of 6, 21, or 36 J/cm$^2$ per side. The UV energy for the Loctite system is provided below in Table B, and was measured using an EIT UV PowerPuck® II. The dose was measured as the energy from 320-390 nm (UVA), 280-320 nm (UVB), 250-260 nm (UVC) and 395-445 nm (UVV). The dose was calculated in J/cm$^2$.

TABLE B

| | Loctite (filtered light). | | | |
|---|---|---|---|---|
| | Loctite Dose | | | |
| Filtered | UVA J/cm$^2$ | UVB J/cm$^2$ | UVC J/cm$^2$ | UVV J/cm$^2$ |
| 160 sec exposure | 6.0 | 1.2 | 0 | 3.7 |
| 560 sec exposure | 21.0 | 4.2 | 0 | 12.8 |
| 960 sec exposure | 36.0 | 7.2 | 0 | 21.9 |

The flame performance of the 40 samples was tested using the methods described above. The pFTP values for these samples were based on 20 bars of 1.2 mm thickness. The bars were conditioned for either 2 days or 7 days, then tested. The pFTP was calculated separately for the 2-day samples and the 7-day samples. The pFTP for V0 performance and V1 performance was calculated. It should be noted that the pFTP(V1) for any given sample is expected to be higher than the pFTP(V0) for the sample, because the V1 test is less stringent than the V0 test.

Chemical resistance was measured by the elongation at break of tensile bars having 3.2 mm thickness. For chemically exposed samples, the tensile bars were put under 1% strain at 23° C. and exposed to acetone. They were then removed from the strain jigs and the tensile elongation at break was measured following the ASTM D638-10 Type I method at 50 mm/min. The tensile elongation at break was measured under four different conditions: before UV exposure and before exposure to acetone ("No UV, No Chem"); before UV exposure and after exposure to acetone ("No UV, Ace"); after UV exposure and before exposure to acetone ("UV, No Chem"); and after UV exposure and after exposure to acetone ("UV, Ace"). Units were in percentage. The percentage of retention of tensile elongation (% RE) was the "UV, Ace" divided by the "UV, No Chem". Acetone was applied to six bars, while the "No Chem" control data was obtained with only 3 bars.

The degree of crosslinking was quantified by dissolving the non-cross-linked fraction of the plaque in methylene chloride and isolating the insoluble gel layer. The thickness of the insoluble gel layer was measured using optical microscopy, and is reported in micrometers.

The molecular weight, Yellowness Index (YI), and light transmission (% T) were measured as described above. The MFR for each sample was calculated using the ASTM D1238-13 method, 1.2 kilogram (kg) load, 300° C. temperature, 360 second dwell.

The results of the 40 samples are reported in Tables 3A-3F.

TABLE 3A

| Run | Batch # | Dosage J/cm$^2$ | Gel (micron) | Molecular Weight | | |
|---|---|---|---|---|---|---|
| | | | | Before UV | After UV | Delta |
| 1 | B-15 | 36 | 52.3 | 31062 | 35160 | 4098 |
| 2 | B-6 | 21 | 0.0 | 29832 | 37953 | 8121 |
| 3 | B-13 | 6 | 5.7 | 26343 | 28381 | 2038 |
| 4 | B-9 | 36 | 64.6 | 25393 | 32938 | 7545 |
| 5 | B-13 | 6 | 3.7 | 26343 | 27752 | 1409 |
| 6 | B-15 | 6 | 7.6 | 31062 | 32393 | 1331 |
| 7 | B-5 | 36 | 8.1 | 30697 | 40781 | 10084 |
| 8 | B-15 | 6 | 6.8 | 31062 | 31723 | 661 |
| 9 | B-1 | 36 | 7.3 | 22069 | 29185 | 7116 |
| 10 | B-16 | 36 | 45.4 | 30574 | 36286 | 5712 |
| 11 | B-15 | 36 | 40.5 | 31062 | 35070 | 4008 |
| 12 | B-14 | 6 | 5.0 | 28204 | 30330 | 2126 |
| 13 | B-5 | 6 | 0.0 | 30697 | 33519 | 2822 |
| 14 | B-9 | 21 | 48.4 | 25393 | 31243 | 5850 |
| 15 | B-16 | 6 | 5.7 | 30574 | 32966 | 2392 |
| 16 | B-4 | 6 | 0.0 | 27548 | 30164 | 2616 |
| 17 | B-5 | 6 | 0.0 | 30697 | 33796 | 3099 |
| 19 | B-9 | 21 | 24.2 | 25393 | 31409 | 6016 |
| 20 | B-14 | 21 | 47.6 | 28204 | 31647 | 3443 |
| 21 | B-11 | 6 | 5.1 | 23456 | 25514 | 2058 |
| 22 | B-11 | 36 | 49.2 | 23456 | 26395 | 2939 |
| 23 | B-7 | 6 | 2.8 | 24997 | 25626 | 629 |
| 24 | B-11 | 36 | 62.0 | 23456 | 26850 | 3394 |
| 25 | B-11 | 6 | 4.3 | 23456 | 24946 | 1490 |
| 26 | B-16 | 36 | 64.0 | 30574 | 35423 | 4849 |
| 27 | B-15 | 36 | 55.5 | 31062 | 34265 | 3203 |
| 28 | B-10 | 6 | 3.7 | 30130 | 32746 | 2616 |
| 29 | B-12 | 36 | 49.3 | 24993 | 27661 | 2668 |
| 30 | B-5 | 36 | 25.1 | 30697 | 40239 | 9542 |
| 31 | B-1 | 21 | 5.7 | 22069 | 28264 | 6195 |
| 32 | B-2 | 6 | 0.0 | 25607 | 27710 | 2103 |
| 33 | B-13 | 21 | 21.9 | 26343 | 30145 | 3802 |
| 34 | B-15 | 21 | 38.4 | 31062 | 34101 | 3039 |
| 35 | B-12 | 6 | 6.2 | 24993 | 26783 | 1790 |
| 36 | B-14 | 6 | 3.5 | 28204 | 30986 | 2782 |
| 37 | B-8 | 36 | 50.6 | 26213 | 31459 | 5246 |

TABLE 3A-continued

| Run | Batch # | Dosage J/cm² | Gel (micron) | Molecular Weight Before UV | After UV | Delta |
|---|---|---|---|---|---|---|
| 39 | B-6 | 36 | 0.0 | 29832 | 40473 | 10641 |
| 40 | B-2 | 36 | 0.0 | 25607 | 34602 | 8995 |
| 41 | B-3 | 21 | 1.9 | 27093 | 35118 | 8025 |

TABLE 3B

| Run | Batch # | Dosage J/cm2 | 1.2 mm flame p (FTP) @ V0 2 day | 7 day | Avg |
|---|---|---|---|---|---|
| 1 | B-15 | 36 | 0.3946 | 0.7785 | 0.5866 |
| 2 | B-6 | 21 | 0.9373 | 0.0838 | 0.5106 |
| 3 | B-13 | 6 | 0.0234 | 0.0080 | 0.0157 |
| 4 | B-9 | 36 | 0.3691 | 0.6592 | 0.5142 |
| 5 | B-13 | 6 | 0.0970 | 0.0160 | 0.0565 |
| 6 | B-15 | 6 | 0.0005 | 0.0000 | 0.0003 |
| 7 | B-5 | 36 | 0.9769 | 0.9387 | 0.9578 |
| 8 | B-15 | 6 | 0.0076 | 0.0000 | 0.0038 |
| 9 | B-1 | 36 | 0.2127 | 0.3261 | 0.2694 |
| 10 | B-16 | 36 | 0.6280 | 0.4036 | 0.5158 |
| 11 | B-15 | 36 | 0.4196 | 0.7577 | 0.5887 |
| 12 | B-14 | 6 | 0.1887 | 0.0428 | 0.1158 |
| 13 | B-5 | 6 | 0.9732 | 0.2302 | 0.6017 |
| 14 | B-9 | 21 | 0.0015 | 0.3255 | 0.1635 |
| 15 | B-16 | 6 | 0.0127 | 0.0509 | 0.0318 |
| 16 | B-4 | 6 | 0.6589 | 0.0111 | 0.3350 |
| 17 | B-5 | 6 | 0.7649 | 0.1791 | 0.4720 |
| 19 | B-9 | 21 | 0.5059 | 0.5040 | 0.5050 |
| 20 | B-14 | 21 | 0.3871 | 0.8785 | 0.6328 |
| 21 | B-11 | 6 | 0.0000 | 0.0000 | 0.0000 |
| 22 | B-11 | 36 | 0.0211 | 0.1796 | 0.1004 |
| 23 | B-7 | 6 | 0.0000 | 0.0009 | 0.0005 |
| 24 | B-11 | 36 | 0.0000 | 0.2521 | 0.1261 |
| 25 | B-11 | 6 | 0.0263 | 0.0000 | 0.0132 |
| 26 | B-16 | 36 | 0.4977 | 0.6580 | 0.5779 |
| 27 | B-15 | 36 | 0.9810 | 0.6463 | 0.8137 |
| 28 | B-10 | 6 | 0.0673 | 0.1563 | 0.1118 |
| 29 | B-12 | 36 | 0.7543 | 0.8705 | 0.8124 |
| 30 | B-5 | 36 | 0.9555 | 0.9983 | 0.9769 |
| 31 | B-1 | 21 | 0.0093 | 0.0001 | 0.0047 |
| 32 | B-2 | 6 | 0.0041 | 0.0000 | 0.0021 |
| 33 | B-13 | 21 | 0.0000 | 0.1287 | 0.0644 |
| 34 | B-15 | 21 | 0.1210 | 0.2359 | 0.1785 |
| 35 | B-12 | 6 | 0.0486 | 0.1523 | 0.1005 |
| 36 | B-14 | 6 | 0.4216 | 0.0265 | 0.2241 |
| 37 | B-8 | 36 | 0.4735 | 0.3092 | 0.3914 |
| 39 | B-6 | 36 | 0.9085 | 0.2432 | 0.5759 |
| 40 | B-2 | 36 | 0.7347 | 0.4193 | 0.5770 |
| 41 | B-3 | 21 | 0.9521 | 0.4232 | 0.6877 |

TABLE 3C

| Run | Batch # | Dosage J/cm2 | 1.2 mm flame p (FTP) @ V1 2 day | 7 day | Avg |
|---|---|---|---|---|---|
| 1 | B-15 | 36 | 0.5719 | 1.0000 | 0.7859 |
| 2 | B-6 | 21 | 1.0000 | 0.7562 | 0.8781 |
| 3 | B-13 | 6 | 0.0558 | 0.0576 | 0.0567 |
| 4 | B-9 | 36 | 0.7610 | 1.0000 | 0.8805 |
| 5 | B-13 | 6 | 0.1206 | 0.4050 | 0.2628 |
| 6 | B-15 | 6 | 0.0007 | 0.0000 | 0.0004 |
| 7 | B-5 | 36 | 1.0000 | 1.0000 | 1.0000 |
| 8 | B-15 | 6 | 0.0118 | 0.0000 | 0.0059 |
| 9 | B-1 | 36 | 0.2842 | 0.9951 | 0.6397 |
| 10 | B-16 | 36 | 0.9929 | 0.9954 | 0.9942 |
| 11 | B-15 | 36 | 0.5716 | 0.9987 | 0.7852 |
| 12 | B-14 | 6 | 0.4127 | 0.2699 | 0.3413 |
| 13 | B-5 | 6 | 1.0000 | 0.5441 | 0.7720 |

TABLE 3C-continued

| Run | Batch # | Dosage J/cm2 | 1.2 mm flame p (FTP) @ V1 2 day | 7 day | Avg |
|---|---|---|---|---|---|
| 14 | B-9 | 21 | 0.0041 | 0.9840 | 0.4941 |
| 15 | B-16 | 6 | 0.4097 | 0.5567 | 0.4832 |
| 16 | B-4 | 6 | 0.7680 | 0.0118 | 0.3899 |
| 17 | B-5 | 6 | 0.7686 | 0.4054 | 0.5870 |
| 19 | B-9 | 21 | 0.9991 | 0.9991 | 0.9991 |
| 20 | B-14 | 21 | 0.7672 | 1.0000 | 0.8836 |
| 21 | B-11 | 6 | 0.0000 | 0.0000 | 0.0000 |
| 22 | B-11 | 36 | 0.0309 | 0.7597 | 0.3953 |
| 23 | B-7 | 6 | 0.0000 | 0.0289 | 0.0145 |
| 24 | B-11 | 36 | 0.0000 | 0.9498 | 0.4749 |
| 25 | B-11 | 6 | 0.0312 | 0.0000 | 0.0156 |
| 26 | B-16 | 36 | 0.7663 | 0.7686 | 0.7675 |
| 27 | B-15 | 36 | 1.0000 | 0.7683 | 0.8841 |
| 28 | B-10 | 6 | 0.5209 | 0.7379 | 0.6294 |
| 29 | B-12 | 36 | 0.7686 | 0.9997 | 0.8842 |
| 30 | B-5 | 36 | 1.0000 | 1.0000 | 1.0000 |
| 31 | B-1 | 21 | 0.0290 | 0.0129 | 0.0210 |
| 32 | B-2 | 6 | 0.0041 | 0.0000 | 0.0021 |
| 33 | B-13 | 21 | 0.0000 | 0.5729 | 0.2865 |
| 34 | B-15 | 21 | 0.1849 | 0.7618 | 0.4734 |
| 35 | B-12 | 6 | 0.0631 | 0.2846 | 0.1739 |
| 36 | B-14 | 6 | 0.5715 | 0.3943 | 0.4829 |
| 37 | B-8 | 36 | 0.7657 | 0.9905 | 0.8781 |
| 39 | B-6 | 36 | 0.9999 | 0.9748 | 0.9874 |
| 40 | B-2 | 36 | 0.7685 | 0.7562 | 0.7624 |
| 41 | B-3 | 21 | 1.0000 | 0.7682 | 0.8841 |

TABLE 3D

| Run # | Batch | Dosage J/cm² | Tensile bars for chem (6 bars @ 1% strain) Elongation at Break No UV, No Chem | No UV, Ace | UV, No Chem | UV, Ace | RE % (UV, Ace) |
|---|---|---|---|---|---|---|---|
| 1 | B-15 | 36 | — | 0 | 56.72 | 44.01 | 77.59 |
| 2 | B-6 | 21 | 104.06 | 0 | 94.57 | 16.95 | 17.92 |
| 3 | B-13 | 6 | 109.28 | 0 | 100.73 | 0.00 | 0.00 |
| 4 | B-9 | 36 | 111.23 | 0 | 80.31 | 81.56 | 101.56 |
| 5 | B-13 | 6 | 109.28 | 0 | 96.7 | 0.00 | 0.00 |
| 6 | B-15 | 6 | 96.15 | 0 | 86.02 | 0.00 | 0.00 |
| 7 | B-5 | 36 | 102.22 | 0 | 88.88 | 89.35 | 100.53 |
| 8 | B-15 | 6 | 96.15 | 0 | 86.96 | 9.28 | 10.67 |
| 9 | B-1 | 36 | 110.66 | 0 | 101.18 | 70.69 | 69.87 |
| 10 | B-16 | 36 | 99.46 | 0 | 74.86 | 64.38 | 86.00 |
| 11 | B-15 | 36 | 96.15 | 0 | 65.73 | 59.28 | 90.19 |
| 12 | B-14 | 6 | 107.33 | 0 | 93.7 | 1.60 | 1.70 |
| 13 | B-5 | 6 | 102.22 | 0 | 95.48 | 2.19 | 2.29 |
| 14 | B-9 | 21 | 111.23 | 0 | 85.74 | 45.43 | 52.98 |
| 15 | B-16 | 6 | 99.46 | 0 | — | 0.00 | 0.00 |
| 16 | B-4 | 6 | 112.78 | 0 | 108.42 | 0.34 | 0.31 |
| 17 | B-5 | 6 | 102.22 | 0 | 94.07 | 1.88 | 2.00 |
| 19 | B-9 | 21 | 111.23 | 0 | 85.89 | 65.99 | 76.83 |
| 20 | B-14 | 21 | 107.33 | 0 | 87.09 | 27.39 | 31.45 |
| 21 | B-11 | 6 | 112.65 | 0 | 89.71 | 0.00 | 0.00 |
| 22 | B-11 | 36 | 112.65 | 0 | 57.45 | 33.07 | 57.56 |
| 23 | B-7 | 6 | 110.60 | 0 | 92.85 | 0.00 | 0.00 |
| 24 | B-11 | 36 | 112.65 | 0 | 57.61 | 23.18 | 40.24 |
| 25 | B-11 | 6 | 112.65 | 0 | — | 0.00 | 0.00 |
| 26 | B-16 | 36 | 99.46 | 0 | 74.94 | 64.27 | 85.76 |
| 27 | B-15 | 36 | 96.15 | 0 | 61.67 | 61.07 | 99.03 |
| 28 | B-10 | 6 | 103.14 | 0 | 94.91 | 0.38 | 0.40 |
| 29 | B-12 | 36 | 110.34 | 0 | 64.81 | 36.16 | 55.79 |
| 30 | B-5 | 36 | 102.22 | 0 | 93.86 | 72.12 | 76.84 |
| 31 | B-1 | 21 | 110.66 | 0 | 102.65 | 29.72 | 28.95 |
| 32 | B-2 | 6 | 112.41 | 0 | 104.47 | 0.00 | 0.00 |
| 33 | B-13 | 21 | 109.28 | 0 | 88.25 | 65.56 | 74.29 |
| 34 | B-15 | 21 | 96.15 | 0 | 77.45 | 24.36 | 31.45 |
| 35 | B-12 | 6 | 110.34 | 0 | 93.25 | 3.02 | 0.06 |
| 36 | B-14 | 6 | 107.33 | 0 | 91.79 | 4.26 | 4.64 |
| 37 | B-8 | 36 | 112.24 | 0 | 88.53 | 59.97 | 67.74 |

TABLE 3D-continued

Tensile bars for chem (6 bars @ 1% strain)
Elongation at Break

| Run | Batch # | Dosage J/cm$^2$ | No UV, No Chem | No UV, Ace | UV, No Chem | UV, Ace | RE % (UV, Ace) |
|---|---|---|---|---|---|---|---|
| 39 | B-6 | 36 | 104.06 | 0 | 94.15 | 79.70 | 84.65 |
| 40 | B-2 | 36 | 112.41 | 0 | 91.36 | 23.63 | 25.86 |
| 41 | B-3 | 21 | 115.00 | 0 | 95.73 | 8.28 | 8.65 |

TABLE 3E

| | | Dosage | YI | | | % T | | |
|---|---|---|---|---|---|---|---|---|
| Run | Batch # | J/cm$^2$ | Before UV | After UV | Delta | Before UV | After UV | Delta |
| 1 | B-15 | 36 | 8.48 | 17.00 | 8.52 | 86.32 | 82.47 | −3.85 |
| 2 | B-6 | 21 | 2.28 | 9.42 | 7.14 | 88.95 | 85.82 | −3.14 |
| 3 | B-13 | 6 | 4.25 | 6.25 | 2.00 | 88.34 | 87.21 | −1.12 |
| 4 | B-9 | 36 | 4.71 | 16.36 | 11.65 | 87.83 | 82.78 | −5.05 |
| 5 | B-13 | 6 | 4.25 | 6.64 | 2.39 | 88.34 | 87.16 | −1.18 |
| 6 | B-15 | 6 | 8.48 | 10.84 | 2.36 | 86.32 | 85.26 | −1.06 |
| 7 | B-5 | 36 | 3.69 | 14.22 | 10.53 | 88.06 | 83.49 | −4.56 |
| 8 | B-15 | 6 | 8.48 | 10.72 | 2.24 | 86.32 | 85.37 | −0.95 |
| 9 | B-1 | 36 | 3.32 | 10.30 | 6.99 | 88.34 | 85.30 | −3.05 |
| 10 | B-16 | 36 | 5.24 | 18.65 | 13.42 | 87.97 | 82.16 | −5.81 |
| 11 | B-15 | 36 | 8.48 | 27.25 | 18.77 | 86.32 | 78.23 | −8.09 |
| 12 | B-14 | 6 | 5.36 | 7.68 | 2.32 | 87.78 | 86.63 | −1.15 |
| 13 | B-5 | 6 | 3.69 | 5.66 | 1.97 | 88.06 | 87.16 | −0.89 |
| 14 | B-9 | 21 | 4.71 | 10.77 | 6.06 | 87.83 | 85.06 | −2.77 |
| 15 | B-16 | 6 | 5.24 | 7.54 | 2.31 | 87.97 | 86.78 | −1.19 |
| 16 | B-4 | 6 | 2.33 | 4.41 | 2.08 | 88.88 | 87.97 | −0.92 |
| 17 | B-5 | 6 | 3.69 | 5.60 | 1.91 | 88.06 | 87.08 | −0.98 |
| 19 | B-9 | 21 | 4.71 | 12.42 | 7.71 | 87.83 | 84.28 | −3.55 |
| 20 | B-14 | 21 | 5.36 | 12.78 | 7.41 | 87.78 | 84.41 | −3.37 |
| 21 | B-11 | 6 | 6.52 | 8.64 | 2.12 | 87.17 | 86.02 | −1.14 |
| 22 | B-11 | 36 | 6.52 | 18.72 | 12.21 | 87.17 | 81.40 | −5.77 |
| 23 | B-7 | 6 | 4.77 | 7.25 | 2.48 | 87.62 | 86.46 | −1.16 |
| 24 | B-11 | 36 | 6.52 | 20.29 | 13.77 | 87.17 | 80.79 | −6.37 |
| 25 | B-11 | 6 | 6.52 | 8.79 | 2.28 | 87.17 | 85.91 | −1.26 |
| 26 | B-16 | 36 | 5.24 | 15.64 | 10.40 | 87.97 | 83.19 | −4.79 |
| 27 | B-15 | 36 | 8.48 | 16.59 | 8.11 | 86.32 | 82.53 | −3.79 |
| 28 | B-10 | 6 | 5.20 | 7.69 | 2.49 | 87.57 | 86.60 | −0.97 |
| 29 | B-12 | 36 | 5.11 | 14.65 | 9.54 | 87.86 | 83.36 | −4.50 |
| 30 | B-5 | 36 | 3.69 | 12.04 | 8.35 | 88.06 | 84.43 | −3.63 |
| 31 | B-1 | 21 | 3.32 | 7.94 | 4.63 | 88.34 | 86.28 | −2.06 |
| 32 | B-2 | 6 | 2.06 | 3.85 | 1.79 | 89.04 | 88.15 | −0.89 |
| 33 | B-13 | 21 | 4.25 | 12.16 | 7.91 | 88.34 | 84.63 | −3.70 |
| 34 | B-15 | 21 | 8.48 | 14.57 | 6.09 | 86.32 | 83.47 | −2.85 |
| 35 | B-12 | 6 | 5.11 | 7.36 | 2.25 | 87.86 | 86.71 | −1.15 |
| 36 | B-14 | 6 | 5.36 | 7.92 | 2.55 | 87.78 | 86.71 | −1.07 |
| 37 | B-8 | 36 | 3.07 | 10.65 | 7.59 | 88.41 | 85.16 | −3.25 |
| 39 | B-6 | 36 | 2.28 | 8.58 | 6.30 | 88.95 | 86.30 | −2.65 |
| 40 | B-2 | 36 | 2.06 | 8.62 | 6.56 | 89.04 | 86.34 | −2.70 |
| 41 | B-3 | 21 | 2.93 | 8.34 | 5.41 | 88.30 | 85.86 | −2.44 |

TABLE 3F

| Run | Batch # | Dosage J/cm$^2$ | XPC wt % | MFR g/10 min |
|---|---|---|---|---|
| 1 | B-15 | 36 | 21.39 | 6.04 |
| 2 | B-6 | 21 | 1.33 | 6.07 |
| 3 | B-13 | 6 | 10.22 | 11.3 |
| 4 | B-9 | 36 | 8.68 | 9.23 |
| 5 | B-13 | 6 | 10.22 | 11.3 |
| 6 | B-15 | 6 | 21.39 | 6.04 |
| 7 | B-5 | 36 | 2.65 | 5.55 |
| 8 | B-15 | 6 | 21.39 | 6.04 |
| 9 | B-1 | 36 | 2.63 | 19.8 |
| 10 | B-16 | 36 | 10.87 | 6.38 |
| 11 | B-15 | 36 | 21.39 | 6.04 |
| 12 | B-14 | 6 | 10.84 | 8.65 |
| 13 | B-5 | 6 | 2.65 | 5.55 |
| 14 | B-9 | 21 | 8.68 | 9.23 |
| 15 | B-16 | 6 | 10.87 | 6.38 |
| 16 | B-4 | 6 | 1.32 | 8.52 |
| 17 | B-5 | 6 | 2.65 | 5.55 |
| 19 | B-9 | 21 | 8.68 | 9.23 |
| 20 | B-14 | 21 | 10.84 | 8.65 |
| 21 | B-11 | 6 | 20.25 | 17.6 |
| 22 | B-11 | 36 | 20.25 | 17.6 |
| 23 | B-7 | 6 | 10.83 | 16.2 |
| 24 | B-11 | 36 | 20.25 | 17.6 |
| 25 | B-11 | 6 | 20.25 | 17.6 |
| 26 | B-16 | 36 | 10.87 | 6.38 |
| 27 | B-15 | 36 | 21.39 | 6.04 |
| 28 | B-10 | 6 | 5.84 | 6.63 |
| 29 | B-12 | 36 | 15.18 | 13.6 |
| 30 | B-5 | 36 | 2.65 | 5.55 |
| 31 | B-1 | 21 | 2.63 | 19.8 |
| 32 | B-2 | 6 | 1.3 | 11.3 |
| 33 | B-13 | 21 | 10.22 | 11.3 |
| 34 | B-15 | 21 | 21.39 | 6.04 |
| 35 | B-12 | 6 | 15.18 | 13.6 |

TABLE 3F-continued

| Run | Batch # | Dosage J/cm² | XPC wt % | MFR g/10 min |
|---|---|---|---|---|
| 36 | B-14 | 6 | 10.84 | 8.65 |
| 37 | B-8 | 36 | 5.32 | 10.8 |
| 39 | B-6 | 36 | 1.33 | 6.07 |
| 40 | B-2 | 36 | 1.3 | 11.3 |
| 41 | B-3 | 21 | 1.96 | 9.12 |

The five predictive model equations discussed above were based on the 40 samples described in Tables 3A-F. They can be used to design polycarbonates that will consistently (A) pass the UL94 V0 test, either after 2 days or 7 days of conditioning and (B) provide high percentage retention of tensile elongation following exposure to acetone while (C) minimizing the color shift due to UV exposure. The equations were obtained using Design-Expert® version 7.0.3 from Stat-Ease, Inc.

Figure 4:
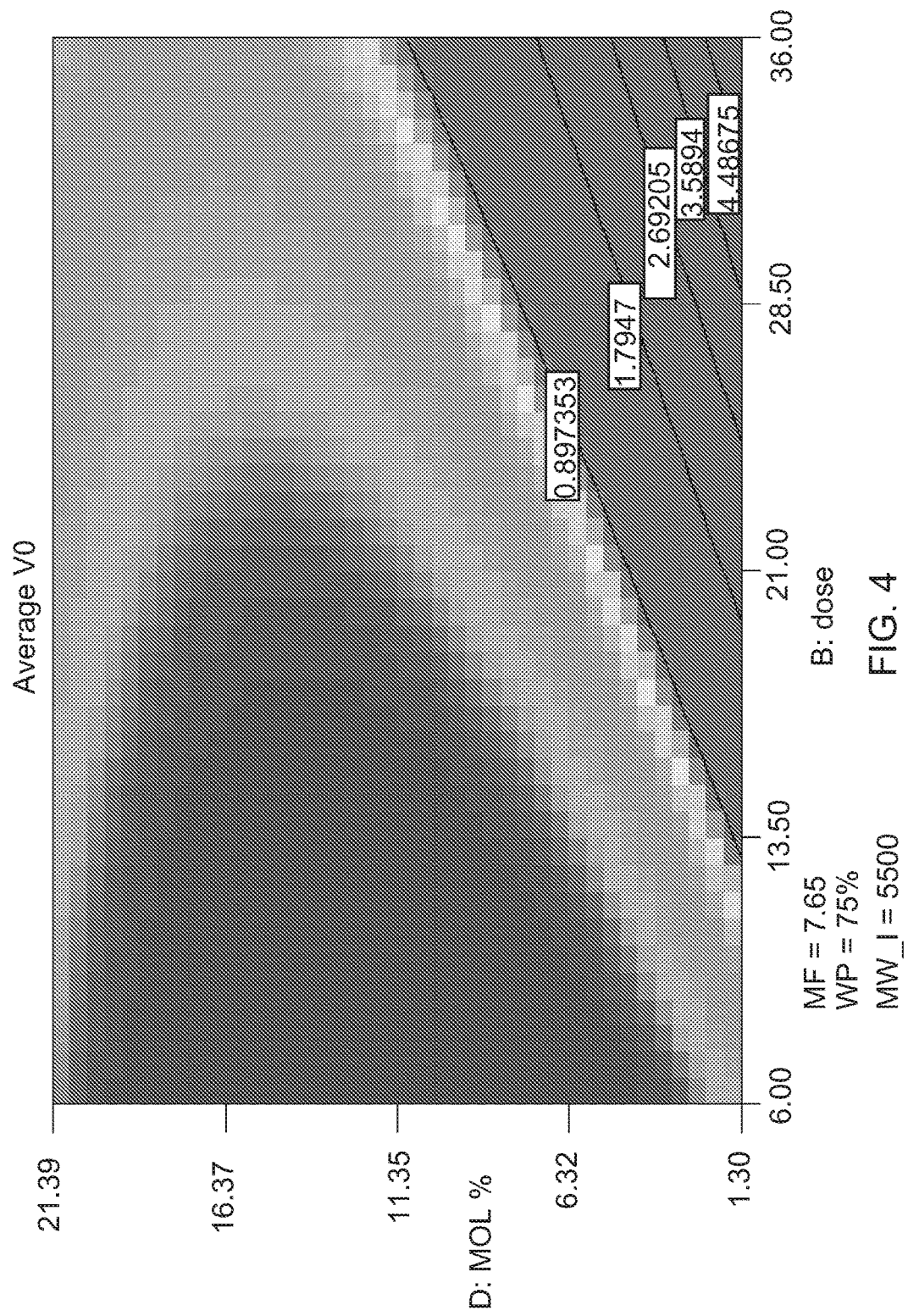
FIG. 4 is a graph showing the predicted average V0 when applying the model equation and holding the MFR, weight percentage of crosslinkable resin, and molecular weight increase constant.

FIG. 4 is a graph showing the model equation for the average V0 (Equation 1). Again, this is the average of the pFTP value obtained by averaging the V0 test at 2 days and the V0 test for 7 days. The MFR is held constant at 7.65, the blend level (i.e. weight percentage of crosslinkable resin, WP) is held constant at 75%, and the molecular weight increase is held constant at 5500. The resulting curves show the predicted average V0 for various combinations of UV dosage and amount of DHBP (MOL %). The lower-right triangle below the 0.897353 line shows combinations that should have a high average V0, and is the desired design space.

Figure 5:
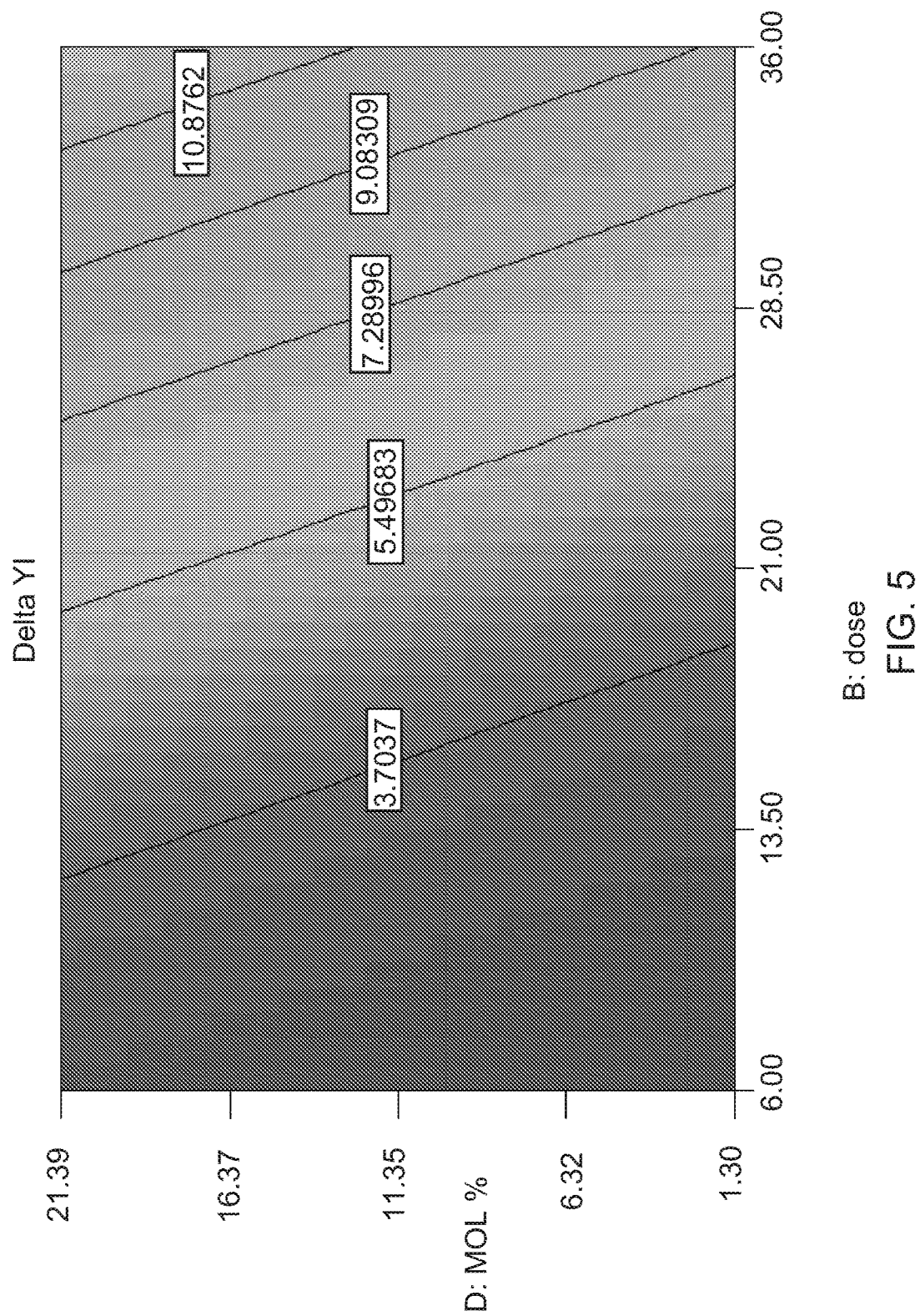
FIG. 5 is a graph showing the predicted delta YI when applying the model equation and holding the MFR, weight percentage of crosslinkable resin, and molecular weight increase constant.

FIG. 5 is a graph showing the model equation for the delta YI (Equation 3). The molecular weight increase is held constant at 2000. The resulting curves show the predicted delta YI for various combinations of UV dosage and amount of DHBP (MOL %). The area to the left of the 3.7037 line shows combinations that should have a low Delta YI, and is the desired design space.

Figure 6:
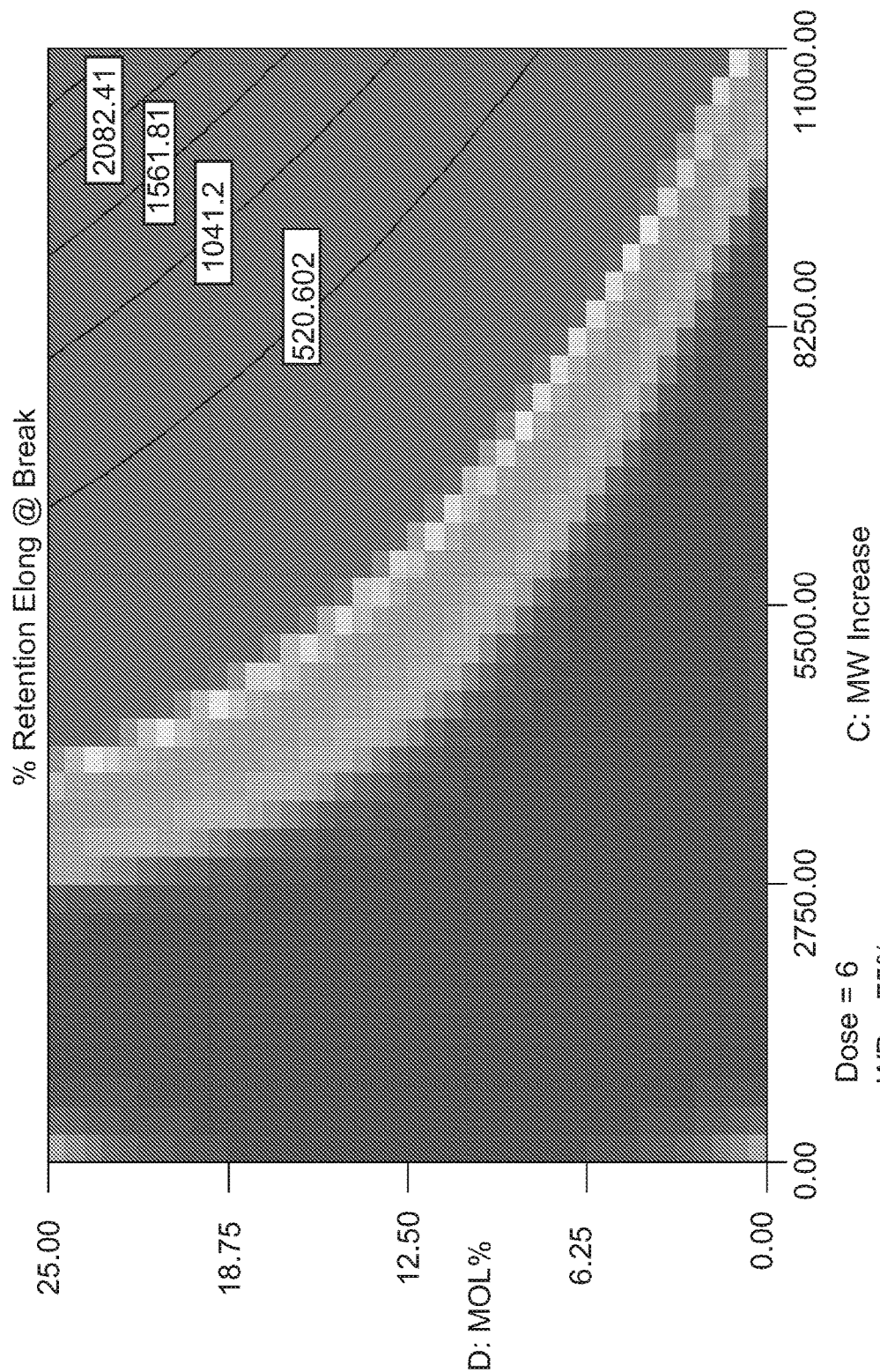
FIG. 6 is a graph showing the predicted percentage retention of tensile elongation when applying the model equation and holding the MFR, weight percentage of crosslinkable resin, and dosage (low value) constant.

FIG. 6 is a graph showing the model equation for the percentage retention of tensile elongation, % RE (Equation 2). The MFR is held constant at 12.68, the WP is held constant at 75%, and the dosage is held constant at 6 J/cm². The resulting curves show the predicted % RE for various combinations of molecular weight increase and MOL %. The upper-right area is the desired design space.

Figure 7:
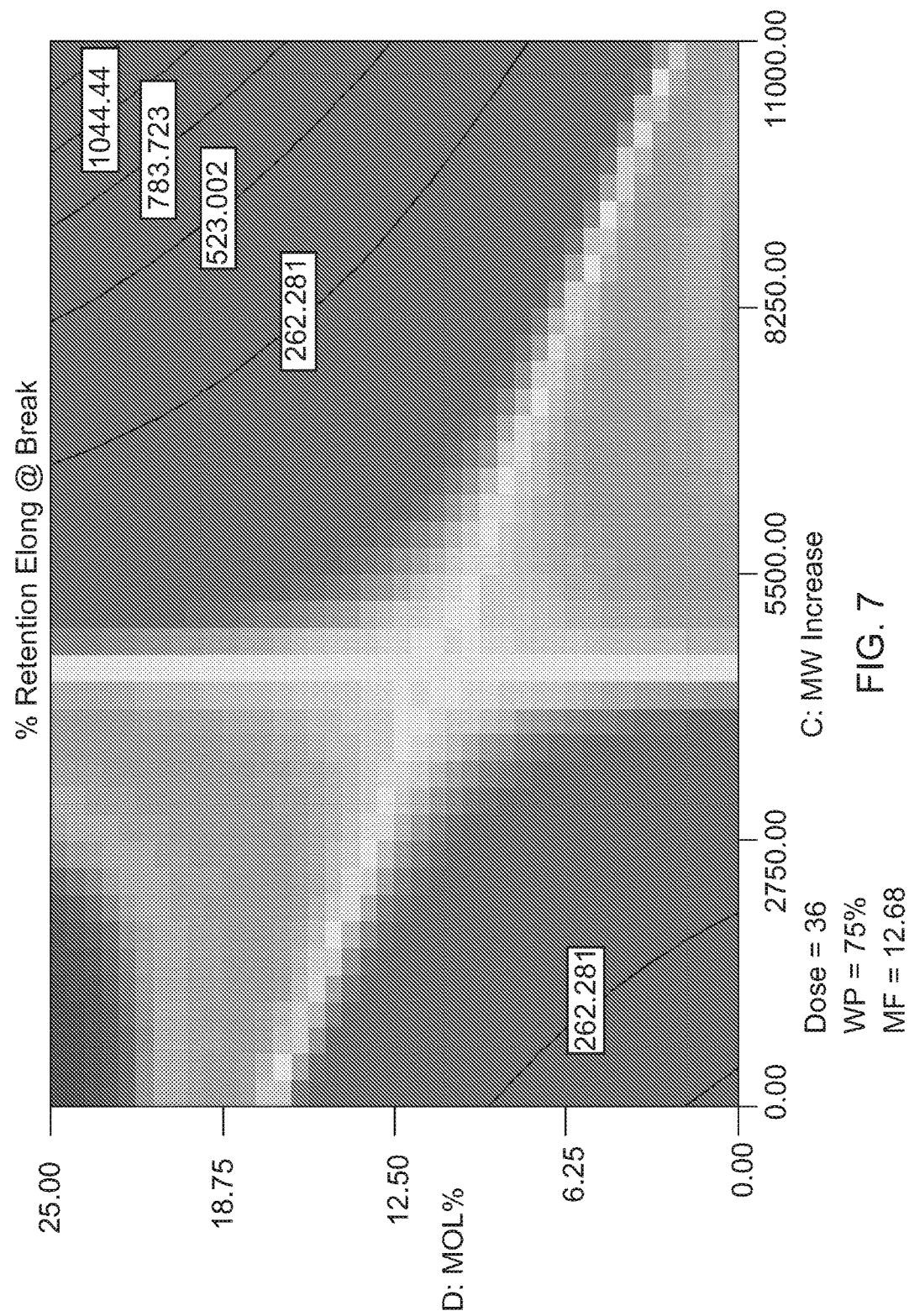
FIG. 7 is a graph showing the predicted percentage retention of tensile elongation when applying the model equation and holding the MFR, weight percentage of crosslinkable resin, and dosage (high value) constant.

FIG. 7 is a graph that is identical to FIG. 6, except that the dosage is held constant at 36 J/cm². Comparing FIG. 6 to FIG. 7, there is a large difference now in the acceptable design spaces. There is now a lower-left area as well as the upper-right area, and both areas are also relatively larger.

Figure 8:
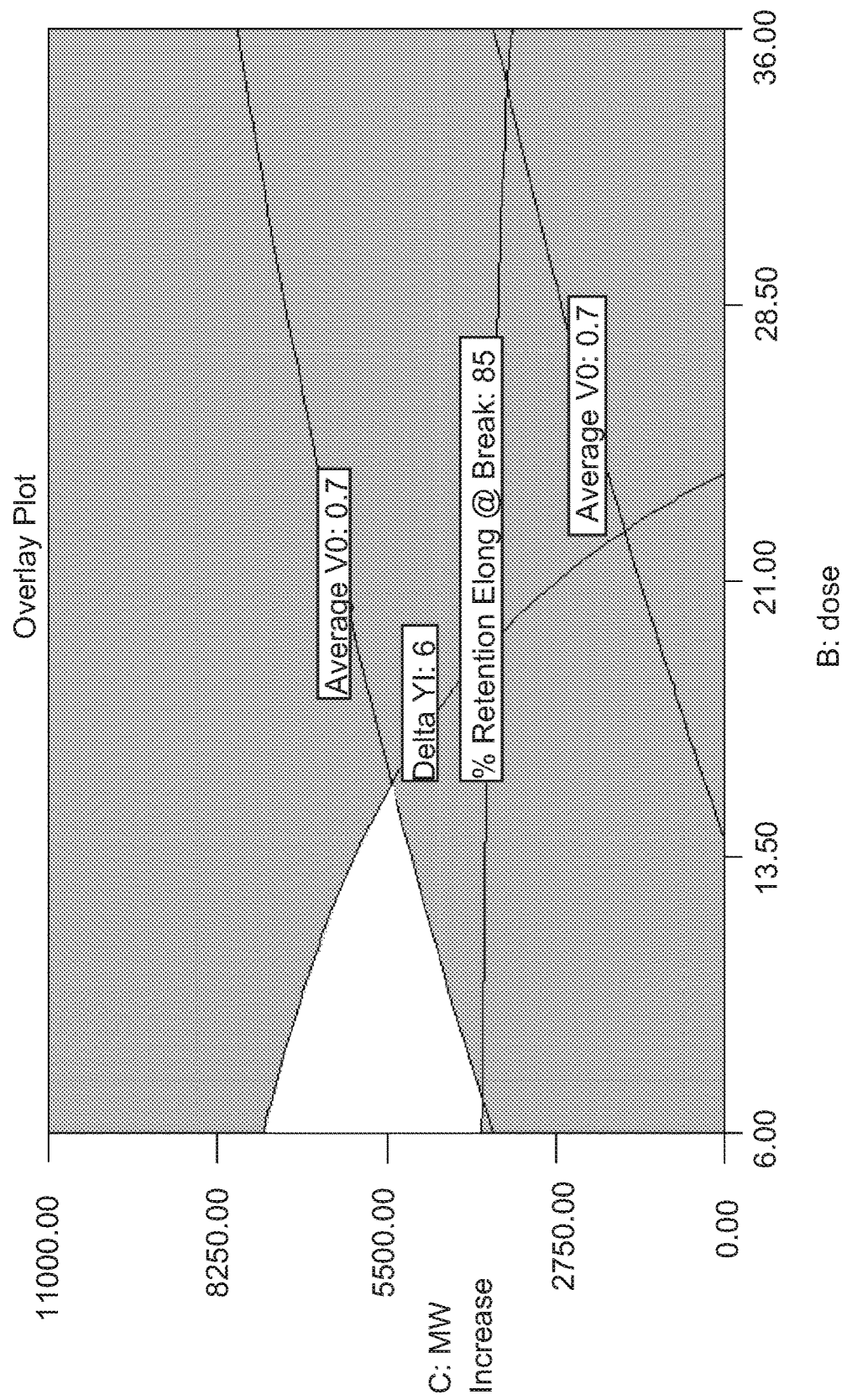
FIG. 8 is a graph that illustrates the combination of three model equations to identify a design space. The simulated article is formed from 100% of a crosslinkable polycarbonate containing 20 mole % of repeating units derived from 4,4'-dihydroxybenzophenone.

FIG. 8 is a graph that illustrates the combination of three model equations to identify a design space. The simulated article is formed from 100% of a crosslinkable polycarbonate containing 20 mole % of repeating units derived from 4,4'-dihydroxybenzophenone. In other words, WP=100 and MOL %=20. The MF is also set to 5.74. Model Equations 1, 2, and 3 are used. The x-axis is the UV dose, D, and the y-axis is the molecular weight increase, MW_I. The equations can then be used to determine the design space where the % RE will be greater than 85%, the delta YI will be less than 6, and the average V0 will be greater than 0.7. The area above the horizontal line denotes the space where the % retention of elongation is greater than 85%. The area under the curve denotes the space where the delta YI of less than 6 can be obtained. The area above the top slanted line, and the area below the lower slanted line, each denote the space where the average V0 will be greater than 0.7. Their intersection (i.e. the triangle in the left center) provides the design space (combination of UV dose and molecular weight increase) needed to obtain these three desired properties.

Figure 9:
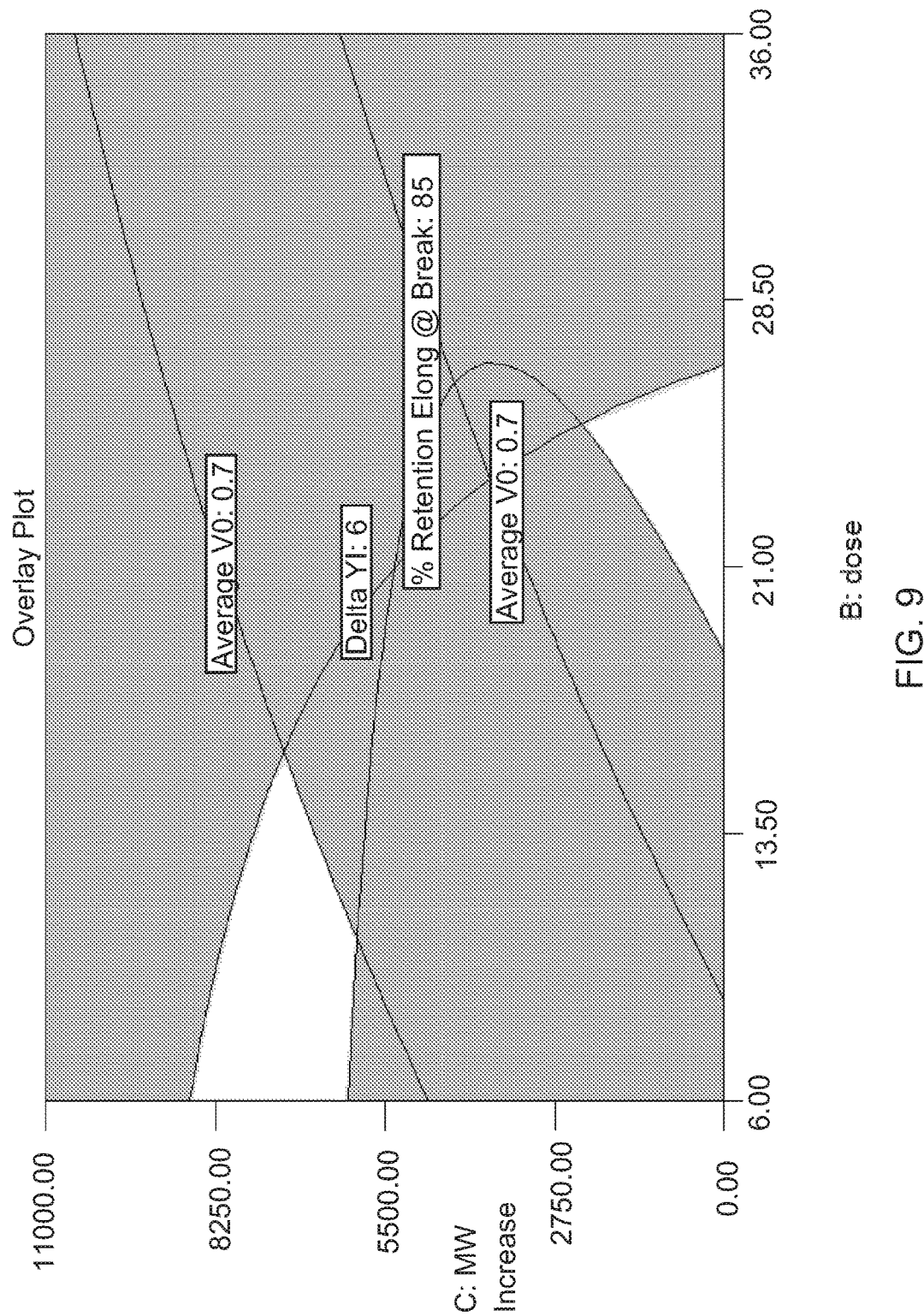
FIG. 9 is a graph that illustrates the combination of three model equations to identify a design space. The simulated article is formed from 100% of a crosslinkable polycarbonate containing 10 mole % of repeating units derived from 4,4'-dihydroxybenzophenone.

FIG. 9 is another graph that illustrates the combination of three model equations to identify a design space. Here, the simulated article is formed from 100% of a crosslinkable polycarbonate containing 10 mole % of repeating units derived from 4,4'-dihydroxybenzophenone. In other words, WP=100 and MOL %=10. The MF is also set to 5.55. The x-axis is the UV dose, D, and the y-axis is the molecular weight increase, MW_I. The equations are again used to determine the design space where the % RE will be greater than 85%, the delta YI will be less than 6, and the average V0 will be greater than 0.7. This time, however, the design space is in two different locations. One location indicates a UV dosage of approximately 6 to 13.5 and a molecular weight increase of approximately 6000 to 8400. The second location indicates a UV dosage of approximately 18 to 26 and a molecular weight increase of approximately 0 to 2750.

Figure 10:
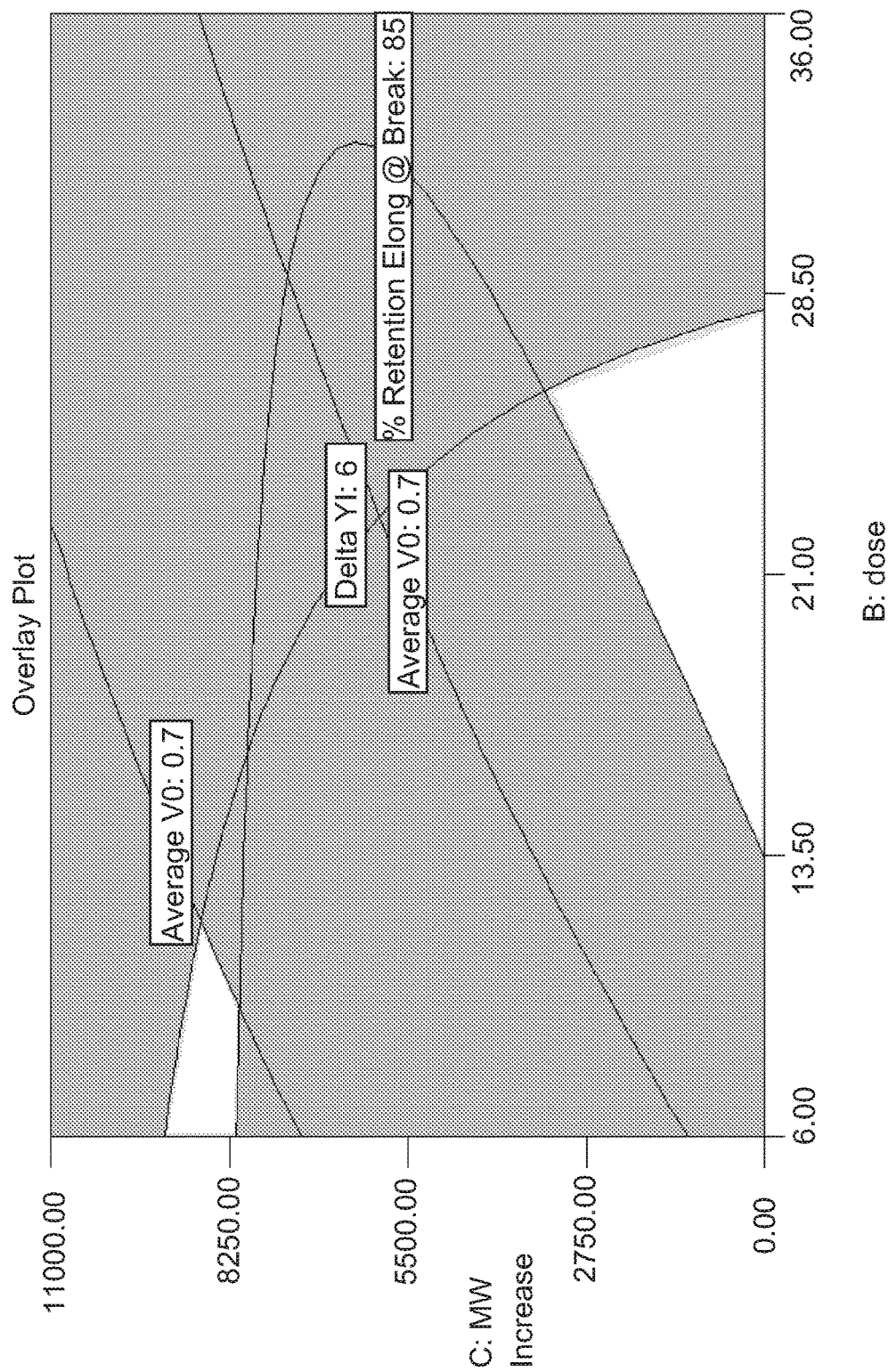
FIG. 10 is a graph that illustrates the combination of three model equations to identify a design space. The simulated article is formed from 100% of a crosslinkable polycarbonate containing 5 mole % of repeating units derived from 4,4'-dihydroxybenzophenone.

FIG. 10 is yet another graph that illustrates the combination of three model equations to identify a design space. Here, the simulated article is formed from 100% of a crosslinkable polycarbonate containing 5 mole % of repeating units derived from 4,4'-dihydroxybenzophenone. In other words, WP=100 and MOL %=5. The MF is still set to 5.55. The equations are again used to determine the design space where the % RE will be greater than 85%, the delta YI will be less than 6, and the average V0 will be greater than 0.7. The design spaces are very similar to FIG. 9, but slightly smaller in area.

Figure 11:
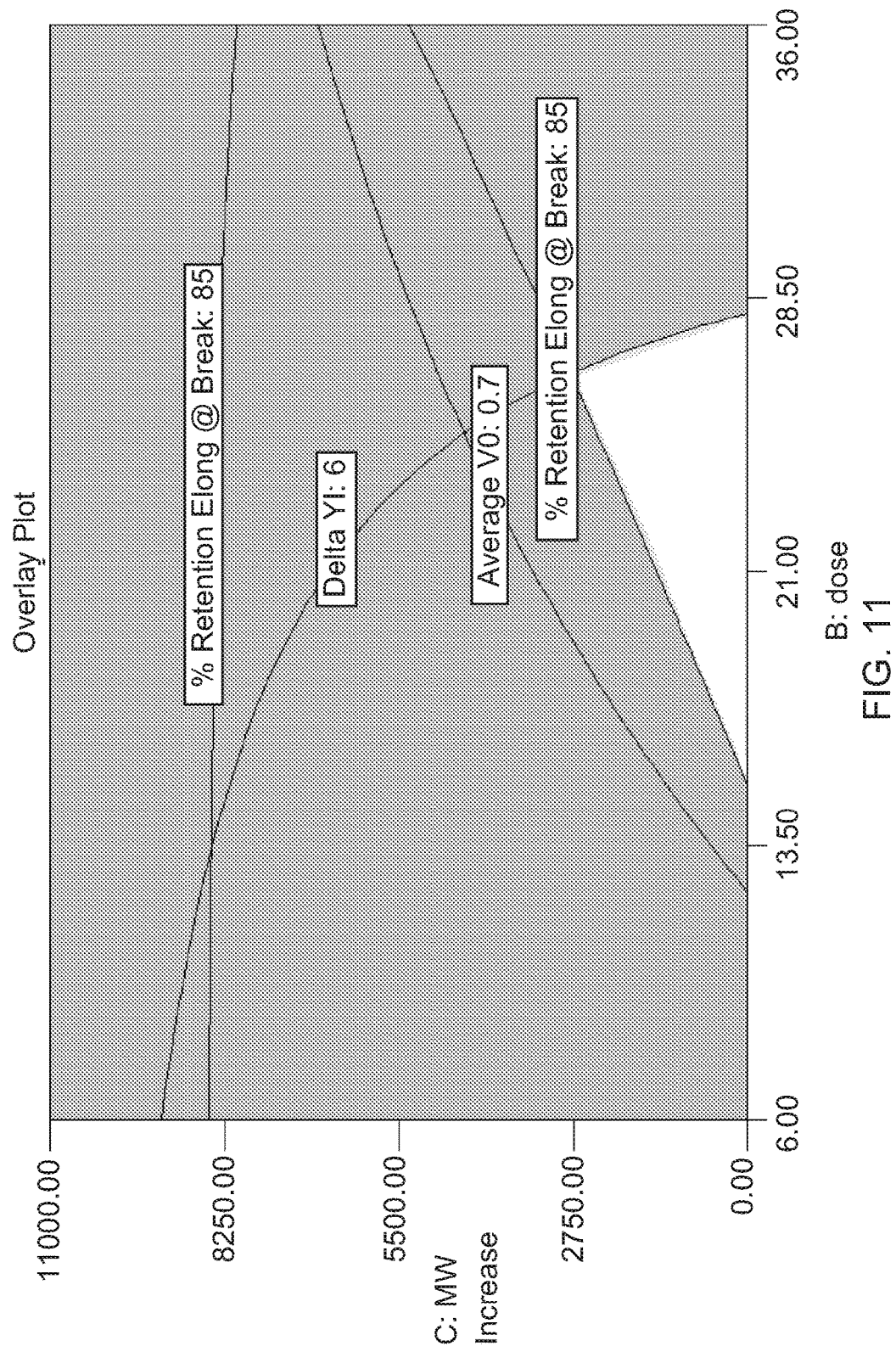
FIG. 11 is a graph that illustrates the combination of three model equations to identify a design space. The simulated article is formed from a blend containing 50 wt % of a crosslinkable polycarbonate containing 5 mole % of repeating units derived from 4,4'-dihydroxybenzophenone, and 50 wt % of a bisphenol-A homopolycarbonate having a weight-average molecular weight of about 31,000. The permissible design spaces between FIG. 10 and FIG. 11 are different.

FIG. 11 is another graph that illustrates the combination of three model equations to identify a design space. The simulated article is formed from a blend containing 50 wt % of a crosslinkable polycarbonate containing 5 mole % of repeating units derived from 4,4'-dihydroxybenzophenone, and 50 wt % of a bisphenol-A homopolycarbonate having a weight-average molecular weight of about 31,000. Thus, WP=50 and MOL %=5. The MF is now set to 4.84. The equations are again used to determine the design space where the % RE will be greater than 85%, the delta YI will be less than 6, and the average V0 will be greater than 0.7. Now compared to FIG. 10, only the bottom design space will achieve the desired combination of properties.

The above formulations and equations can be used to design polycarbonate articles that have desired properties and provide means for identifying how changes in the polymers used to make the articles will affect the resulting properties of the articles.

Set forth below are some embodiments of the process and articles disclosed herein.

Embodiment 1: A process for preparing an article that has a high probability of passing a UL94 V0 test, comprising:
(A) providing a polymeric composition to be exposed to a dosage (D) of UVA radiation, wherein the polymeric composition comprises:
  (i) a cross-linkable polycarbonate resin including repeating units derived from a dihydroxybenzophenone;
  (ii) a flame retardant; and
  (iii) optionally one or more polymeric base resins;
  (iv) wherein the cross-linkable polycarbonate resin contains a molar percentage of the dihydroxybenzophenone (MOL %); and (v) wherein the polymeric composition has:
  (a) a molecular weight increase of polymeric components therein after exposure to UV radiation (MW_I),
  (b) a melt flow rate (MF), and
  (c) a weight percentage of the cross-linkable polycarbonate resin (WP);
(B) forming an article from the polymeric composition; and
(C) exposing the formed article to the dosage;
wherein D, MOL %, MW_I, MF, and WP are determined based on a flame performance equation as follows:

$$\mathrm{Sqrt(V0\_Avg)} = -0.62315 + (9.21942 \times 10^{-3} \times WP) + (0.041498 \times D) + (4.34876 \times 10^{-5} \times MW\_I) + (6.55546 \times 10^{-3} \times MOL\,\%) + (0.089017 \times MF) + (9.87122 \times 10^{-4} \times WP \times D) - (4.36994 \times 10^{-6} \times WP \times MW\_I) - (2.43440 \times 10^{-3} \times WP \times MOL\,\%) + (2.08870 \times 10^{-3} \times WP \times MF) - (4.40362 \times 10^{-6} \times D \times MW\_I) - (2.32567 \times 10^{-3} \times D \times MOL\,\%) - (3.75290 \times 10^{-3} \times D \times MF) + (2.05611 \times 10^{-5} \times MW\_I \times MF) + (5.61409 \times 10^{-3} \times MOL\,\% \times MF) + (2.98567 \times 10^{-9} \times (MW\_I)^2) + (6.17229 \times 10^{-3} \times (MOL\,\%)^2) - (0.017115 \times (MF)^2)$$

wherein the article has an average V0 (V0_Avg) that is the average of:
  (i) the probability of a first time pass in a UL94 V0 test at a thickness of 1.2 mm after UV exposure measured after 2 days of aging at room temperature, and
  (ii) the probability of a first time pass in a UL94 V0 test at a thickness of 1.2 mm after UV exposure measured after 7 days of aging at 70° C.; and
wherein V0_Avg is at least 0.7; and
wherein D is measured in J/cm² of UVA radiation.

Embodiment 2: The process of Embodiment 1, wherein (a) D, MOL %, MW_I, WP, and MF are also determined based on a percentage retention of tensile elongation equation as follows:

$$\mathrm{Sqrt(\%\,RE)} = +1.37235 + (0.077638 \times WP) + (0.67685 \times D) - (2.39234 \times 10^{-3} \times MW\_I) - (0.23516 \times MOL\,\%) - (0.57165 \times MF) - (9.18615 \times 10^{-3} \times WP \times MF) - (6.66016 \times 10^{-5} \times D \times MW\_I) - (0.019526 \times D \times MOL\,\%) + (2.07809 \times 10^{-4} \times MW\_I \times MOL\,\%) + (2.79873 \times 10^{-7} \times (MW\_I)^2) + (0.056758 \times (MF)^2)$$

wherein % RE is the percentage retention of tensile elongation after exposure to acetone at a thickness of 3.2 mm; and % RE is at least 85; or
  (b) wherein D, MOL %, and MW_I are also determined based on a Delta YI equation as follows:

$$\mathrm{Ln(D\_YI)} = -0.047177 + (0.062393 \times D + 1.81716 \times 10^{-4} \times MW\_I) + (0.017370 \times MOL\,\%) - (5.48288 \times 10^{-6} \times D \times MW\_I)$$

wherein D_YI is the change in YI after exposure to the dosage D, measured before UVA exposure and at least 48 hours after UVA exposure; and D_YI is 6 or less; or
  (c) wherein D, MOL %, MW_I, and MF are also determined based on a Delta % T equation as follows:

$$(D\_\%\,T + 8.90)^{2.65} = +343.92310 - (6.75832 \times D) - (0.022788 \times MW\_I) + (0.43933 \times MOL\,\%) - (3.84042 \times MF) + (5.56692 \times 10^{-4} \times D \times MW\_I) - (8.77565 \times 10^{-4} \times MW\_I \times MOL\,\%) + (8.94844 \times 10^{-4} \times MW\_I \times MF)$$

wherein D_% T is the change in light transmission after exposure to the dosage D, measured before UVA exposure and at least 48 hours after UVA exposure; and D_% T is 3.5 or less; or
  (d) wherein D, MOL %, MW_I, MF, and WP are also determined based on a gel thickness equation as follows:

$$\mathrm{Sqrt(GEL)} = +2.69872 - (0.093035 \times WP) + (0.31583 \times D) - (5.37830 \times 10^{-4} \times MW\_I) + (0.28207 \times MOL\,\%) - (0.092447 \times MF) - (2.29409 \times 10^{-3} \times WP \times D) + (2.03257 \times 10^{-5} \times WP \times MW\_I) + (0.010073 \times WP \times MOL\,\%) - (1.01623 \times 10^{-7} \times (MW\_I)^2) - (0.043959 \times (MOL\,\%)^2)$$

wherein GEL is the gel thickness on a surface of the article, measured in micrometers, and is at least 5.

Embodiment 3: The process of any one of Embodiments 1-2, wherein the polymeric composition comprises a polymeric base resin.

Embodiment 4: The process of any one of Embodiments 1-3, wherein MOL % is from 2.5 to 20; or wherein MW_I is from about 600 to about 11,000; or wherein MF is from about 5 to about 20; or wherein WP is from 50 to 100.

Embodiment 5: The process of any one of Embodiments 1-4, wherein the cross-linkable polycarbonate resin is a copolymer or a terpolymer.

Embodiment 6: The article formed by the process of any one of Embodiments 1-5, wherein:
  (a) the article has a V0_Avg of at least 0.7, a percentage retention of tensile elongation (% RE) of at least 85, and a Delta YI of less than 6; or
  (b) the article is a molded article, a film, a sheet, a layer of a multilayer film, or a layer of a multilayer sheet.

Embodiment 7: A process for preparing an article that has a desired percentage retention of tensile elongation after exposure to acetone at a thickness of 3.2 mm, comprising:
  (A) providing a polymeric composition to be exposed to a dosage (D) of UVA radiation, wherein the polymeric composition comprises:
    (iii) a cross-linkable polycarbonate resin including repeating units derived from a dihydroxybenzophenone;
    (iv) a flame retardant; and
    (v) optionally one or more polymeric base resins;
    (vi) wherein the cross-linkable polycarbonate resin contains a selectable molar percentage of the dihydroxybenzophenone (MOL %); and
    (vii) wherein the polymeric composition has:
      (a) a molecular weight increase of polymeric components therein after exposure to UV radiation (MW_I),
      (b) a melt flow rate (MF), and
      (c) a weight percentage of the cross-linkable polycarbonate resin (WP);
  (B) forming an article from the polymeric composition; and
  (C) exposing the formed article to the dosage;
wherein D, MOL %, MW_I, MF, and WP are determined based on a percentage retention of tensile elongation equation as follows:

$$\mathrm{Sqrt(\%\,RE)} = +1.37235 + (0.077638 \times WP) + (0.67685 \times D) - (2.39234 \times 10^{-3} \times MW\_I) - (0.23516 \times MOL\,\%) - (0.57165 \times MF) - (9.18615 \times 10^{-3} \times WP \times MF) - (6.66016 \times 10^{-5} \times D \times MW\_I) - (0.019526 \times D \times MOL\,\%) + (2.07809 \times 10^{-4} \times MW\_I \times MOL\,\%) + (2.79873 \times 10^{-7} \times (MW\_I)^2) + (0.056758 \times (MF)^2)$$

wherein % RE is the percentage retention of tensile elongation after exposure to acetone at a thickness of 3.2 mm; and % RE is at least 85.

Embodiment 8: The process of Embodiment 7, wherein (a) D, MOL %, MW_I, WP, and MF are also determined based on a flame performance equation as follows:

$$\mathrm{Sqrt(V0\_Avg)} = -0.62315 + (9.21942 \times 10^{-3} \times WP) + (0.041498 \times D) + (4.34876 \times 10^{-5} \times MW\_I) + (6.55546 \times 10^{-3} \times MOL\,\%) + (0.089017 \times MF) + (9.87122 \times 10^{-4} \times WP \times D) - (4.36994 \times 10^{-6} \times WP \times$$

MW_I)−(2.43440×10⁻³×WP×MOL %)+
(2.08870×10⁻³×WP×MF)−(4.40362×10⁻⁶×D×
MW_I)−(2.32567×10⁻³×D×MOL %)−(3.75290×
10⁻³×D×MF)+(2.05611×10⁻⁵×MW_I×MF)+
(5.61409×10⁻³×MOL %×MF)+(2.98567×10⁻⁹×
(MW_I)²)+(6.17229×10⁻³×(MOL %)²)−
(0.017115×(MF)²)

wherein the article has an average V0 (V0_Avg) that is the average of (i) the probability of a first time pass in a UL94 V0 test at a thickness of 1.2 mm after UV exposure and measured after 2 days of aging at room temperature, and (ii) the probability of a first time pass in a UL94 V0 test at a thickness of 1.2 mm after UV exposure and measured after 7 days of aging at 70° C.; and V0_Avg is at least 0.7; wherein D is measured in J/cm² of UVA radiation; or (b) wherein D, MOL %, and MW_I are also determined based on a Delta YI equation as follows:

Ln(D_YI)=−0.047177+(0.062393×D+1.81716×10⁻⁴×
MW_I)+(0.017370×MOL %)−(5.48288×10⁻⁶×
D×MW_I)

wherein D_YI is the change in YI after exposure to the dosage D, measured before UVA exposure and at least 48 hours after UVA exposure; and D_YI is 6 or less; or (c) wherein D, MOL %, MW_I, and MF are also determined based on a Delta % T equation as follows:

(D_% T+8.90)^2.65=+343.92310−(6.75832×D)−
(0.022788×MW_I)+(0.43933×MOL %)−
(3.84042×MF)+(5.56692×10⁻⁴×D×MW_I)−
(8.77565×10⁻⁴×MW_I×MOL %)+(8.94844×
10⁻⁴×MW_I×MF)

wherein D_% T is the change in light transmission after exposure to the dosage D, measured before UVA exposure and at least 48 hours after UVA exposure; and D_% T is 3.5 or less; or (d) wherein D, MOL %, MW_I, MF, and WP are also determined based on a gel thickness equation as follows:

Sqrt(GEL)=+2.69872−(0.093035×WP)+(0.31583×
D)−(5.37830×10⁻⁴×MW_I)+(0.28207×MOL
%)−(0.092447×MF)−(2.29409×10⁻³×WP×D)+
(2.03257×10⁻⁵×WP×MW_I)+(0.010073×WP×
MOL %)−(1.01623×10⁻⁷×(MW_I)²)−
(0.043959×(MOL %)²)

wherein GEL is the gel thickness on a surface of the article, measured in micrometers, and is at least 5.

Embodiment 9: The process of any one of Embodiments 7-8, wherein the polymeric composition comprises a polymeric base resin.

Embodiment 10: The process of any one of Embodiments 7-9, wherein MOL % is from 2.5 to 20; or wherein MW_I is from about 600 to about 11,000; or wherein MF is from about 5 to about 20; or wherein WP is from 50 to 100.

Embodiment 11: The process of any one of Embodiments 7-10, wherein the cross-linkable polycarbonate resin is a copolymer or a terpolymer.

Embodiment 12: The article formed by the process of any one of Embodiments 7-11; wherein (a) the article has an average V0 of at least 0.7, a percentage retention of tensile elongation (% RE) of at least 85, and a Delta YI of 6 or less; or (b) the article is a molded article, a film, a sheet, a layer of a multilayer film, or a layer of a multilayer sheet.

Embodiment 13: A process for preparing an article that has a low Delta YI after exposure to UVA radiation, comprising:

(A) providing a polymeric composition to be exposed to a dosage (D) of UVA radiation, wherein the polymeric composition comprises:

(viii) a cross-linkable polycarbonate resin including repeating units derived from a dihydroxybenzophenone;

(ix) a flame retardant; and (x) optionally one or more polymeric base resins;

(xi) wherein the cross-linkable polycarbonate resin contains a selectable molar percentage of the dihydroxybenzophenone (MOL %); and (xii) wherein the polymeric composition has:

(xiii) a molecular weight increase of polymeric components therein after exposure to UV radiation (MW_I), (xiv) a melt flow rate (MF), and (xv) a weight percentage of the cross-linkable polycarbonate resin (WP);

(B) forming an article from the polymeric composition; and (C) exposing the formed article to the dosage;

wherein D, MOL %, and MW_I are determined based on a Delta YI equation as follows:

Ln(D_YI)=−0.047177+(0.062393×D+1.81716×10⁻⁴×
MW_I)+(0.017370×MOL %)−(5.48288×10⁻⁶×
D×MW_I)

wherein D_YI is the change in YI after exposure to the dosage D, measured before UVA exposure and at least 48 hours after UVA exposure; and D_YI is 6 or less.

Embodiment 14: The process of Embodiment 13, wherein (a) D, MOL %, MW_I, WP, and MF are also determined based on a flame performance equation as follows:

Sqrt(V0_Avg)=−0.62315+(9.21942×10⁻³×WP)+
(0.041498×D)+(4.34876×10⁻⁵×MW_I)+
(6.55546×10⁻³×MOL %)+(0.089017×MF)+
(9.87122×10⁻⁴×WP×D)−(4.36994×10⁻⁶×WP×
MW_I)−(2.43440×10⁻³×WP×MOL %)+
(2.08870×10⁻³×WP×MF)−(4.40362×10⁻⁶×D×
MW_I)−(2.32567×10⁻³×D×MOL %)−(3.75290×
10⁻³×D×MF)+(2.05611×10⁻⁵×MW_I×MF)+
(5.61409×10⁻³×MOL %×MF)+(2.98567×10⁻⁹×
(MW_I)²)+(6.17229×10⁻³×(MOL %)²)−
(0.017115×(MF)²)

wherein the article has an average V0 (V0_Avg) that is the average of (i) the probability of a first time pass in a UL94 V0 test at a thickness of 1.2 mm after UV exposure and measured after 2 days of aging at room temperature, and (ii) the probability of a first time pass in a UL94 V0 test at a thickness of 1.2 mm after UV exposure and measured after 7 days of aging at 70° C.; and V0_Avg is at least 0.7; wherein D is measured in J/cm² of UVA radiation; or (b) wherein D, MOL %, MW_I, WP, and MF are also determined based on a percentage retention of tensile elongation equation as follows:

Sqrt(% RE)=+1.37235+(0.077638×WP)+(0.67685×
D)−(2.39234×10⁻³×MW_I)−(0.23516×MOL
%)−(0.57165×MF)−(9.18615×10⁻³×WP×MF)−
(6.66016×10⁻⁵×D×MW_I)−(0.019526×D×MOL
%)+(2.07809×10⁻⁴×MW_I×MOL %)+(2.79873×
10⁻⁷×(MW_I)²)+(0.056758×(MF)²)

wherein % RE is the percentage retention of tensile elongation after exposure to acetone at a thickness of 3.2 mm; and % RE is at least 85; or (c) wherein D, MOL %, MW_I, and MF are also determined based on a Delta % T equation as follows:

(D_% T+8.90)^2.65=+343.92310−(6.75832×D)−
(0.022788×MW_I)+(0.43933×MOL %)−
(3.84042×MF)+(5.56692×10⁻⁴×D×MW_I)−
(8.77565×10⁻⁴×MW_I×MOL %)+(8.94844×
10⁻⁴×MW_I×MF)

wherein D_% T is the change in light transmission after exposure to the dosage D, measured before UVA exposure and at least 48 hours after UVA exposure; and D_% T is 3.5 or less; or (d) wherein D, MOL %, MW_I, MF, and WP are also determined based on a gel thickness equation as follows:

$$\text{Sqrt(GEL)}=+2.69872-(0.093035 \times WP)+(0.31583 \times D)-(5.37830\times10^{-4}\times MW\_I)+(0.28207\times MOL\%)-(0.092447\times MF)-(2.29409\times10^{-3}\times WP\times D)+(2.03257\times10^{-5}\times WP\times MW\_I)+(0.010073\times WP\times MOL\%)-(1.01623\times10^{-7}\times(MW\_I)^2)-(0.043959\times(MOL\%)^2)$$

wherein GEL is the gel thickness on a surface of the article, measured in micrometers, and is at least 5.

Embodiment 15: The process of any one of Embodiments 13-14, wherein the polymeric composition comprises a polymeric base resin.

Embodiment 16: The process of any one of Embodiments 13-15, wherein MOL % is from 2.5 to 20; or wherein MW_I is from about 600 to about 11,000; or wherein MF is from about 5 to about 20; or wherein WP is from 50 to 100.

Embodiment 17: The process of any one of Embodiments 13-16, wherein the cross-linkable polycarbonate resin is a copolymer or a terpolymer.

Embodiment 18: The article formed by the process of any one of Embodiments 13-17, wherein:
(a) the article has an average V0 of at least 0.7, a percentage retention of tensile elongation (% RE) of at least 85, and a Delta YI of 6 or less; or
(b) the article is a molded article, a film, a sheet, a layer of a multilayer film, or a layer of a multilayer sheet.

Embodiment 19: An article formed from a polymeric composition that comprises (i) a cross-linkable polycarbonate resin including repeating units derived from a dihydroxybenzophenone, and (ii) a flame retardant;
wherein the article has a pFTP(V0) of at least 0.9 at a thickness of 1.2 mm after UV exposure and measured after 2 days of aging at room temperature; and
wherein the article has a percentage retention of tensile elongation of at least 85% after exposure to acetone at a thickness of 3.2 mm; and
optionally wherein the article also has a Delta YI of less than 10, measured before UVA exposure and at least 48 hours after UVA exposure.

Embodiment 20: An article formed from a polymeric composition that comprises a cross-linkable polycarbonate resin including repeating units derived from a dihydroxybenzophenone, and a flame retardant;
(a) wherein the article (i) has a pFTP(V0) of at least 0.9 at a thickness of 1.2 mm after UV exposure and measured after 2 days of aging at room temperature; and (ii) has a Delta YI of less than 10, measured before UVA exposure and at least 48 hours after UVA exposure; or
(b) wherein the article (i) has a percentage retention of tensile elongation of at least 85% after exposure to acetone at a thickness of 3.2 mm; and (ii) has a Delta YI of less than 10, measured before UVA exposure and at least 48 hours after UVA exposure.

The present disclosure has been described with reference to exemplary embodiments. Obviously, modifications and alterations will occur to others upon reading and understanding the preceding detailed description. It is intended that the present disclosure be construed as including all such modifications and alterations insofar as they come within the scope of the appended claims or the equivalents thereof.

The invention claimed is:

1. A process for preparing an article that has a high probability of passing UL94 V0 test, the process comprising:
(A) providing a polymeric composition to be exposed to a dosage (D) of UVA radiation, wherein the polymeric composition comprises:
(i) a cross-linkable polycarbonate resin including repeating units derived from a dihydroxybenzophenone;
(ii) a flame retardant; and
(iii) optionally one or more polymeric base resins;
(iv) wherein the cross-linkable polycarbonate resin contains a molar percentage of the dihydroxybenzophenone (MOL %); and
(v) wherein the polymeric composition has:
(a) a molecular weight increase of polymeric components therein after exposure to UV radiation (MW_I in gram/mol)
(b) a melt flow rate (MF), MF being measured in cubic centimeter per 10 minutes according to ASTM D1238-13, 1.2 kg load, 300° C. temperature, 360 second dwell, and
(c) a weight percentage of the cross-linkable polycarbonate resin (WP);
(B) forming an article from the polymeric composition; and
(C) exposing the formed article to the dosage;
wherein D, MOL %, MW_I, MF, and WP are determined based on a flame performance equation as follows:

$$\text{Sqrt(V0\_Avg)}=-0.62315+(9.21942\times10^{-3}\times WP)+(0.041498\times D)+(4.34876\times10^{-5}\times MW\_I)+(6.55546\times10^{-3}\times MOL\%)+(0.089017\times MF)+(9.87122\times10^{-4}\times WP\times D)-(4.36994\times10^{-6}\times WP\times MW\_I)-(2.43440\times10^{-3}\times WP\times MOL\%)+(2.08870\times10^{-3}\times WP\times MF)-(4.40362\times10^{-6}\times D\times MW\_I)-(2.32567\times10^{-3}\times D\times MOL\%)-(3.75290\times10^{-3}\times D\times MF)+(2.05611\times10^{-5}\times MW\_I\times MF)+(5.61409\times10^{-3}\times MOL\%\times MF)+(2.98567\times10^{-9}\times (MW\_I)^2)+(6.17229\times10^{-3}\times(MOL\%)^2)-(0.017115\times(MF)^2)$$

wherein the article has an average V0(V0_Avg) that is the average of:
(i) the probability of a first time pass in a UL94 V0 test at a thickness of 1.2 mm after UV exposure measured after 2 days of aging at room temperature, and
(ii) the probability of a first time pass in a UL94 V0 test at a thickness of 1.2 mm after UV exposure measured after 7 days of aging at 70° C.; and
wherein V0 _Avg is at least 0.7; and
wherein D is measured in J/cm² of UVA radiation.

2. The process of claim 1, wherein (a) D, MOL %, MW_I, WP, and MF are also determined based on a percentage retention of tensile elongation equation as follows:

$$\text{Sqrt(\% RE)}=+1.37235+(0.077638\times WP)+(0.67685\times D)-(2.39234\times10^{31\,3}\times MW\_I)-(0.23516\times MOL\%)-(0.57165\times MF)-(9.18615\times10^{-3}\times WP\times MF)+(6.66016\times10^{-5}\times D\times MW\_I)-(0.019526\times D\times MOL\%)+(2.07809\times10^{-4}\times MW\_I\times MOL\%)+(2.79873\times10^{-7}\times(MW\_I)^2)+(0.056758\times(MF)^2)$$

wherein % RE is the percentage retention of tensile elongation after exposure to acetone at a thickness of 3.2 mm, measured according to ASTM D638-10 Type I method at 50 mm/min; and % RE is at least 85; or (b) wherein D, MOL %, and MW_I are also determined based on a Delta YI equation as follows:

$$\text{Ln(D\_YI)}=-0.047177+(0.062393\times D+1.81716\times10^{-4}\times MW\_I)+(0.017370\times MOL\%)-(5.48288\times10^{-6}\times D\times MW\_I)$$

wherein D_YI is the change in YI after exposure to the dosage D, measured before UVA exposure and at least 48 hours after UVA exposure according to ASTM E313-73 (D1925); and D_YI is 6 or less; or (c) wherein D, MOL %, MW_I, and MF are also determined based on a Delta % T equation as follows:

$$(D\_\% T+8.90)^{2.65} = +343.92310 - (6.75832 \times D) - (0.022788 \times MW\_I) + (0.43933 \times MOL\ \%) - (3.84042 \times MF) + (5.56692 \times 10^{-4} \times D \times MW\_I) - (8.77565 \times 10^{-4} \times MW\_I \times MOL\ \%) + (8.94844 \times 10^{-4} \times MW\_I \times MF)$$

wherein D_% T is the change in light transmission after exposure to the dosage D, measured before UVA exposure and at least 48 hours after UVA exposure according to ASTM E313-73 (D1925); and D_% T is 3.5 or less; or (d) wherein D, MOL %, MW_I, MF, and WP are also determined based on a gel thickness equation as follows:

$$Sqrt(GEL) = +2.69872 - (0.093035 \times WP) + (0.31583 \times D) - (5.37830 \times 10^{-4} \times MW\_I) + (0.28207 \times MOL\ \%) - (0.092447 \times MF) - (2.29409 \times 10^{-3} \times WP \times D) + (2.03257 \times 10^{31.5} \times WP \times MW\_I) + (0.010073 \times WP \times MOL\ \%) - (1.01623 \times 10^{-7} \times (MW\_I)^2) - (0.043959 \times (MOL\ \%)^2)$$

wherein GEL is a gel thickness on a surface of the article, measured in microns, and is at least 5.

3. The process of claim 1, wherein the polymeric composition comprises the one or more polymeric base resins.

4. The process of claim 1, wherein MOL % is from 2.5 to 20; or wherein MW_I is from about 600 to about 11,000; or wherein MF is from about 5 to about 20; or wherein WP is from 50 to 100.

5. The process of claim 1, wherein the cross-linkable polycarbonate resin is a copolymer or a terpolymer.

\* \* \* \* \*